United States Patent [19]

Yomdin et al.

[11] Patent Number: 5,510,838
[45] Date of Patent: Apr. 23, 1996

[54] APPARATUS AND METHOD FOR PICTURE REPRESENTATION BY DATA COMPRESSION

[75] Inventors: Yosef Yomdin, Rehovot; Yoram Elihai, Ashdod; Miriam Briskin, Givat Zeev, all of Israel

[73] Assignee: IGP, Research and Development Ltd., Israel

[21] Appl. No.: 343,210

[22] Filed: Nov. 22, 1994

Related U.S. Application Data

[63] Continuation of Ser. No. 32,865, Mar. 17, 1993, abandoned.

[30] Foreign Application Priority Data

| Mar. 22, 1992 | [IL] | Israel | 101331 |
| Oct. 8, 1992 | [IL] | Israel | 103389 |

[51] Int. Cl.⁶ .............................. H04N 7/30; H04N 7/32
[52] U.S. Cl. .......................................... 348/384; 348/390
[58] Field of Search ................................. 348/384, 390, 348/429, 671; H04N 7/30, 7/32

[56] References Cited

U.S. PATENT DOCUMENTS

| 4,715,005 | 12/1987 | Heartz ................................ 364/521 |
| 4,941,193 | 7/1990 | Barnsley et al. ..................... 382/249 |
| 5,052,045 | 9/1991 | Peregin et al. ........................ 382/56 |
| 5,065,447 | 11/1991 | Barnsley et al. ..................... 382/249 |
| 5,091,976 | 2/1992 | Murayama ............................. 382/56 |
| 5,113,256 | 5/1992 | Citta et al. .......................... 382/56 |
| 5,148,492 | 9/1992 | Uzawa et al. ........................ 381/177 |
| 5,148,497 | 9/1992 | Pentland et al. ...................... 382/54 |
| 5,150,433 | 9/1992 | Daly ..................................... 358/426 |
| 5,177,796 | 1/1993 | Feig et al. ............................. 382/56 |
| 5,271,071 | 12/1993 | Waite .................................... 382/56 |
| 5,282,255 | 1/1994 | Bovik et al. .......................... 382/56 |
| 5,347,600 | 9/1994 | Barnsley et al. ..................... 382/249 |

FOREIGN PATENT DOCUMENTS

| 0259971 | 3/1988 | European Pat. Off. ........ G06F 15/72 |
| 8902160 | 8/1989 | Netherlands ..................... G06F 15/64 |
| WO91/19263 | 12/1991 | WIPO ............................. G06F 15/64 |

OTHER PUBLICATIONS

Journal Of The Institution Of Engineers (India) vol. 65, ETI, 30 Nov. 1984, India pp. 34–39 R. S. Choras 'Image Bandwidth Compression By Coding Of Low Pass and High Pass Picture System'.

IEEE Transactions On Communications; vol. 38, No. 12, 31 Dec. 1990, New York (US), pp. 2137–2145; D. Chen et al. 'Visual Pattern Image Coding' pp. 2140–2143, Section III, Parts A–D.

Signal Processing Image Communication; vol. 1, No. 2, 31 Oct. 1989, Amsterdam (NL) pp. 153–180; M. Gilge et al. 'Coding Of Arbitrarily Shaped Image Segments Based On A Generalized Orthogonal Transform'.

Alta Frequenza; vol. 58, No. 3, 30 Jun. 1989, Milano (IT); pp. 277–285; XP000054475 D. D. Giusto et al. 'High Performance Image Coding: Integration Of Different Techniques By A Knowledge–Based Recognition System' pp. 281–282, Section 4.2.

Patent Abstracts of Japan; vol. 11, No. 376 (E–563); 8 Dec. 1987 & JP-A-62 143 585 (Sony Corp); 26 Jun. 1987 abstract.

Mathematics of Physics and Modern Engineering, Sokolnikoff, 1958, McGraw–Hill Book Company, pp. 143–152.

B. Lerner et al., Applications of artificial intelligence VI, Apr. 1988 pp. 104–116.

*Primary Examiner*—Tommy P. Chin
*Assistant Examiner*—Vu Le
*Attorney, Agent, or Firm*—Lerner, David, Littenberg, Krumholz & Mentlik

[57] ABSTRACT

Processes for pictorial representation by data compression including dividing a picture into regions of designated brightness values, fixing a characteristic scale for each region representing a number of pixels, dividing each region into cells, identifying each cell representing the basic structure of each cell by way of models, and storing and/or transmitting the data for each such model in the form of primary compression of the picture.

28 Claims, 32 Drawing Sheets

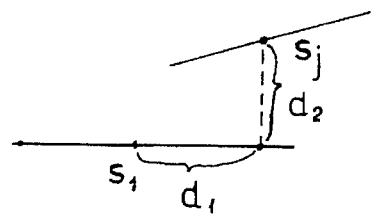
Fig. 1          Fig. 2
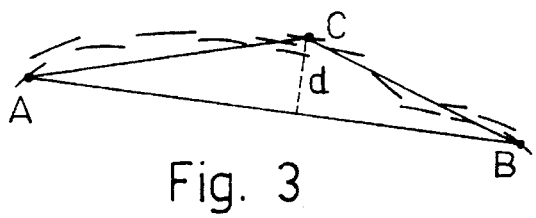
Fig. 3
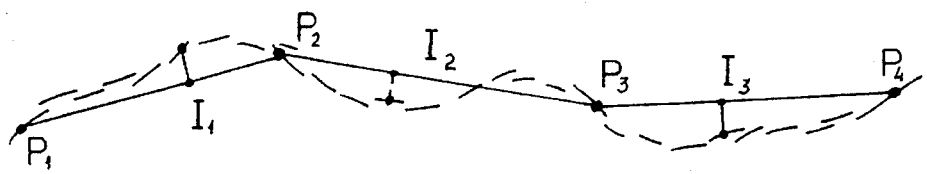
Fig. 4
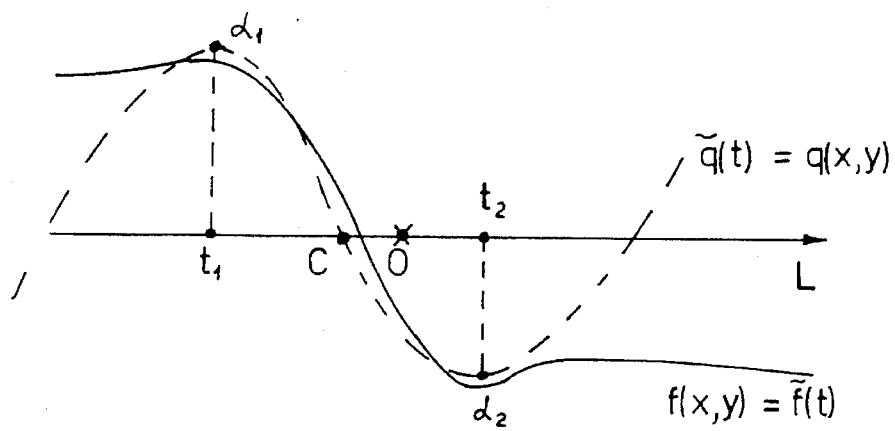
Fig. 5 picture detection result picture detection result

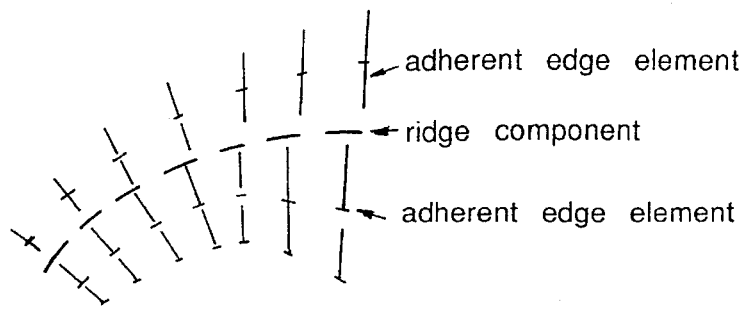
Fig. 13
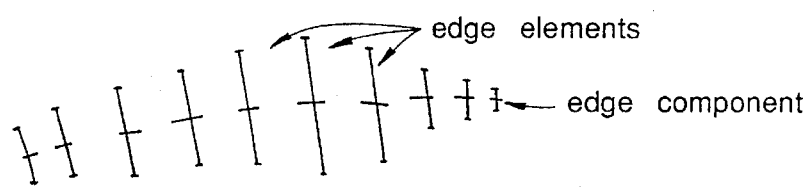
Fig. 14
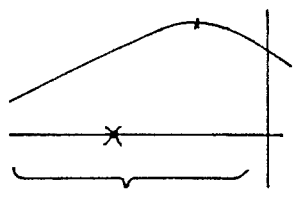
$W_{grad}$
Fig. 15a
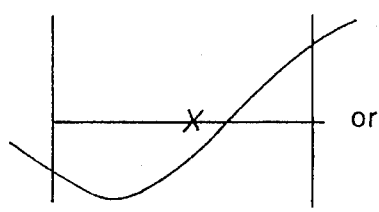
Fig. 15b   or
Fig. 15c
Fig. 16a
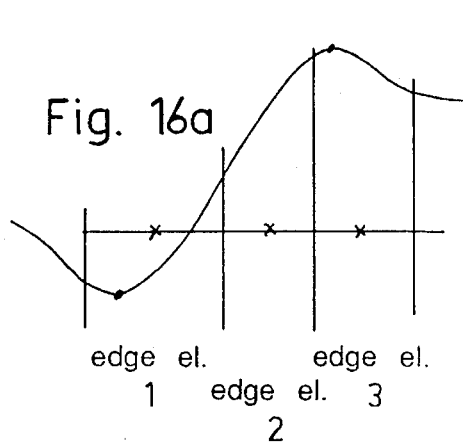
edge el. 1   edge el. 2   edge el. 3
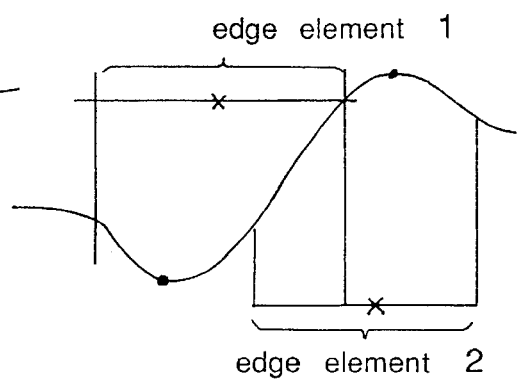
edge element 1
edge element 2
Fig. 16b

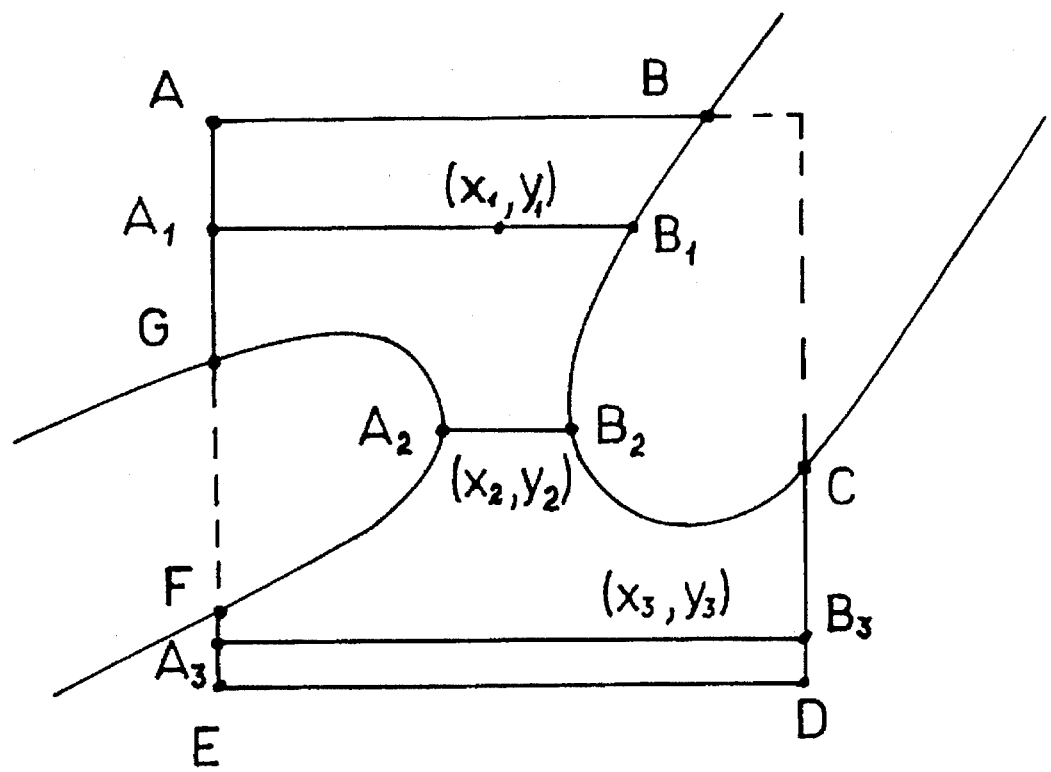
Fig. 43
  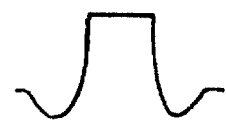
Fig. 44a    Fig 44b

APPARATUS AND METHOD FOR PICTURE REPRESENTATION BY DATA COMPRESSION

This is a continuation of application Ser. No. 08/032,865 filed Mar. 17, 1993 now abandoned.

FIELD OF THE INVENTION

This invention relates to apparatus and methods for representing pictures by data compression, particularly, but not exclusively, for the purpose of storing and/or transmitting the compressed data and subsequently reconstructing the picture in a manner as faithful as possible.

BACKGROUND OF THE INVENTION

The representation of various objects by data compression is a problem with which the art has been increasingly occupied in recent times. The problem is encountered in many cases, e.g. when a picture, or a succession of pictures, for example constituting a television broadcast, has to be registered in a magnetic memory, such as a video tape, or is to be transmitted over a distance by electromagnetic waves or by cable. On the one hand, it is of considerable economic importance to increase as much as possible the amount of optical and acoustic information that can be registered on a given memory, whereby to reduce the size and cost of magnetic tapes or other information storage means. On the other hand, the available wave bands are increasingly crowded, and so are the cables, and it is increasingly necessary to compress the transmitted data, so that as great a number of them as possible may be transmitted over a given frequency or by a given cable. Data compression problems, therefore, are increasingly acute, both in data storage and in data transmission.

In particular, the art has dealt with the problem of compressing the data which represent an object, e.g. a picture. A process for the production of images of objects is disclosed in EPA 0 465 852 A2, which process comprises the steps of: (1) approximating the object by a model comprising at least one differentiable component; (2) establishing the maximum allowable error and the degree of the polynomials by which the differentiable components of the model are to be approximated; (3) constructing a grid of a suitable pitch; (4) computing the coefficients of the Taylor polynomials of the aforesaid differentiable components at selected points of said grid.

However, none of the method and apparatus of the prior art are wholly satisfactory. Either the degree of compression is too small, or the picture cannot be faithfully reconstructed—viz. "decompressed"—from the compressed data, or both. There is another important requirement, not satisfied by known compression methods: application of image processing operations on compressed data, and natural extendibility of the compression scheme to video sequences compression.

In describing this invention, two-dimensional pictures, in particular color pictures, such as those created on a television screen, are considered, but three- or more than three-dimensional objects could be represented by the apparatus and method provided by the invention, e.g. by defining them by means of views or cross-sections in different planes.

The efficiency of a compression method depends on the one hand on the degree of compression, which should be as high as possible, but on the other on the faithfulness with which the picture reconstructed from the compressed data reproduces the original one. Perfect reproduction is obtained when the two pictures are visually undistinguishable. Two pictures are considered to be "visually undistinguishable", as defined by the MPEG (Motion Picture Expert Group of the International Standard Organization), when any ordinary viewer cannot distinguish between them when viewing them from a distance equal to six times the picture height. Different requirements for visual undistinguishability may be defined for different applications, such as: high end computer imaging, PC computer imaging, PC or video games, multimedia, pre-press applications, fax, colour video conferencing, videophone, archiving, medical imaging, aerial picture analysis, etc. However, the invention does not always require that the picture representation and the original be visually undistinguishable, though this is generally preferred: the degree of similarity may depend on the particular application and on the degree of faithfulness that is required of the representation in each case.

SUMMARY OF THE INVENTION

Broadly, the method of picture representation by data compression according to the invention comprises the steps of:

1. subdividing the picture into regions;
2. registering the values of a brightness function (or "grey levels") preferably at each pixel of the picture;
3. fixing for each region a characteristic scale (hereinafter indicated by L) preferably defined in terms of a number of pixels;
4. dividing each region into cells, each comprising a number of points (pixels) defined by two variables (coordinates), said cells having linear dimension in the order of L, and preferably equal approximately to L;
5. identifying in each cell the "basic elements" or "structures", as hereinafter defined;
6. in each cell, representing the basic elements by models (or submodels), as hereinafter defined; and
7. storing and/or transmitting, for each cell the data defining each model, said data together representing the "primary compression" of the picture.

Optionally, said data may be further compressed by any suitable methods, or otherwise processed as will be explained hereinafter.

The regions into which the picture is subdivided are chosen in such a way that the data to be stored and/or transmitted for each of them will not be too numerous, and thus will not create files that are too cumbersome, particular with regard to the hardware that is available and to its capacity. Therefore in some cases the whole picture may be considered as a single region, or conversely, in other cases the regions will only be small fractions of the whole picture. Thus a suitable subdivision into regions will offer no difficulties to skilled persons.

The picture to be represented is defined by the brightness values of the basic colours (usually three) for each pixel, or by equivalent data. Said values may be available in the form of computer files, or may be transmitted by a picture generating apparatus, e.g. a TV camera, or may be read by means of canners. In any case, when a colour picture is to be compressed, the method according to the invention can be applied separately to each of the three (or two or four) basic colours, and corresponding monochrome picture images are obtained. Alternatively, transformation of colour data, by methods known in the art (see e.g. R. J. Clarke, Transform Coding of Images, Academic Press, 1985, from page 248)

may be carried out, and the three original monochrome signals, corresponding to the RGB system, can be transformed into one (monochrome) luminance signal and two reduced bandwidth colour-information carrying signals (sometimes referred to collectively, hereinafter, as "colour information signals).

Therefore, hereinafter the expression "brightness function" (or "grey levels") should be understood as meaning the function defined by the array of the brightness values of any basic color or of the values of any of the luminance and/or colour information carrying signals.

By decompressing the compressed and stored and/or transmitted data relative to the various cells, which contain all the chromatic information required, a "picture image", viz. an image which colosely approximates the picture, can be reconstructed. Said data include a brightness value for each pixel and for each basic colour, or equivalent information deriving from the transformation hereinbefore mentioned, and this information permits any apparatus capable of creating an image, be it e.g. a computer which has stored the said information in its memory, or a printer, a still camera, a TV camera, and so on, which receive the information from a computer, to create the picture image. Such apparatus and their operation are well known to persons skilled in the art.

The information defining, in any chosen way, the brightness distribution of the various colors or signals, may be a function of time. This will occur e.g. whenever a motion or a television picture is compressed and reconstructed. In such a case, the method steps according to the invention should be carried out in a very short time, e.g. in the order of 30 frames per second.

The apparatus according to the invention comprises:

A-means for defining the brightness values of the basic colours, or equivalent information, preferably at each pixel of the original picture;

B-means for registering the said brightness values or equivalent information, as sets of values associated with the pixels of a number of cells, of predetermined size, of each region of the picture;

C-means for determining the parameters of any one of set of basic models, in particular by minimizing the square deviation of the values of said basic model from the values of a brightness function at the pixels of the cell; and D-means for storing and/or transmitting information defining the types of basic models chosen and the said parameters thereof.

The means A- for determining the brightness values of the points of the cell may be different depending on the particular embodiment of the invention. They may consist, e.g., merely in means for relaying to the apparatus values which are defined by means that are not part of the apparatus, in particular by the apparatus which creates or transmits the original picture. Thus, if the invention is applied to the compression of a television movie, for the purpose of registering it on a video tape, the brightness values relative to each point of the television receiver screen are transmitted, as functions of time, from a broadcasting station via electromagnetic waves or via cable, and these same values can be relayed directly to the registering means B-. The brightness value determining means will then essentially be a part of the television receiver: said values will be registered in the apparatus according of the invention concurrently with their appearing as optical values on the receiver screen. In this case, one may say that the picture is being compressed in real time. A similarly situation will prevail if the picture to be compressed is not being transmitted, but has been registered on a magnetic tape: the reading of the tape, that would be carried out in order to screen the registered picture in a normal way, will directly provide the brightness values. In other embodiments, the invention may be used to compress a picture that is already optically defined. Then the brightness value determining means will be normally constituted by a scanner.

The storing and/or transmitting mans D- may be conventional in themselves, and may be constituted, e.g. by magnetic tapes, such as video tapes, by optical or magnetic disks, or by television broadcasting apparatus, and the like.

The stored and/or transmitted, compressed picture must be reconstructed by decompression from the compressed data, so that it may be viewed. Therefore, there must be additionally provided E-means for reconstructing the picture by producing at each point of each cell a color brightness, for each color, the value of which is defined by the value at said point of said basic model having said parameters.

In some embodiments, decompressing mans E- are part of the apparatus according to the invention. Thus, if the invention is used to compress data for recording television pictures on video tapes, the apparatus will comprise means for actuating the television screen to screen pictures defined by the compressed data. This will generally occur when the reconstructed picture must be seen at the location at which it has been compressed. However, if the point at which the picture is to be seen, is different from the one at which the apparatus comprising components A- to D- is located, means E- will not be physically a part of sad apparatus. In general, means E- are functionally, but not necessarily or even usually structurally connected with means A- to D-. These latter, while usually connected with one another, need not necessarily be structurally combines.

In a preferred aspect of the invention, the basic structures comprise background areas, edges, ridges, positive and negative hills and, optionally, saddles as hereinafter defined.

In a preferred aspect of the invention, the identification of the basic structures and their representation by models are carried out by the following steps:

I. constructing geometric models representing said structures;

II. associating to each of said geometric models a mathematical model representing it;

III. condensing said models to define a global model for each cell of the regions; and subsequently IV. encoding and quantizing the data defining said global model; wherein steps II and III may be partly concurrent.

It should be understood that, since, as has been said before, the process of the invention is carried out separately on each basic color or on each luminance or color information carrying signal, the "objects" which the geometric models are intended to represent may not be, and generally are not, actually physical objects which the eye would discern in the picture, but represent characteristics of the distribution of the basic color brightness or the value of the color signal under consideration. Therefore, in principle, the objects and the corresponding models could be quite different for different basic colors or color information signals. Thus, in principle, the amount of compressed data required to represent a color picture would be three or four times as large as the amount required for each basic color or color information signal. However, it has been surprisingly discovered that it is possible to identify in the models two different kinds of parameter, which will be called respectively "geometric parameters" and "brightness parameters", such that the geometric parameters are, in most practical cases, the same for all the basic colors or color information signals. Thus, in most cases it is enough to process the monocromatic luminance signal and add the color data later, which color data, when operating according to the invention, may require as little as an additional 3% to 10% approximately of data. This is an important feature of this invention, particularly in its preferred aspect.

It is therefore another preferred aspects of the invention a method of compressing color pictures, which comprises carrying out the compression method hereinbefore defined with reference to one basic color or monochrome signal and successively repeating it for the remaining basic colors or color information carrying signals, by using the same modes with the same geometric parameters and determining the appropriate brightness parameters, as will be defined hereinafter.

In the process according to the invention, geometric and/or mathematical models are considered as "representing" picture elements or other geometric and/or mathematical models whenever they approximate these latter to a degree determined by absolute or relative parameters or thresholds, the determination of which is part of the invention. The absolute thresholds have a fixed value. The relative thresholds depend on the values of the quantity considered over a certain area, or over the entire region. Usually, but not necessarily, the relative thresholds have the form of kM, where k is a coefficient and M is the average value of the quantity over the area that has been chosen for averaging.

The various thresholds will be defined as they come into play during various stages of the process, for specific embodiments of the invention.

Definition of the basic elements or structures

By "basic elements" is meant, in the broad definition of the invention, a number of simple structures such that in combination they approximate any actual structure or "object" that can be found in the picture. In carrying out the invention, a list of such basic elements is prepared for each application. Usually the same list is adequate for all applications of the same nature, e.g. for all TV pictures.

As used in this specification, the term "submodel" is to be construed as meaning: a) an array of grey levels of RGB values for a certain part of a picture (e.g. grey level $z=\Phi_{ab}(x,y)$, wherein $\Phi$ is an expression depending on parameters a and b); or b) the geometry of certain objects on a picture (e.g. the form of a certain curve can be represented as $y=\Psi_{cd}(x)$, such as e.g. $y=cx+dx^2$).

The term "model" means an expression consisting of one or more submodels, and allowing for computing for any given x,y a grey level $z=\Phi(x,y)$.

The parameters of submodels, representing the geometry of objects, are called "geometric parameters", and the parameters of submodels, representing grey levels, are called "brightness parameters". Some of the models explicitly contain submodels responsible for the position and the geometry of the described objects, as shown in the following example:

In the model $z=\Phi(x,y)$, wherein $\Phi$ is equal to $a_1x+b_1y+c_1$, if $y \geq \alpha x^2+\beta x+\chi$, and is equal to $a_2x+b_2y+c_2$, if $y<\alpha x^2+\beta x+\chi$, the geometric submodel is the curve $y=\alpha x^2+\beta x+\chi$ and $\alpha,\beta,\chi$ are the geometric parameters. $z=a_1x+b_1y+c_1$ and $z=a_2x+b_2y+c_2$ are two other submodels of this model.

Polynomial models or submodels are those given by polynomials of low degree (usually $\leq 4$), with coefficients assuming a limited number of values (usually $\leq 256$).

To "represent" a picture, or a part thereof, or a certain object that is in the picture, by a model, means to replace the original grey or RGB levels $z=f(x,y)$ by the grey level model values $z=\Phi(x,y)$.

In all the definitions of picture objects (not of models and submodels), hereinafter, reference is made to a given part of a picture of a size approximately equal to the scale L. Therefore said definitions are scale-dependent. A list of basic elements, particularly suitable for representing TV picture, but also for other applications, will now be described. However, persons skilled in the art may modify it and add other basic elements, when dealing with other applications or with particular cases of the same application.

Smooth objects and smooth regions—The word "smooth" is used and will always be used hereinafter to define those brightness distributions (brightness surfaces) that can be represented by a polynomial P(x,y) of a low degree, e.g. a degree generally not higher than 4, in a visually undistiguishable way. Thus smooth regions are those in which the brightness surface $z=f(x,y)$ defining the distribution of a colour in the picture, can be so represented; and smooth objects are those any part of which inside any cell can be so represented by a polynomial model or submodel of a low degree. Analogously, a "smooth curve" is a curve in the neighbourhood of whose intersection with any cell the picture can be represented by a model, within which the curve is defined by a polynomial of low degree.

Simple models or submodels are those containing a small total number of parameters (usually $\leq 6$), each of these parameters assuming a limited number of values (usually $\leq 256$).

Simple models or submodels are those containing a small total number of parameters (usually $\leq 6$), each of these parameters assuming a limited number of values (usually $\leq 256$).

Simple objects—An object, part of a picture, is said to be "simple", if for any cell the part of the object inside the cell can be represented in a visually undistinguishable way (as hereinbefore defined) by a simple model or submodel.

Curvilinear structures—Are those in which the brightness distribution can be represented by a surface $z=f(x,y)$, generated by a simple (as the word is defined hereinbefore) profile, a point of which follows a simple curve, the parameters defining the profile being simple functions of the position of said point on said curve. Curvilinear structures can be unbounded (in the cell under consideration), or bounded at one end, or at both ends to constitute a segment. They can also form nets, when several curvilinear structures are joined at some points or portions, that will be called "crossing".

Local simple elements—An element is "local" if its diameter is comparable with L, at most 2 to 3 L. Local simple elements are those that are local and simple, as the latter word is defined hereinbefore.

In practice, the aforesaid types of brightness distributions are never found in their pure form, but types that are sufficiently similar to be treated as such are generally found.

The determination of the characteristic scale L is a fundamental step. If L is too small, the structure found in the cells—the "object"—can easily be represented by basic element models, but the amount of data that will be involved in the compression is too high for the compression to be successful. On the other hand, if L is too large, it is impossible to represent the objects in a visually undistiguishable way by means of basic element models.

Therefore the choice of L will depend on each specific application, and L will be chosen as the largest scale that permits to approximate the actual objects by means of basic element modes in such a way as to achieve a visually undistinguishable representation, or at least as faithful a representation as desire for the specific application; and it will also depend, of course, on the quality and resolution of the original picture.

L is expressed in terms of pixels. For instance, when applying the invention to the compression of television images, it is found that L should be comprised between 10 and 16 pixels, e.g. about 12 pixels. For most applications, L may be comprised between 6–8 and 48 pixels, but these values are not a limitation. A frequent value is L=16. It is appreciated that each cell, if square, contains L×L pixels, so that if L is 16, the cell will contain 256 pixels. A square cell having the dimensions L×L will be called the "standard cell". Since most hardware is designed to operate with ASCII symbols, such a size of cell or a smaller one is convenient. If a certain object is simple or smooth with respect to a given scale L, it is simple or smooth with respect to any smaller scale.

It has been found that, for representing television pictures, if the picture is divided into cells of 4×4 pixels, and in each cell the grey levels are approximated by second degree polynomials, an essentially visually undistinguishable picture representation is obtained. Therefore in a television picture any object is smooth and simple on a characteristic scale of 4. Furthermore, for such an application, the array of basic elements hereinbefore described is adequate and sufficient for picture representation on any scale between 8 and 16, preferably of 12.

In the preferred aspect of the invention, the basic structures are defined as follows:

background (also called sometimes "smooth") areas are those wherein the values of the brightness function may be considered to be changed slowly;

edges are curvilinear structures on one side of which the values of the brightness function undergo a sharp change;

ridges are curvilinear structures defined by a center line, the cross-sections of which in planes perpendicular to the center line are bell like curves, and they are positive or "white" (ridges proper) or negative or "black" (valleys), according to whether at the point of each cross-section located on the center line the brightness function value is a maximum or a minimum;

hills are points or small areas at which the brightness function value is a maximum (positive—white—hills or hills proper) or a minimum (negative—black—hills or hollows) and decreases or increases, respectively, in all directions from said point or small area.

saddles are curvilinear structures which comprise a central smooth region bounded by two edges, wherein the brightness function values increase at one edge and decrease at the other. They may be treated as basic structures, for convenience purpose, or they may be separated into their aforesaid three components: two edges and an intermediate smooth area.

The said basic structures represent a particular case of the basic elements hereinbefore defined. In particular, (white and black) ridges and edges are specific cases of curvilinear structures. Hills and hollows are specific cases of local simple structures.

Preferably they are identified through the derivatives of the brightness function $z=f(x,y)$, x and y being the Cartesian (or other) coordinates of a coordinate system of the region considered, or through the derivatives of an approximating function, as will be explained hereinafter.

DESCRIPTION OF THE DRAWINGS

In the drawings:

FIGS. 1 to 50—geometrically illustrate various stages or particular cases of the processes described as embodiments of the invention, and each of them will be described, in order that its content may be clearly understood, at the appropriate stage of the description of preferred embodiments;

FIGS. 54, 55, 56 show the stages of analysis of a small area of a 48×48 pixels region of FIG. 51, shown at a greatly enlarged scale, wherein;

FIG. 56 represents the result of the edge-line analysis;

FIG. 62 represents 10 frames (as hereinafter defined) of a videosequence (on a 48×48 region), the upper line being the original sequence and the bottom line the sequence after compression (1:150);

FIGS. 63 and 64 show the results of analysis of the frames 4 and 7 (control frames) as still pictures;

FIG. 65 shows (by yellow and blue components) the results of the motion predicted for the components from frame 4 to frame 7;

FIGS. 66 and 67 show the interpolated positions of the components (blue lines) against the real position (yellow lines) on the intermediate frames 5 and 6;

DETAILED DESCRIPTION OF PREFERRED EMBODIMENTS

Figure 6:
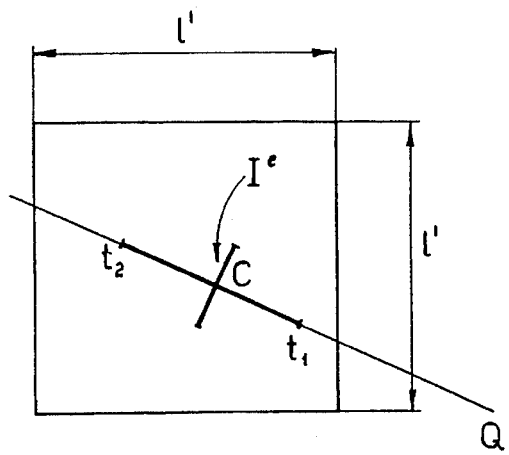

In the process of the invention in tis preferred aspects, the following steps are carried out:

Preferably, a grid is fixed in the region considered.

Preferably, each point of the grid considered is assigned to one of three domains indicated as $A_1$, $A_2$ and $A_3$, according to the values of the derivatives of $f(x,y)$ at that point and to the following criteria.

Domain $A_1$ contains all the points where all the said derivatives of orders 1 and 2 are small and do not exceed a certain threshold $T_1$. A convenient way of expressing that condition, to which reference will be made hereinafter, is to say that the domain $A_1$ is the set of the points of the grid for which $$|\nabla f|^2 < G_{abs}, \quad \lambda_1^2 + \lambda_2^2 < S_{abs}.$$

In the above formula, $G_{abs}$ and $S_{abs}$ are thresholds, the values of which will be set forth hereinafter. $\lambda_1$ and $\lambda_2$ are the eigenvalues of the matrix $$\begin{vmatrix} \delta^2 f/dx^2 & 1/2\delta^2 f/dxdy \\ 1/2\delta^2 f/dxdy & \delta^2 f/dy^2 \end{vmatrix}$$

which will be designated hereinafter as W.

Domain $A_2$ includes the grid points where the gradient of the brightness function f is large. This condition can be expressed by saying the set $A_2$ is defined by $$|\nabla f|^2 \geq \max [G_{abs}, G_{rel}]$$

where $G_{abs}$ is the same as the above and $G_{rel}$ is a relative threshold equal to $K_{grad} \cdot M_1$ wherein $M_1$ is the mean value of $|\nabla f|^2$ over the region considered. Typical values of the parameter $K_{grad}$ are between 0.2 and 0.5, and $50 \leq G_{abs}$, $S_{abs} \leq 250$.

Preferred values of these coefficients are $G_{abs} = S_{abs} = 100$, $K_{grad} = 0.3$.

Domain $A_3$ includes the points in which the second order derivatives are bigger than a threshold $T_3$, while $|\text{grad}(f)|$ does not exceed another threshold $T_2$. $T_3$ and $T_2$ are relative thresholds, viz. they are defined as certain percentage of the average value of the second order derivatives and of $|\text{grad}(f)|$ respectively.

In a more preferred form of the invention, the domain $A_3$ is actually the sum total of five sub-domains defined by the following conditions:

$$|\lambda_2/\lambda_1| < M_{ratio}, \quad \lambda_1 + \lambda_2 < 0 \quad (1)$$

$$|\lambda_2/\lambda_1| < M_{ratio}, \quad \lambda_1 + \lambda_2 > 0 \quad (2)$$

$$|\lambda_2/\lambda_1| \geq M_{ratio}, \quad \lambda_1 < 0, \quad \lambda_2 < 0 \quad (3)$$

$$|\lambda_2/\lambda_1| \geq M_{ratio}, \quad \lambda_1 < 0, \quad \lambda_2 > 0 \quad (4)$$

$$|\lambda_2/\lambda_1| \geq M_{ratio}, \quad \lambda_1 \cdot \lambda_2 < 0 \quad (5)$$

assuming $|\lambda_1| \geq |\lambda_2|$ wherein $M_{ratio}$ is another threshold (typical values whereof will be given later).

Preferably the brightness function is approximated by an approximating function $p(x,y)$. When this is done, the function p and its derivatives and gradient should be substituted for the function f and its derivatives and gradient in all the formulae in these appear, e.g. as hereinbefore.

The approximating function is any convenient function, preferably involving a limited number of parameters, the values and derivatives of which are close enough to those of the brightness function in the area considered for it to be representative of the brightness function. In particular, it may conveniently be a polynomial of the second degree having the form $p(x,y) = a_{00} + a_{10}x + a_{01}y + a_{20}x^2 + a_{11}xy + a_{02}y^2$, though a different function, e.g. a polynomial of a higher degree or a function other than a polynomial, might be chosen in particular cases. The coefficients of $p(x,y)$ are determined by minimizing the expression constituted by the sum of the square of the differences between the values of z and p at the grid points offer the entire window considered, or, in other words, by minimizing the square deviation of the function p from the function z over the area considered. More complex functions, including polynomials of degree 3 and higher, can also be used whenever the use is required for a better implementation of the process according to the invention, as well as more complicated measures of approximation than the square deviation.

In this manner, the approximating function and its derivatives will have a given value at each grid point. Preferably, the derivatives used in the following steps of the process of the invention are those up to the order 2. Within the degree of accuracy desired for the process, the derivatives and the gradient of the approximating function $p(x,y)$ can be regarded as being the same as those of the brightness function $z = f(x,y)$.

The matrix W becomes then $$\begin{vmatrix} a_{20} & 1/2a_{11} \\ 1/2a_{11} & a_{02} \end{vmatrix}$$

In the aforesaid preferred embodiment of the invention, the same comprises therefore the following steps:

1) The values of a brightness function $z = f(x,y)$ are registered preferably at each pixel of the picture or of a region thereof, if it is chosen to operate successively on a number of regions in order to contain the number of data to be handled at each time. The regions are preferably squares of side R (hereinafter "the region scale").

2) The values of the derivatives of the brightness function $z = f(x,y)$, preferably in order up to 2, e.g. are approximately computed by the following steps. A "window" and a grid related thereto are determined. The window is a square having a side "l" which is ordinarily of a few pixels, preferably between 3 and 6, and more commonly of 4. The grid is constituted by the pixels themselves, if "l" is an uneven number of pixels, and is constituted by the central points between the pixels, viz. the points located halfway between adjacent pixels both in the x and the y direction, if "l" is an even number of pixels. These alternative definitions of the grid are adopted for reasons of symmetry.

3) For each grid point (pixel or central point between pixels), the brightness function $z(x,y)$ is approximated by the approximating function p, preferably a polynomial, as hereinbefore explained.

4) A number of thresholds is fixed. The various thresholds may be fixed or not at different stages of the process, or may vary in different parts of it for specific applications of the invention. But, for convenience of exposition the thresholds will be considered as being all fixed during each step of the process.

5) Each grid point is assigned to one of three domains indicated as $A_1$, $A_2$ and $A_3$, according to the values of the derivatives of the approximating function at that point and to the criteria hereinbefore explained.

Domain $A_1$ contains all the points where all the derivatives of the approximating function p (from now on considered in place of the brightness function f) of orders 1 and 2 are small and do not exceed a certain threshold $T_1$. A convenient way of expressing that condition, as noted, is to say that the domain $A_1$ is the set of the points of the grid for which $|\nabla f|^2 < G_{abs}$, $\lambda_1^2 + \lambda_2^2 < S_{abs}$.

In the above formula, $B_{abs}$ and $S_{abs}$ are the aforementioned thresholds, the values of which are related to the value of 1. $\lambda_1$ and $\lambda_2$ are the eigenvalues of the matrix W $$\begin{vmatrix} a_{20} & 1/2 a_{11} \\ 1/2 a_{11} & a_{02} \end{vmatrix}$$

Domain $A_2$ includes the grid points where the gradient of the averaging function p is large This condition can be expressed, as noted, by saying the set $A_2$ is defined by $|\nabla f|^2 \geq \max [G_{abs}, G_{rel}]$ where $G_{abs}$ is the same as the above and $G_{rel}$ is a relative threshold equal to $K_{grad} \cdot M_1$ wherein $M_1$ is the mean value of $|\nabla f|^2$ over the entire region or its parts. Typical and preferred values of the parameters or thresholds will be given hereinafter.

Domain $A_3$ includes the points in which the second order derivatives are bigger than a threshold $T_3$, while $|\text{grad}(p)|$ does not exceed another threshold $T_2$. $T_3$ and $T_2$ are relative thresholds, viz. they are defined as a certain percentage of the average value of the second order derivatives and of $|\text{grad}(p)|$ respectively.

In a preferred form of the invention, as has been said, the domain $A_3$ is actually the sum total of five sub-domains defined by the following conditions:

$|\lambda_2/\lambda_1| < M_{ratio}$, $\lambda_1 + \lambda_2 < 0$     (1)

$|\lambda_2/\lambda_1| < M_{ratio}$, $\lambda_1 + \lambda_2 > 0$     (2)

$|\lambda_2/\lambda_1| \geq M_{ratio}$, $\lambda_1 < 0$, $\lambda_2 < 0$     (3)

$|\lambda_2/\lambda_1| \geq M_{ratio}$, $\lambda_1 < 0$, $\lambda_2 > 0$     (4)

$|\lambda_2/\lambda_1| \geq M_{ratio}$, $\lambda_1 \cdot \lambda_2 < 0$     (5)

assuming $|\lambda_1| \geq |\lambda_2|$ wherein $M_{ratio}$ is another threshold (typical values whereof will be given later).

6) The basic structures are identified in the domains. Preferably, these structures includes, as noted, smooth regions, edges, ridges, and hills, and optionally saddles, wherein ridges and hills may be positive or negative, or black or white, the negative (black) ridges being "valleys" and the negative (black) hills being depressions or "hollows", as they will be sometimes called hereinafter. Other elements may be associated to the said ones, and in some cases, some of them may be omitted.

The background (or smooth) regions are those defined by the domain $A_1$, and in them the brightness function and the approximating function have only moderate variations.

The edges essentially indicate the sharp passage from two different values of the brightness and they may constitute the passage from one smooth region to another, characterized by different average values of the brightness function. They are defined in the domain $A_2$. They are the first example of a curvilinear structure.

(Positive and negative) ridges and hills are defined in various sub-domains into which the domain $A_3$ is preferably divided.

Ridges are curvilinear structures define by a center line, the cross-sections or profiles of which in planes perpendicular to the center line are bell-like curves that can generally be approximated, in the simplest manner, by parabola. Mathematically, the center lines of the regions are determined by condition that the first derivative of the brightness function vanishes in the direction of the bigger eigenvalue of the second differential of the brightness function.

Hills are structures in which the brightness function has a maximum or a minimum and respectively decreases or increases in all directions from said maximum or minimum point. They may in general be approximated in the simplest manner by paraboloid. Mathematically, the central points of the hills and the hollows are determined by the condition of the vanishing of the first differential of the brightness function.

The detailed identification of the structures, particularly in the domain $A_3$, will be described hereinafter for a preferred embodiment of the invention.

7) The curvilinear basic structures are approximated by lines related to their center lines and parameters related to their profiles. This step can be considered as the construction of geometric models.

In this connection, it is important to note that although the basic structures are represented geometrically, essentially by surfaces, those surfaces define, with some approximation, a physical quantity, viz. a brightness or a colour information signal, as a function of geometric variables, viz. two coordinates in the plane of the picture to be compressed. Those structures therefore describe in geometric terms a brightness or signal distribution over the picture surface.

Sometimes the profiles of the curvilinear structures must be defined only in the immediate vicinity of the center line, as will be better explained hereinafter: in fact it is essentially sufficient to define the curvature of the structure at the center line in a plane perpendicular to the center line.

8) Preferably, superfluous structures and/or portions thereof are eliminated. Structures and their portions are considered "superfluous" if their elimination does not substantially affect the quality of the compression, viz. does not cause the reproduced picture obtained by decompressing the compressed data to be unacceptably different from the original. This will be generally true if they are superimposed or almost superimposed to other structures or portions thereof or do not differ from them to a degree defined by appropriate thresholds fixed as provided for in Step 4. Specific criteria will be set forth in describing an embodiment of the invention, but in general can be determine by skilled persons for each type of application, taking into account the quality required for the picture's reproduction. Omission of this step or reduction thereof to a minimum will not damage the quality of the picture reproduction, but may affect the degree of compression and thus render the process less economical. This step further, may be partially concurrent with Step 7 and will be completed in Step 9, hereinafter.

9) The basic structures are represented by mathematical models. This step consists in the approximate representation of the basic structures by mathematical models according to two criteria: a) that the approximation is sufficiently close; b) that the number of data required to define the models be as small as possible. It will be understood that each basic structure could be represented in an exact or almost exact manner by mathematical expressions, but these would in general require an excessive number of parameters for their definition, so that the degree of compression would be relatively low without any significant gain as to the accuracy of the reproduction. Conversely, oversimplified models could be chosen, whereby a very high compression would be obtained but the quality of the reproduction would not be satisfactory. A compromise between the two exigencies of a high compression and a good reproduction quality must be achieved by an appropriate choice of the mathematical models. Examples of such models will be given hereinafter, but it should be understood that it is within the skill of the expert person to construct the appropriate ones for each basic structure and each particular application of the invention, by approximation methods as described herein.

10) The models thus constructed are interrelated, preferably by the omission of part of them, to construct a global model for each cell of the region. The model parts that are omitted are the ones that overlap or that do not contribute anything significant to the quality of the picture reproduction. The criteria to be followed are essentially the same as in Step 8. A number of standard models will be defined for each type of application of the invention, and in any case, to each type of model will be associated a code identifying it, so that each specific model will be identified by its code and a set of parameters specific to it. At this point the compression process has reached the stage of primary compression, the primary compressed data obtained consisting of codes identifying the type of each model and the parameters of each model.

11) Preferably, "filtering" is carried out. This stage consists of the elimination of information that is considered excessive because it has only a little psycho-visual significance. The simplification involves dropping some models completely and eliminating some excessive parameters of the models that are retained. The evaluation of the parameters to be dropped is carried out on the global model, since parameters that are significant on the local basis, viz. if we consider each specific model, lose significance in the global model. In part this operation has been carried out in the construction of the global model, during which parts of the local models are dropped. However, it is verified and completed in this stage.

It should be understood that the steps so far described need not necessarily be completely separate from one another and need not necessarily take place in the order in which they are listed, but variations may be made in said order, and further, one or more steps may be carried out in separate stages and/or in part or in the whole concurrently with another step or steps.

12. Quantization. This step consists in approximating the parameter values of the primary compressed data on the basis of a predetermined set of values, which are limited in number. Each parameter is substituted by the closest value of this set. The criteria for quantization depends on several considerations, such as the degree of compression that is desired, the degree of accuracy or resolution of the compressed picture that is required, the geometric and visual interpretation of the models, and so forth. Some examples of quantization will be given for a specific embodiment of the invention.

13) Encoding. The quantized data are represented in the form of a binary file. This operation is lossless, since when the binary file is decoded, the quantized values of the parameters that have been used to form the binary file are entirely recovered. Certain criteria to be followed in this operation will be described in describing an embodiment of the invention. Huffman-type coding can be used in some cases.

14) Decompression. This consists in reproducing from the binary file the quantized values of the parameters and those values are substituted into a global model representing the brightness function for each region, which will direct a computer to attribute to each point of the compressed picture its appropriate brightness levels.

All the above operations can be repeated severally for the various basic colors, thus obtaining monochrome picture compressions which are combines. Alternatively, transform coding of color data, by methods known in the art, may be carried out and the original monochrome signals corresponding to the RGB system can be completed by transform coding into one monochrome luminance signal and two reduced bandwidth color-information carrying signals.

In a preferred embodiment of the invention, the process steps are carried out as follows.

Step 1

The values of the brightness function $z(x,y)$ are registered.

Step 2

The side "l" of the window is assumed to be 4 pixels. Consequently the grid is constituted by the central points between the pixels. However, it may be preferable to use other or additional values of "l", as will be explained hereinafter.

Step 3

The brightness function $z=f(x,y)$ is approximated by the approximating function $p(x,y)$ which, in this embodiment, is a polynomial of the second degree having the form $p(x,y)=a_{00}+a_{10}x+a_{01}y+a_{20}x^2+a_{11}xy+a_{02}y^2$. The coefficients of the function p are determined by minimizing the square deviation of said function from the function z. The values of the derivatives of z are approximated by the coefficients of $p(x,y)$. All the computations are performed with the machine accuracy of the hardware on which the process is implements. The accuracy of twelve bits and less is sufficient.

Step 4

The following absolute and relative threshold values are preferably used in the embodiment described herein. For each one, three numbers are given. The first two numbers five the bounds, between which the described parameter usually is to be fixed. The third number in parentheses gives the preferred value of the parameter.

$G_{abs}$, $S_{abs}$ (grey levels): 50–250 (100);
$K_{grad}$: 0.1–0.5 (0.2);
$M_{ratio}$: 0.2–0.5 (0.3);
$K_j$: 0.5, 1.2 (0.8);
$D_{center}$: 0.5–1 pixel (0.7 pixel);
$T_{slope}$ (grey values): 20–40 (35);
$D_{segment}$: 2–4 pixels (3 pixels);
$D_{1segm}$: 1–3 pixels (2 pixels);
$D_{2segm}$: 0.3–0.8 pixel (0.5 pixel);
$T_{segm}$: 20°–30° (30°);
$B_{segm}$ (grey levels): 10–30 (20);
$K'_j = 1.2\ K_j$;
$C_1 = 0.8$;
$D_{comp}$: 0.3–1 pixel (0.5 pixel);
r: 1–5 pixel (3 pixels);
$D_{gcenter} = D_{center}$;
$K_{curv} = 1-3$ (2);
$W_{grad} = 2-6$ (3.5);
$M_{ridge}$ (grey levels): 20–60 (30);
$D_{1grad}$: 1–5 pixels (3 pixels);
$D_{2grad}$: 0.2–1 pixel (0.5 pixel);
$\Delta_{grad}$: 6–10 pixels (8 pixels);
$\delta_{grad}$: 20%–50% (30%)
$\delta$: 0.05–0.2 (0.1);
$\kappa$: 0.05–0.2 (0.1);
d: 2–4 pixels (3 pixels);
$F_1, F_2, F_3, F_4$ (grey levels): 5–20 (10);
$Q_1, Q_2, Q_3, Q_4, Q_5, Q_6$: 0.3–1.2 (0.6);
$S_r$ (grey levels): 10–30 (20);
$T_8$: 0.3–1 pixel (0.5 pixel);
$T_9$: 0.1–0.3 (0.2);
$T_{10}$ (grey values): 5–20 (10).

Step 5

At each point of the grid, grid constructed as described hereinbefore, the quadratic form $g(x,y)=a_{20}x^2+a_{11}xy+a_{02}y^2$, which constitutes the second degree part of the approximating function p, is reduced to the principal axes by means of an orthogonal transformation P. P is represented by $$\begin{vmatrix} \beta_{11} & \beta_{12} \\ \beta_{21} & \beta_{22} \end{vmatrix}$$

In the new coordinates x',y', the polynomial $p(x,y)$ takes the form $p(x',y')=a'_{00}+a'_{10}x'+a'_{01}y'+\lambda_1 x'^2+\lambda_2 y'^2$. $\lambda_1$ and $\lambda_2$ are the eigenvalues of the matrix W hereinbefore defined, and $\beta_1=(\beta_{11}, \beta_{21})$, $\beta_2=(\beta_{12}, \beta_{22})$ are the eigenvectors of the same matrix W defined by: $W\beta=\lambda\beta$ or of the second differential $d^2p$, and $a'_{00}=a_{00}$.

The points are assigned to the different domains as follows. The domains $A_1$, $A_2$, and $A_3$ are defined in the following manner.

Given $p(x,y)=\Sigma a_{ij} x^i y^j$ (for $i+j\leq 2$), the matrix P, the coefficients $a'_{ij}$, $\lambda_1$, $\lambda_2$ and $\beta_1$ and $\beta_2$ can be computed by various well known computation procedures. For $\lambda$ approximately equal to $\lambda_2$ the computation of P and $\beta$ may become insufficiently accurate. In this case the matrix P is not computed and is merely defined to be equal to I (identity matrix).

Denote by $\nabla f$ the vector $(a_{10}, a_{01})$ of the gradient of $p(x,y)$ at each point of the grid $$|\nabla p| = \sqrt{a_{10}^2 + a_{01}^2} = \sqrt{a'^2_{10} + a'^2_{01}}$$

since the transformation P is orthogonal. Denote by $M_1=$the mean value of the $|\nabla f|^2$ over all the grid points in the region.

The set $A_1$ is defined as the set of those points of the grid, for which: $|\nabla f|^2 < G_{abs}$, $\lambda_1^2+\lambda_2^2 < S_{abs}$.

The thresholds $G_{abs}$, $S_{abs}$ usually take values between 50 and 250. IN this example we assume $G_{abs}=100$, $S_{abs}=100$.

The set $A_2$ is defined as the set of those points of the grid for which:

$|\nabla f|^2 \geq \max [G_{abs}, G_{rel}]$, where $G_{abs}$ is as above, and $G_{rel}= K_{grad} \cdot M_1$. Typical values of the parameter $K_{grad}$ are between 0.1 and 0.5. IN this example we assume $K_{grad}=0.2$.

The thresholds $G_{abs}$, $S_{abs}$ and $K_{grad}$ above, as well as $K_j$, $j=1, \ldots, 5$, $M_{ratio}$ which will be defined below, are the parameters of the detection of the basic structures, which must be fixed for each region of the picture. Their usual and preferred values, for the present application, will be indicated.

The set $A_1$ will serve as the basis for constructing the smooth regions and the background. The set $A_2$ will be used for construction of the edges.

The set $A_3$ is then constructed, wherein the (white and black) ridges, (white and black) hills and, in this embodiment, saddles will be identified. At the ridge points one eigenvalue is big, and the second small and the derivative in the direction of the biggest eigenvalue is zero. At hills and hollows, $dp=0$, and both eigenvalues are big and have the same sign. At the saddle points, $dp=0$ and both eigenvalues are big and have opposite signs. The values of dp and of the eigenvalues identify the said basic structures as far as the invention is concerned.

The eigenvalues are always ordered in such a way that $|\lambda_1| \geq |\lambda_2|$.

The conditions that divide the domain $A_3$ into five subdomains $A_{3j}$, j being 1 to 5, have already been set forth. The points of the various subdomains form the basic structures of this domain as follows:

$|\lambda_2/\lambda_1|<M_{ratio}$, $\lambda_1+\lambda_2<0$-white ridges- (1)

$|\lambda_2/\lambda_1|<M_{ratio}$, $\lambda_1+\lambda_2<0$-black ridges- (2)

$|\lambda_2/\lambda_1|\geq M_{ratio}$, $\lambda_1<0$, $\lambda_2<0$-white hills- (3)

$|\lambda_2/\lambda_1|\geq M_{ratio}$, $\lambda_1<0$, $\lambda_2<0$-black hills or "hollows"- (4)

$|\lambda_2/\lambda_1|\geq M_{ratio}$, $\lambda_1 \cdot \lambda_2<0$-saddle points- (5)

The threshold $M_{ratio}$ usually takes values between 0.2 and 0.5 and typically 0.3.

Denote as $M_{2j}=$the mean value of $\lambda_1^2+\lambda_2^2$ over the grid points in the region where $\lambda_1$ and $\lambda_2$ satisfy one of the above five conditions, viz. the condition (j) wherein $j=1, \ldots, 5$.

Let $A_{3j}$ be the set of gridpoints in the region where $\lambda_1$ and $\lambda_2$ satisfy the condition (j) and $|\nabla f|^2 < \max [G_{abs}, G_{rel}]$, $\lambda_1^2+\lambda_2^2 \geq \max [S_{abs}, S_{jrel}]$. Here the thresholds $G_{abs}$, $G_{rel}$, $S_{abs}$ are as defined above, $S_{jrel}=K_j \cdot M_{2j}$. The typical values of the parameters $K_j$, $j=1, \ldots, 5$, are between 0.5 and 1.2, or typically $J_j=0.8$.

An easy alteration (instead of $\lambda_1/\lambda_2$, $\lambda_1/\lambda_2+\lambda_2/\lambda_1$ is used) makes all the quantities computed till now homogeneous and symmetrical expressions in $\lambda_1$ and $\lambda_2$. Hence they can be expressed in terms of the initial coefficient $a_{ij}$, without performing the reduction to the principal axes. Thus, the computations can be arranged in such a way that the reduction will be performed only at the points of the (usually small) set $A_3$.

The identification of the ridges, hills and saddles will now be described exemplified for an embodiment of the invention.

In a new coordinates system (x',y') the polynomial $p(x',y')$ is given by $p(x',y')=a'_{00}+a'_{10}x'+a'_{01}y'+\lambda_1 x'^2+\lambda_2 y'^2$.

On the sets $A_{31}$ and $A_{32}$ we perform an additional transformation $$x''=x'+a'_{10}/2\lambda_1, \ y''=y'.$$

We get:

$$p(x'',y'')=a''_{00}+a'_{01}y''+\lambda_1 x''^2$$

(Note that by the definition of $A_{3j}$, $|\lambda_1|$ is big).

We say that the considered gridpoint is part of a white (black) ridge if it belongs to $A_{31}$ ($A_{32}$, respectively) and $|a'_{10}/2\lambda_1|<D_{center}$, $|a'_{01}|<M_{slope}$. Here the thresholds $D_{center}$ and $M_{slope}$ usually take the values 0.5 pixel$\leq D_{center} \leq 1$ pixel, and $20 \leq T_{slope} \leq 40$. In this embodiment we assume $D_{center}=0.7$ pixel, $T_{slope}=35$.

We associate to such a gridpoint a white (black) segment (of unit length), centered at the point x''=0, y''=0 (in the new coordinates x'', y'') and directed along the y'' axis in this new coordinate system. We also associate to this gridpoint the values $\lambda_1$ and $a''_{00}$. The segments thus constructed approximate the ridge lines, since at them the derivative of f and of its approximating function p in the direction of the biggest eigenvalue is zero.

The condition $|a'_{10}/2\lambda_1|<D_{center}$ is caused by the fact that p approximates f in a reliable way only near the center of the square having the size "l" and therefore, the ridge is detected in a reliable way only if it is close enough to the center of the square, and $|a'_{10}/2\lambda|$ is the distance of the ridge from said center.

On the gridpoints, belonging to the sets $A_{33}$, $A_{34}$, $A_{35}$, we perform an additional transformation:

$$x''40 = x'', \ y''=y''+a'_{01}/2\lambda_2$$

(On these sets, both $\lambda_1$ and $\lambda_2$ are big).

We get: $p(x''',y''') = a'''_{00} + \lambda_1(x''')^2 + \lambda_2(y''')^2$.

We say that the considered gridpoint represents a positive (white) hill, a negative (black) hill (hollow) or a saddle point, if it belongs to $A_{33}$, $A_{34}$ or $A_{35}$, respectively, and $|a'_{01}/2\lambda_1| < D_{center}$ $|a'_{01}/2\lambda_2| < D_{center}$ Here $D_{center}$ is the same parameter as above. We associate to such a point the center of the new coordinate system $x'''$, $y'''$, the value $a'''_{00}$ and the values $\lambda_1$, $\lambda_2$, and the direction of the eigenvectors $\beta_1$, $\beta_2$ as defined above.

The center of the new coordinate system is the point where dp=0. Once more, this center should be close enough to the center of the cell for the detection to be reliable.

To each positive or negative hill or saddle point, we also associate a unit segment, centered at the center of the new coordinate system $x'''y'''$, and directed along the $y'''$ axis.

All the segments obtained are separated into two sets: "white" segments, for which $\lambda_1 < 0$, and "black" ones, for which $\lambda_1 > 0$.

The segments constructed by now correspond to the positive and negative ridges, the positive and negative hills and to the saddle points. Although by definition only ridges represent curvilinear structures, both hills and saddle points, if prolonged can visually represent a part of a curvilinear structure and be processed as such. Since curvilinear structures form the most coherent and compact elements in picture description, it is desirable to include as many details as possible in simple curvilinear structures, instead of representing them as separated local elements.

Therefore, on this stage we consider all the segments obtained as potential representation of the "ridge lines" and attempt to construct from them maximally extended geometrically simple compounds.

Step 6

Structure components are constructed in this step. Each component consists of an orderly array of closely related segments of the same "color". Herein, we consider white segments. The construction of the black ones is completely similar.

Each segment constructed is characterized by its central point (which was defined in local coordinates for each lxl square; this point is not necessarily one of the gridpoints), and by its direction. Also the approximate grey level value $a''_{00}$ at this central point and the biggest eisenvalue $\lambda_1$ are associated to each segment. We now carry out the following steps.

1. Regardless of the origin of each segment in a certain lxl—square, we represent now all the segments by the coordinates of their central points in the global coordinate system, viz. the coordinate system originally associated with the RxR region on which we operate, and by the angles with respect to the global coordinate system. The set of segments if ordered, for example, by the natural ordering of lxl—squares of their origin.

2. We consider the first segment $s_1$ and associate to it all the "neighbouring" segments $s_j$, viz. those segments whose centers are closer to the center of $s_1$ than $D_{segm}$. The threshold $D_{segm}$ usually takes values between 2 and 4 pixels. Here we assume $D_{segm} = 3$ pixels.

For each segment among the neighboring segments $s_j$, we check the following conditions (see explanatory FIG. 1):

i. The distance $d_1$ between the center of $s_1$ and the projection of the center of $s_j$ onto the $s_1$, is less than $D_{1segm}$.

ii. The distance $d_2$ between the center of $s_j$ to its projection onto $s_1$ is less than $D_{2segm}$.

iii. The angle between the directions of $s_1$ and $s_j$ is less than $T_{segm}$.

iiii. The difference between the grey levels $a_{00}$ associated to $s_1$ and $s_j$ does not exceed (in absolute value) $B_{segm}$.

3. The thresholds $D_{1segm}$, $D_{2segm}$, $T_{segm}$, $B_{segm}$, have approximately the following usual and preferable values:

$D_{1segm} = 1-3$ pix., preferably 2, $D_{2segm} = 0.3-0.8$, preferably 0.5 pix., $T_{segm} = 30°$, $B_{segm} = 10-30$, preferably 20 grey levels.

4. Those among the $s_j$, which satisfy all the conditions, i, ii, iii, iiii, are included into the component constructed.

On $s_1$ one of two possible directions is fixed. Then the included segments are ordered according to the order of the projections of their centers on $s_1$, and on each of them one of two possible directions is chosen in a way coherent with $s_1$.

5. We take the first and the last segments with respect to the order introduced, and for each of them we repeat the operations 1–4, adding segments which are still free (i.e., do not belong to the component under construction or to other components.

6. We order the segments, added to the first one, and the segments already in the component, according to the order to the projection of their centers on the first component. The same for the last component. In this way we order all the segments of the component under consideration.

7. We take the first and the last segment and repeat the operations 1–5.

8. We repeat the aforesaid operations until no free segments can be added to the component. This completes construction of the component, which is represented by an ordered array of segments of the same colour.

9. We take the first among the remaining free segments and repeat operations 1–8, constructing the next component.

As it was explained above, we try to construct a small number of long components instead of the big number of short ones. As a result, it is desirable to have more segments available. Therefore the values of the thresholds $K_j$ and $D_{cent}$, given above, are rather "liberal". As a result, some components can be constructed which represent visually insignificant structure. To remove these components, the following procedure is applied:

1. We construct an array of "strong segments", repeating all the operations described, but with the thresholds $K'_j$ greater than $K_j$. By construction, each strong segment is also a regular segment, and thus the array of strong segments is a subarray of all the regular segments.

2. We construct the components from the regular segments, but then we drop each component which does not contain at least one strong segment.

The preferable values of $K'_j$ are about 1.2 times bigger than $K_j$.

Components, constructed above, represent the ridges detected. The hills and hollows, found as described above, represent the corresponding simple local structures. In principle hills and hollows are not curvilinear structures and are detected separately from the ridges, as described above. However, by construction, some part of hills and hollows can appear exactly on the components constructed. If their width is approximately the same as the width of the corresponding ridge, they can be omitted.

Thus, the hill (hollow) is omitted if the corresponding segment belongs to some component, and the bigger eigenvalue $\lambda_1$ at this point satisfy $|\lambda_1| \geq C_1 \Lambda$, where $\Lambda$ is the mean value of $\lambda_1$ over the segments of the component, and $C_1$ is a threshold. Usually $C_1 = 0.8$.

This operation, however, essentially belongs to Step 11 (filtering).

Step 7

The operations described in this stage are essentially approximation operations. It is to be understood that they need not necessarily be performed at this stage, but may in part or on the whole be performed at an earlier or at a later stage.

1. The components that have been constructed are subdivided into the parts which satisfy the following condition: the projection of all the segments of the component onto the interval, joining the central points of the first and the last segments, should be one-to-one and in the order defined above. We check whether the condition is satisfied starting form the second segment and continue with the following segments until we find one which does not satisfy the condition. The beginning of this segment is the point which mark the passage from the component part considered to another one. The process is then repeated starting from said point. FIG. 2 shows an example of the construction of a component part.

2. Now we approximate components, up to required accuracy, by polygonal lines. This is done as follows, with reference to FIG. 3:

a) We construct the interval, joining the centers A and B of the first and the last segments of the component part constructed as under 1.

b) We find the segment on the component part for which the distance d of its center C to AB is maximal. If $d < D_{comp}$, the procedure is completed, and the internal AB provides the required approximation. If $d \geq D_{comp}$, we consider the intervals AC and CB and repeat the procedure with each part AC and CB of the component separated.

c) This subdivision process is continued until the component is approximated by a polygonal line, joining the centers of some of its segments, with the following property (see FIG. 4): for each segment of the component, the distance of its center to the corresponding interval of the polygonal line, is less than $D_{comp}$. In this embodiment, the threshold $D_{comp}$ is usually equal to approximately 0.3 to 1 pixel, preferably 0.5.

By now, each component is approximated by the polygonal line, joining the centers of some of its segments. This polygonal line is a geometric submodel, representing the central line of the ridge.

In order to define the profile, the following two numbers are associated with each interval $I_i$ of the approximating polygonal line: $\lambda_i = \lambda_{Ii}$, which is the mean vale of $\lambda_1$ over all the segments between those whose centers the interval $I_i$ joins, including the end segments (remember that all the segments of each component are ordered); $a_i = a_{Ii}$, which is the mean value of the brightness $a''_{00}$ over the same segments as above.

Finally, each ridge component in $A_3$ is represented by:

the ordered array of the vertices $P_i$ of the polygonal line (i.e., the endpoints of the intervals of this line). These points are given by their global coordinates in the region.

the ordered arrays of the numbers $\lambda_i$ and $a_i$, defined as above.

The said numbers defined the profile of the ridge, specifically its level coordinates (brightness values=$a_i$) and its curvature in the vicinity of the center line ($\lambda_i$). Theoretically, the curvature is defined in an infinitesimal interval about the point of the center line considered and perpendicularly thereto, but here we deal with finite, though small, intervals and therefore the curvature defines the profile in an interval in the order to the distance between adjacent pixels, which, for the purposes of these operations, is the smallest significant interval.

The identification and approximation of edges will now be described. As stated, the set $A_2$ has been defined by $|\nabla p|^2 \geq \max [G_{abs}, G_{rel}]$, and thus consist of the gridpoints, where the gradient $\nabla p$ is "big".

However, the set $A_2$ is spread around the regions of a high slope of $z = f(x,y)$, and does not by itself represent the central lines of the edges. Therefore, we perform first a certain filtering of the points in $S_2$, trying to screen out the points far away from the edge's central lines.

Consider a point in $A_2$ and let $p(x,y) = a_{00} + a_{10}x + a_{01}y + a_{20}x^2 + a_{11}xy + a_{02}y^2$ be the approximating polynomial computed at this point. $\nabla f$ by definition is the vector $(a_{10}, a_{01})$. We consider the set of values which p assumes on the line Q, parallel to $\nabla f$ passing through said point, and find the vertex of the parabola, defined by said set of values. If the distance of this vertex from the said point is smaller than $D_{gcenter}$, the gridpoint is excluded from the set $A_2$, and we pass to the next gridpoint in $A_2$. Here, the threshold $D_{gcenter}$ is usually equal to $D_{center}$ defined above. Thus, we exclude from consideration the points which are too close to the sides of the edges. In this way, $D_{gcenter}$ determines the minimal width of the edges which can be recognized.

For each of the remaining points we compute the number $$\kappa = \frac{2|a_{20}(a_{01})^2 - a_{11} \cdot a_{10} \cdot a_{01} + a_{02}(a_{10})^2|}{((a_{01})^2 + (a_{10})^2)^{3/2}}$$

Mathematically, $\kappa$ is the curvature of the level curve of $p(x,y)$ at $(0, 0)$, viz. the curve defined by $p(x,y) = p(0,0)$. It approximates the curvature of the center line of the edge at this point. We drop the points where $$\kappa > K_{curv}$$

where $K_{curv} = 1-3$ or typically 2.

Thus, we omit the highly curved edges which usually appear around small local patches, which we have earlier identified as hills or hollows. The remaining gridpoints form a smaller set $A_2'$, at which the more detailed analysis is performed.

At each gridpoint of $A_2'$ we construct a polynomial $q(x,y)$ of degree 3, providing the minimum of the square deviation $\Sigma[f(x,y) - q(x,y)]^2$ over all the pixels of the $l \times l'$—cell, centered at this gridpoint. The parameter $l'$ is usually slightly bigger than 1. In this embodiment $l' = 6$.

This polynomial is restricted to the straight line Q passing through the origin (the gridpoint) in the direction of $\nabla f = (a_{10}, a_{01})$, viz. the values with the polynomial assumes on the line Q are considered as a function of the distance of their projections on the line Q from the origin (variable t). We get a polynomial q of degree three of the variable t. These operations are illustrated in FIG. 5. We find the points of extrema (maximum and minimum points) of $q(t)$, $t_1$ and $t_2$, by solving the quadratic equation $q'(t) = 0$, and the values $\alpha_1 = q(t_1)$, $\alpha_2 = q(t_2)$.

The following condition is checked: $t_1$ and $t_2$ exist, $t_1 > 0$, $t_2 < 0$, and $|t_1|$ and $|t_2|$ do not exceed $W_{grad}$. Here the threshold $W_{grad}$ determines essentially the maximal width of the edges that can be detected in a reliable way. Usually, $W_{grad}$ is approximately equal to ½ $l'$. In this embodiment $W_{grad} = 2-6$, preferably 3.5. (Alternatively, one can check the condition that both the points $t_1$ and $tz_2$ on the line Q belong to the $l' \times l'$—cell considered.)

If the condition set forth above is not satisfied, the gridpoint is excluded from the set $a_2'$, and we pass to the next gridpoint.

If the condition is satisfied, we associate to the grid point considered the following object called an "edge element"):
1. The unit segment $I^e$ centered at the point C in FIG. 6, which is the central point of the interval $[t_1, t_2]$ on the line Q, and directed in an orthogonal direction to $\nabla f$ (i.e., in the direction of the edge). 2. The segment $[t_1, t_2]$ of the line Q (by construction, this segment is centered at the same point C, and is directed along $\nabla f$). We also associate to each edge element two values $\alpha_1$ and $\alpha_2$. $\alpha_1 = q(t_1)$ and $\alpha_2 = q(t_2)$.

Step 8

The following operations are designed to detect geometric connections between the ridges, found before, and the edges under construction, to eliminate superfluous data.

Consider the example, illustrated in FIG. 7, a and b. Therein the broken lines denote the ridge components, detected earlier, and the marks ▼ denote the segment $I^e$, detected as described hereinbefore and shown in FIG. 6. The lines $l_1$ and $l_2$ in FIG. 7b usually appear on sides on sides of edges, because of the typical profile of the edge, illustrated in FIG. 8. They can be omitted from the data, since the required profile is detected as described in Step 7, and can be reconstructed from the data thus obtained.

Figure 7A:
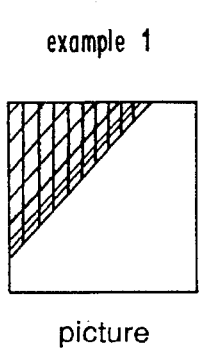
Figure 7B:
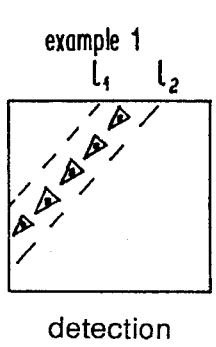
Figure 7C:
Figure 7D:
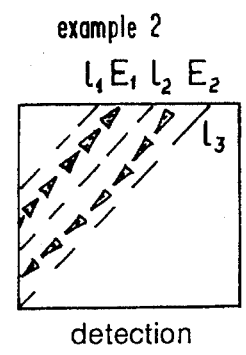
Figure 8:
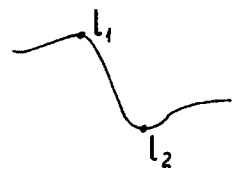

In the example of FIG. 7c and d, the edges $E_1$ and $E_2$ are detected on both sides of the ridge $l_2$. The lines $l_1$ and $l_3$ have the same nature as the lines in the first example. Here the lines $l_1$ and $l_3$ and the edges $E_1$ and $E_2$ can be omitted.

Ridges and edges that are particularly closely related will be said to have an "adherency" relationship. To detect such relationships, we proceed as follows:

1. The ridge components, detected earlier, are stored in a certain order. We start with the first component. It is represented by an ordered array of segments.

Figure 9:
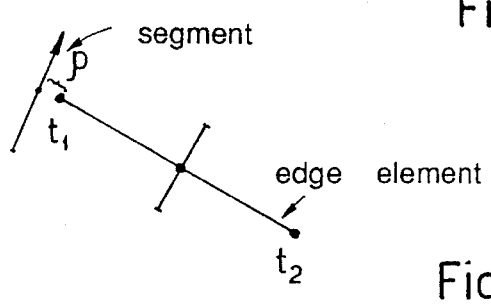

2. For each segment in this array, those edge elements are considered whose centers are closer to the center of the segment than $D_{1grad}$. $D_{1grad}=1-5$, preferably 3 pixels. This procedure is illustrated in FIG. 9.

3. Then, the following condition is checked (see FIG. 9): if the segment is a white (black) one, the distance $\rho$ is computed between its center and those from the points $t_1$ and $t_2$ of the edge element which is the maximum (minimum) of the corresponding profile. If $\rho \geq D_{2grad}$, we pass to the next from the edge elements above. If $\rho < D_{2grad}$, the edge element is marked as "adherent" to the segment considered, and the segment is marked as "adherent" to edge elements from the side, where the center of the edge element lies. Here $D_{2grad}=0.2-1$, preferable 0.5 (It should be remembered that the segments are oriented.). Then we pass to the next edge element and repeat the procedure. (If the segment is already marked, this mark is not changed.) When all the edge elements, chosen as described in 1 are checked, we pass to the next segment of the compound.

4. After all the segments have been processed, the following data are obtained:

a. Each segment of the component considered is marked as "adherent" or "unadherent" on each of its sides.

b. Some of the edge elements are marked as "adherent" at one of the points $t_1$ or $t_2$.

5. Now all the segments of the component under consideration are processed once more in the following way:

Starting from the first segment (in their standard order), the segments are checked until the first segment marked as adherent from the left appears (simultaneously, exactly the same procedure is performed on the right side). The number of this segment is memorized. If the distance of its center from the center of the first segment in the component is greater than the $\Delta_{grad}$, the center of this segment is marked as the partition point. $\Delta_{grad}$ is a threshold, the value of which is usually between 6 and 10 pixels. In this embodiment $\Delta_{grad}=8$.

Then the next segment marked as adherent from the left is found. If the distance of its center from the center of the previous segment, marked from the left, is greater than $\Delta_{grad}$, both its center and the center of the previous segment are marked as the partition points. If not, the next segment marked from the left is found and the procedure is repeated.

Exactly the same procedure is simultaneously perform on the right side of the component.

Figure 10:
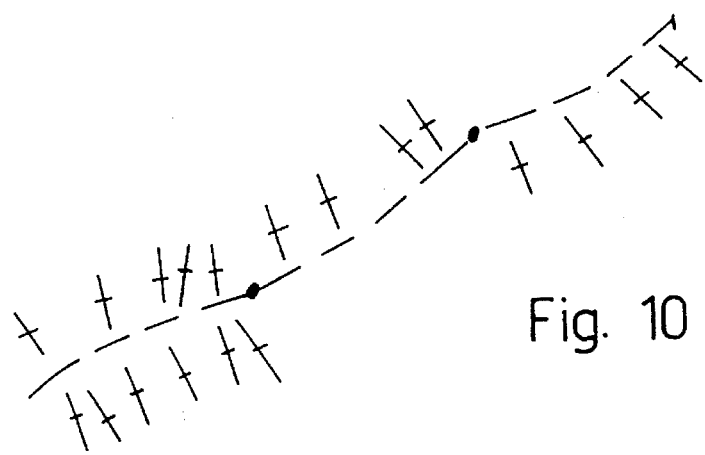

6. As a result, the component is divided into subcomponents by the partition points found as described. For each subcomponent on each side, by construction the adherent segments are either uniformly denser than $\Delta_{grad}$, or uniformly sparser than $\Delta_{grad}$. See FIG. 10.

7. For each subcomponent the proportion of the marked segments to all the segments is computed on each side.

Now several cases are distinguished:

a) If the marked segments are $\Delta_{grad}$—dense on both sides, the subcomponent is preserved, and the marking of the edge elements, adherent to its segments, is preserved.

b) If the marked segments are $\Delta_{grad}$—dense on one side, and on the second side the proportion of the marked segments is less than $\delta_{grad}$ when $\delta_{grad}$ is a parameter of values between 20% and 50%, preferably 30%, the subcomponent is omitted, and the marking of the edge elements adherent to its is canceled.

If the proportion is larger than or equal to $\delta_{grad}$, we proceed as in a).

c) If the marked segments are $\Delta_{grad}$—sparse on both sides of the subcomponent, we proceed as in a).

8. for each subcomponent which has not been omitted, the following numbers are computed:

leftvalue, equal to the mean value of $\alpha_1$ or $\alpha_2$ on all the edge elements adherent from the left (from $\alpha_1$ or $\alpha_2$ take the value corresponding to the free end of the edge element).

leftwidth-the mean value of the length of the intervals $[t_1, t_2]$ for the edge elements, adherent from the left.

and similarly for the right hand side of the subcomponent.

9. Now we pass to the next ridge component and repeat all the operations 1–8, and so on, until all the components have been processed.

As a result each component has been subdivided into subcomponents, a part of these subcomponents has been omitted, and for the rest the data as in 8 has been computed. All the edge elements are still preserved and some of their extreme points $t_1, t_2$ are marked as adherent.

Figure 11:
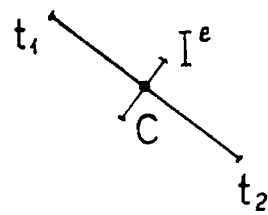

At this stage all the edge elements are omitted which are marked at at least one of their extreme points. The surviving "free" edge elements are used now to construct "edge components". Remember that each edge element consists of the interval $[t_1, t_2]$ and the segment $I^e$—see FIG. 11—centered at the center of C of $[t_1, t_2]$ and orthogonal to it (thus, $I^e$ is directed along the edge, which is orthogonal to the direction of $[t_1, t_2]$.

Now the array, consisting of all the edge segments $I^e$, is formed. All the operations, described hereinbefore for the construction of components (Step 6) above are applied to the segments $I^e$. Only the condition iiii in operation 2 for said construction is omitted. The $D_{1segm}, D_{2segm}, T_{segm}$, are replaced by the parameters $D\sim_{1segm}, D\sim_{2segm}, T\sim_{setm}$, whose values are usually the same.

As a result, a number of edge components is constructed.

10. At this stage the procedure described in Set 7 for the division of ridge components into parts and their approximation by polygonal lines is applied to the edge components. The parameter $D_{comp}$ is replaced by $D_{edge}$, whose typical values are between 0.3 and 1, typically 0.5

As a result, each edge component is approximated by the polygonal lines joining the centers of some of its segments. This polygonal line is a submodel, representing the central line of the edge.

In order to construct the profile, the following three numbers are associated to each interval $J_j$ of the approximate polygonal line:

$min_j$, which is the average value of all the minima of the edge elements, constituting the part of the component between the ends of $J_j$ (i.e. the average of the minima of $\alpha_1, \alpha_2$).

$max_j$, which is the average value of all the maxima, respectively (i.e. the average of the maxima of $\alpha_1, \alpha_2$).

$width_j$, which is the average value of all the lengths $|t_2-t_1|$ over the same edge elements.

Finally, each edge component is represented by:

the ordered array of the vertices $P_i$ of the polygonal line (i.e., the end points of the intervals $J_j$). These points are given by their global coordinates on the region.

the ordered array of the numbers $min_j$, $max_j$, $width_j$.

The operations, described above, can be implemented in two variants:

a) After construction of the ridge components, they are subdivided and approximated by polygonal lines (approximation procedure). Then the procedure for the construction of edge lines is applied to each subcomponent obtained in this subdivision, separately. It can cause the further subdivision of the subcomponents and their corresponding approximation by polygonal lines.

b) The procedure for the construction of edge lines is applied to the entire ridge components; it produces a certain subdivision of each component into subcomponents. Then the approximation procedure is applied to each subcomponent separately.

In each case, in addition to the numbers $\lambda_i$ and $a_i$, associated to each interval $I_i$ of the approximating polygonal line, we associate to each interval also the numbers $leftvalue_i$, $leftwidth_i$, $rightvalue_i$, $rightwidth_i$, determined as described. The averaging here is done over all the edge elements, adherent to the ridge segments in the interval $I_i$.

Figure 12:
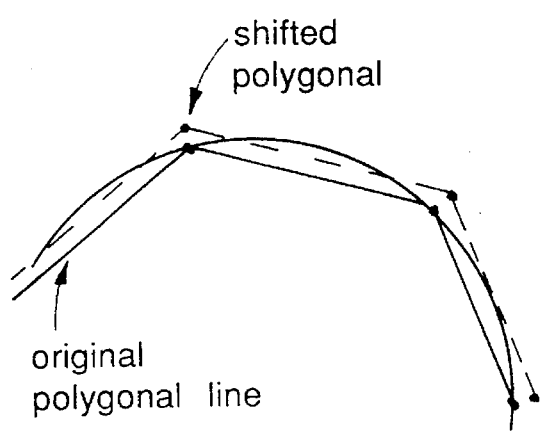

The approximation procedure can be modified to give a better visual approximation to the components which are curved—see FIG. 12.

The subdivision points can be shifted into the convexity direction of the component, thus diminishing the distance from the component to the approximating polygonal line roughly twice.

In the model construction stage hereinafter we describe the models and methods which utilize the information obtained in the detection stage, only in a partial way. In particular, the following alterations can be made:

Each ridge component (or an interval in its polygonal approximation) has the adherent edge elements on the right and on the left of it. The "widths" $|t_2-t_1|$ of these edge elements can be used to approximate the corresponding ridges by the models with the variable width (see FIG. 13):

Each edge component (or an interval in its polygonal approximation) is constructed from the edge elements. Their width allow for approximation of the edges by the variable width models (see FIG. 14):

The edge profile analysis as described hereinbefore neglects an information obtained by approximation by polynomial q, viz. its maximum and minimum values, unless both the profile extrema are within the distance $W_{grad}$ (or l') from the gridpoint under consideration. This restricts the width of the edges detected to approximately $W_{grad}$, or l', which in the present realization are of the order of 5–6 pixels.

However, the profiles of the form shown in FIGS. 15a, b, and c, can be used to detect wider edges, by analyzing the adherency relations among the corresponding edge elements illustrated in FIGS. 16a and b.

Figure 17:
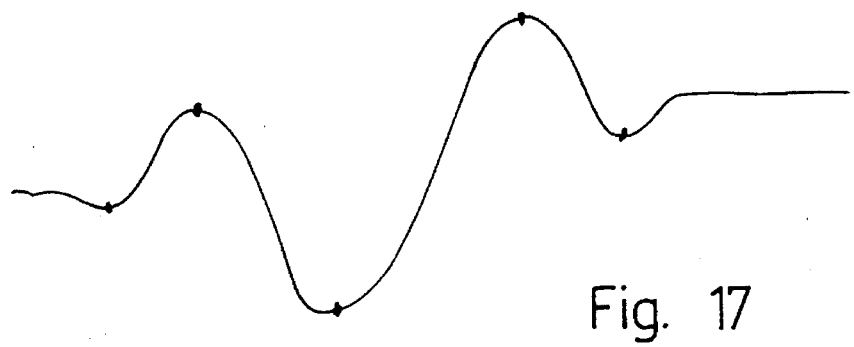

The numbers leftvalue, rightvalue, etc., computed for each component (or an interval of the polygonal line), together with the marking of the edge elements, allow for a construction of curvilinear structures, more complicated than those used above. For example, the profile like that shown in FIG. 17, which is typical for many pictures, can be easily identified and approximated, using the "end adherency" marking of the edge elements, their widths and the numbers leftvalue, rightvalue etc., providing the grey levels of the profile at the extrema.

Figure 18:
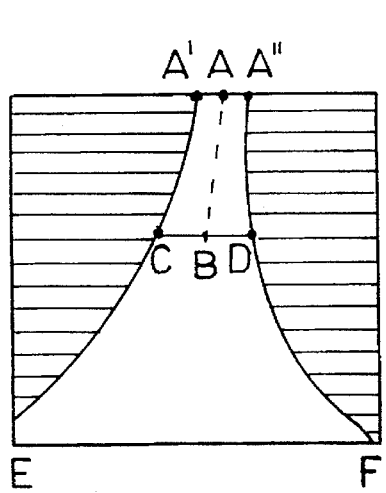

In the implementation described here—see FIG. 18—we omit the edge components adherent to the surviving ridge components. This operation increases the compression ratio, but in some cases it can cause quality problems. The part A'AA"DC—FIG. 18—is represented by a ridge on the ridge component AD, while CE and DF are represented by edge components. This can cause a visually appreciable discontinuity in the shape of the lines A'CE and A"DF on the picture.

An appropriate choice of the parameters reduces this effect to a completely acceptable level.

However, another realization is possible where the gradient components CA' and DA" are memorized and used to correct the representation of the element CA'A". The decrease of the compression ratio, caused by storing this additional information, is eliminated almost completely by the fact it is correlated with the rest of the data.

This involves representing basic structures by mathematical models.

By now the following output has been produced by the preceding process steps:

1) Ridge polygonal lines. To each interval $I_i$ on such a polygonal line, the numbers $\lambda_i$, $a_i$, $leftvalue_i$, $leftwidth_i$, $rightvalue_i$, $rightwidth_i$ are associated.

2) Edge polygonal lines. To each interval $J_j$ on such a line, the numbers $min_j$, $max_j$ (together with the indication of what side of the component max (min) are achieved), $width_j$ are associated.

3) Hills (hollows). Each one is given by the point (represented by its global coordinates on the region), $\lambda_1$ and $\lambda_2$, $|\lambda_1| \leq |\lambda_2|$ (For hills, $\lambda_1 < \lambda_2 < 0$, for hollows $\lambda_1 > \lambda_2 > 0$), and the angle $\theta (0 \leq \theta < 180°)$, between the direction of $\lambda_2$ and the first axis of the global coordinate system on the region.

4) The set $A_1$ of the "smooth" or the "background" points on the grid; at each gridpoint belonging to $A_1$, the value $a_{00}$ (the degree zero coefficient) of the approximating polynomial $p(x,y)$ is stored.

Figure 19:
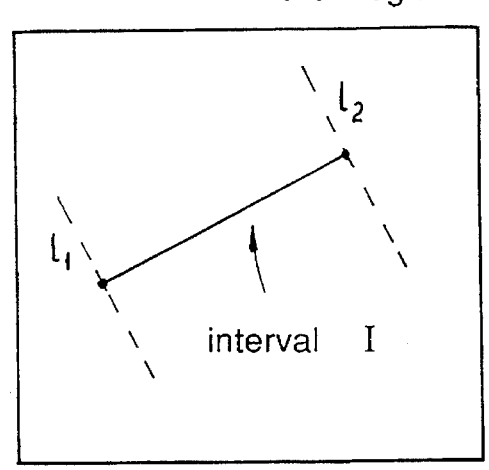

Basic models that can conveniently be used will now be described. The following model is used to represent a ridge over one interval of the corresponding polygonal line—see FIG. 19.

Assume that the interval I is given by the equation (in the global coordinate system u, v on the regions):

$$\alpha u + \beta v + c = 0, \quad \alpha^2 + \beta^2 = 1,$$

and the two lines $l_1$ and $l_2$, orthogonal to I and passing through its ends are given by $-\beta u+\alpha v+c_1=0$, $-\beta u+\alpha v+c_2=0$ (notice that $c_2-c_1$ is the length of I, assuming that $c_2>c_1$). Then the model $\Phi_{Iridge}$ (u,v) is defined by $$\Phi_{Iridge}(u,v) = \begin{vmatrix} \psi_r(\alpha u + \beta v + c), \text{ for} \\ c_1 - \delta(c_2 - c_1) \leq \beta u - \alpha v \leq c_2 + \delta(c_2 - c_1) \\ 0, \text{ for } \beta u - \alpha v < c_1 - \delta(c_2 - c_1), \\ \text{or } \beta u - \alpha v > c_2 + \delta(c_2 - c_1). \end{vmatrix}$$

There, $\delta$ is a parameter between 0.05–0.2, preferably 0.1.

Figure 20:
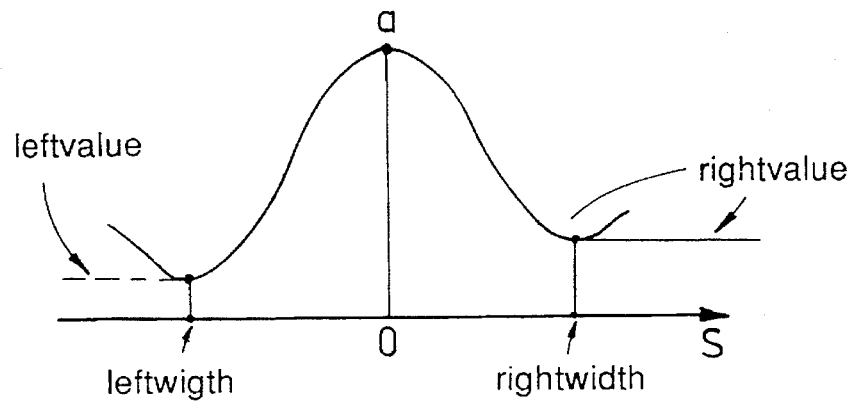

The function $\psi_r(s)$ ($s=\alpha u+\beta v+c$) can be chosen in various ways. In the most accurate approximate mode it must satisfy the following properties—see FIG. 20:

$$(*) \begin{vmatrix} \Psi_r(-\text{leftwidth}) = \text{leftvalue} \\ \Psi_r(\text{rightwidth}) = \text{rightvalue} \\ \Psi_r(0) = \alpha \\ \frac{d^2}{ds^2} \Psi r(0) = \lambda \end{vmatrix}$$

In particular, the following function can be used as $\psi_r(s)$: the 5th order spline function. $\psi_r$, satisfying conditions (*), being once continuously differentiable, and having zero derivatives at leftwidth, rightwidth and 0.

The information, concerning each ridge (left-right values and widths, $\lambda$) is redundant, and usually one can use much simpler models, utilizing only a part of this information. In particular, one can take $\psi_r(s)=a+\lambda s^2$. Thus we have $$\Phi_{Iridge}(u,v) = \begin{vmatrix} a + \lambda(\alpha u + \beta v + c)^2, \text{ for} \\ c_1 - \delta(c_2 - c_1) \leq \beta u - \alpha v \leq c_2 + \delta(c_2 - c_1) \\ 0, \text{ for } \beta u - \delta v < c_1 - \delta(c_2 - c_1), \text{ or} \\ \beta u - \delta v > c_2 + \delta(c_2 - c_1) \end{vmatrix}$$

Figure 21:
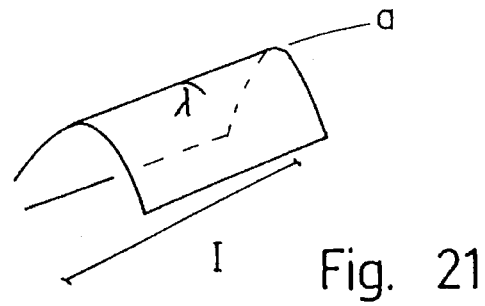

Thus, the model is given by a parabolic cylinder with the axis I, the coefficient $\lambda$ and the height a on the axis, see FIG. 21.

Figures 22A, 22B, 22C:
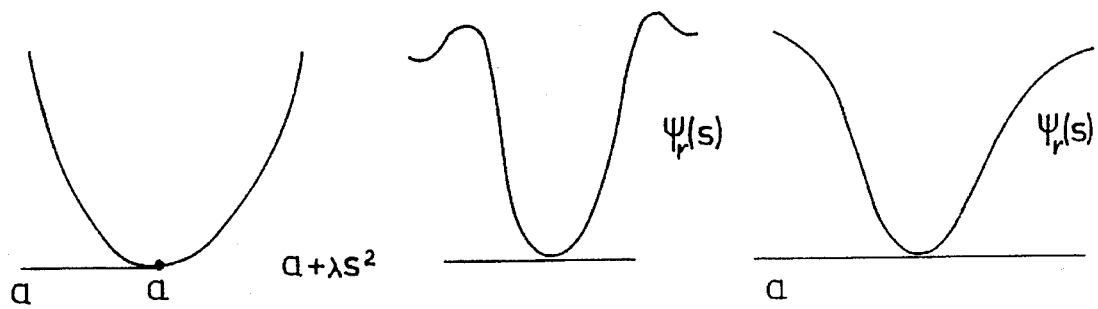
Figure 23:
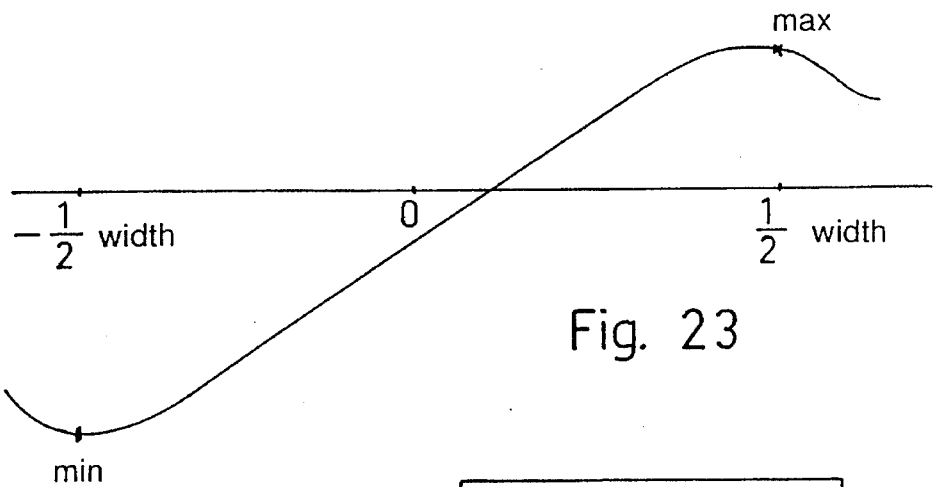

Various modifications of this model can be used with no changes in the rest of the process. For example, the quadratic function $a+\lambda(\alpha u+\beta v+c)^2$ can be replaced by any function $\psi_r(s)$ of $s=\alpha u+\beta v+c$ (which is the distance of the point (u,v) to the line I), having approximately the same shape, height and curvature—see FIG. 22.

Instead of the abrupt vanishing out of the $\delta(c_2-c_1)$ neighborhood of I at its ends, the profile function $a+\lambda(\alpha u+\beta v+c)^2$ (or $\psi(\alpha u+\beta v+c)$) can be multiplied by a weight function, which smoothly changes from 1 to 0, as the points (u, v) move away from the strip bounded by $l_1$ and $l_2$,etc.

The following model is used to represent an edge over one interval of the corresponding polygonal line.

Let max, min and width be the numbers, associated to the interval J, as described above. We use the same notations as hereinbefore, with reference to FIGS. 19–22, except that the interval therein indicated by I is now indicated by J.

The model $\Phi_{Jedge}$ (u, v) is defined by $$\Phi_{Jedge}(u,v) = \begin{vmatrix} \Psi_e(\alpha u + \beta v + c), \text{ for} \\ -\delta(c_2 - c_1) + c_1 \leq \beta u - \alpha v \leq c_2 + \delta(c_2 - c_1), \\ 0, \text{ for } \beta u - \alpha v < c_1 - \delta(c_2 - c_1) \text{ or} \\ \beta u - \alpha v > c_2 + \delta(c_2 - c_1) \end{vmatrix}$$

Figure 24:
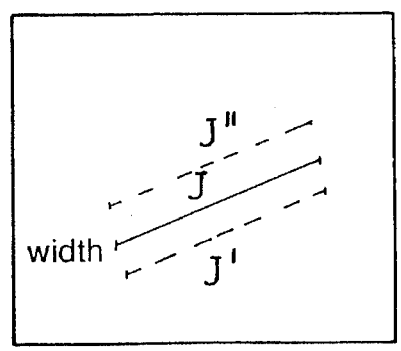

Here for $s=\alpha u+\beta v+c=$the distance of the point (u, v) from the line J, as $\psi_e(s)$ any function can be taken, satisfying the following conditions:

a) $\psi_e$ (−½ width)=min (or max, according to the orientation of the component. This information is associated to it.).

b) $\psi_e$ (½ width)=max (min);

c) The graph of $\psi_e$ has the shape approximately shown in FIG. 24.

In particular, let $f(\tau)=\tau^3-3\tau$. Then $\psi_e(s)=\frac{1}{2}$ (max+min)+ ¼ (max−min) f(2s/width) (or $\psi_e(s)=\frac{1}{2}$ (max+min)−¼ (max−min) f(2s/width), respectively can be used.

Another possible form of the edge model is a combination of two ridge models. Namely, for an interval J given, two intervals J' and J", shifted to ½ width are constructed—see FIG. 24.

Figure 25:
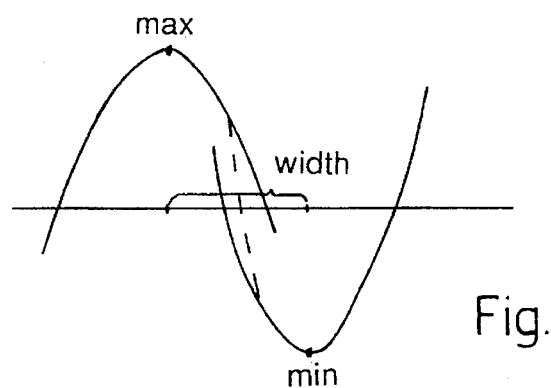

On each of J' and J", a ridge model is constructed as described hereinbefore, with a value equal to min (max, respectively) and $\lambda$ for both ridges equal approximately $\pm 2$(max−min)/(width)$^2$. The values of this combined model at each point is equal to an appropriate weighted sum of the two ridge models constructed—see FIG. 25.

The following model is used to represent hills and hollows; it is the polynomial p(x,y) of degree 2, obtained on the 1×1—cell, in which the corresponding element has been detected. More accurately, if the hill (hollow) is represented by the grey level a, the center $(u_o, v_o)$, $\lambda_1$, $\lambda_2$ and $\theta$, then, in a new coordinate system u', v' with the origin at $(u_o, v_o)$ and the axis $Ov'$ forming the angle $\theta$ with $Ov$, $$\Phi_h(u',v')=a+\lambda_1 u'^2+\lambda_2 v'^2.$$

Thus the model, representing hills and hollows, is an elliptic paraboloid (which coincides with the original approximating polynomial p(x,y)).

Figure 26:
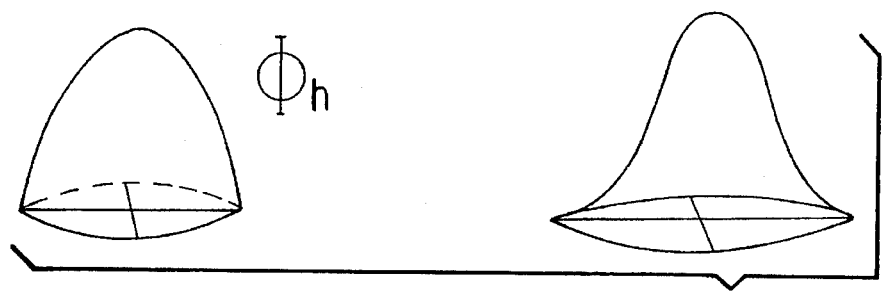

Other functions having approximately the same shape can be used, as graphically illustrated in FIGS. 26.

The submodels hereinbefore described represent hills, hollows and intervals of the ridge and edge-polygonal lines.

Now, for each polygonal line, the model corresponding to it is defined as follows: for a line L(L') consisting of the intervals $I_i(J_j)$, $$\Phi_{Lridge}(u,v)=\Sigma_i \Phi_{Iiridge}(u,v),$$

$$\Phi_{L'edge}(u,v)=\Sigma_j \Phi_{Jjedge}(u,v).$$

Figure 27:
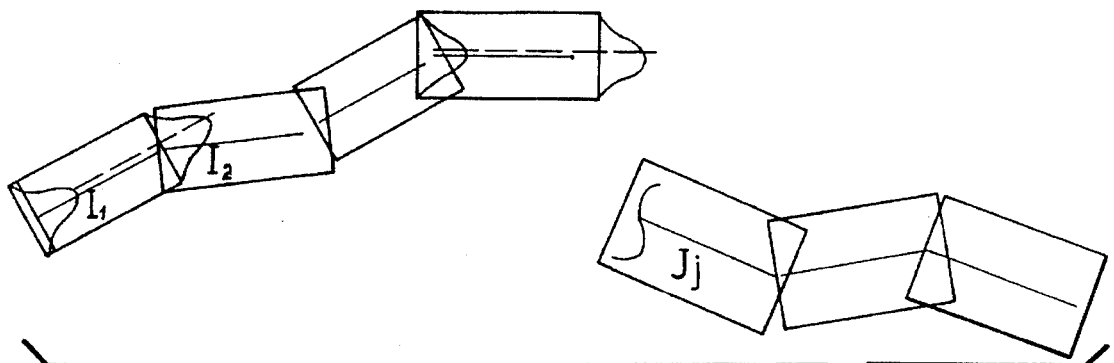

Here the functions $\Phi_{Iiridge}(u,v)$ $\Phi_{Jjedge}(u,v)$ are defined as above, with u,v being the global region coordinates. Such models are illustrated in FIG. 27.

Figure 28:
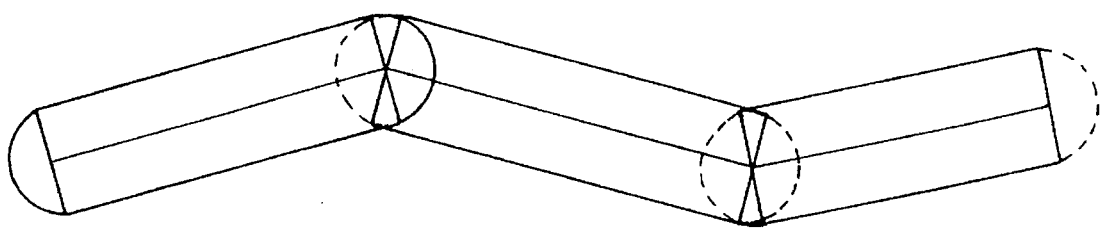

Instead of "rectangular" models hereinbefore defined, one can use other forms; for example, elliptical ones or rectangular ones completed by two semi-disks, as graphically illustrated in FIG. 28.

To each model representing a ridge or edge, a boundary line is associated in one of the following ways:

a) for each interval I, two lines $l_1$, $l_2$ parallel to I and passing at the distances $(1+\kappa)$ leftwidth and $(1+\kappa)$ rightwidth respectively. form the piece of the boundary corresponding to I; for edges on the distance ½ (1+κ) width).

b) for each interval I the lines, passing on both sides of I at the distance ½·(left width+rightwidth)·(1+κ) forms a boundary; for edges—the same as above.

c) for each interval I the lines, passing on both sides of I at the distance computed through λ by the following formula:

$$(H_{ridge}/\lambda)^{1/2}$$

pixels. Here $H_{ridge}$ takes grey level values between 20–60, preferably 30.

d) The lines at the constant distance d.

e) The boundary is not computed.

Here, κ and d are the parameters. Usually κ≈0.05–0.2 and preferably 0.1, and d≈2–4 pixels, preferably 3.

Figure 29:
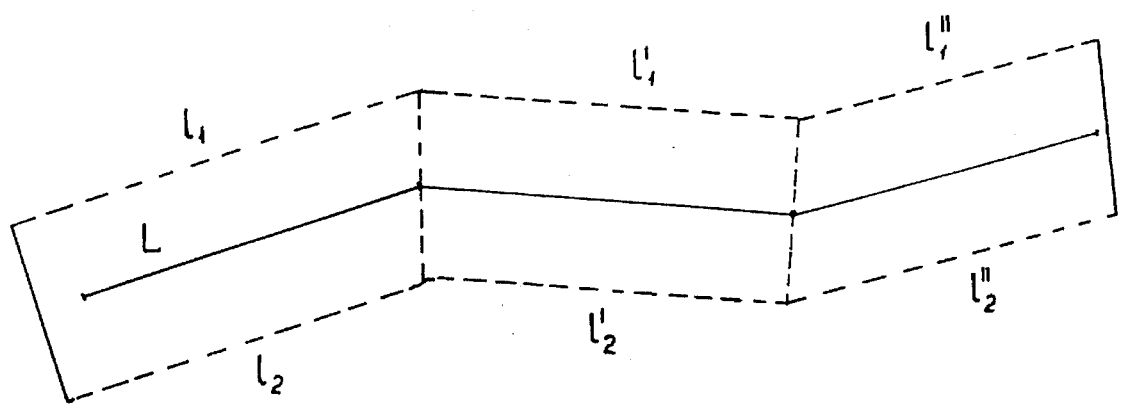

This procedure is illustrated in FIG. 29. For each of the possibilities a–d, the boundary is formed by the curves $l_1$ and $l_2$ for each interval I and the orthogonal lines (or semidisks) for the end intervals of the polygonal line, as shown in FIG. 29.

The model function $\Phi_{Lridge}$ ($\Phi_{L'edge}$) is defined around the polygonal line L, in particular on its boundary. By construction, it takes a constant value on the parts of the lines $l_1$ and $l_2$, bounded by the ends of each segment.

For each of the hills and the hollows, the boundary line is associated in one of the following ways: for a hill (hollow), given by $x_o$, $y_o$, $\lambda_1$, $\lambda_2$, $\theta$, a:

i. It is an ellipse centered at $(x_o, y_o)$, with the main axis in the direction $\theta$, and the semiaxes $r_1$, $r_2$, computed through $\lambda_1$ and $\lambda_2$ and a by the following formula: $r_1=(H_h/\lambda_1)^{1/2}$, $r_2=(H_h/\lambda_2)^{1/2}$. The parameter $H_h$ takes values between 20–60 grey levels, preferably 30.

ii. An ellipse as above with $r_1$, $r_2$ given by the following formula through $\lambda_1/\lambda_2$ and a: $r_1=r$, $r_2=(\lambda_1/\lambda_2)^{1/2}\cdot r$. r usually takes values between 1–5 pixels, preferably 3 pixels.

iii. An ellipse as above with $r_1=r$, $r_2=r$;

iiii. $r_1$, $r_2$ given as the parameters;

iiiii. The boundary line is not computed.

The model function $\Phi_h$, hereinbefore defined, takes a constant value on the boundary line.

Steps 10 and 11-

From now on, x,y denote the global coordinates on the region. By now for each ridge polygonal line L, edge polygonal line L' and each hill or hollow defined in stages 6 to 8, the model $\Phi_{Lridge}(x, t)$, $\Phi_{L'edge}(x, y)$ or $\Phi_h(x, y)$, representing the corresponding picture element, has been constructed. Also, the boundary line has been constructed for each model, as hereinbefore described. The part of the picture contained inside the boundary line will be called "the support" of the corresponding model. The construction of the global model representing the picture on the entire region is performed in several stages.

Figure 30:
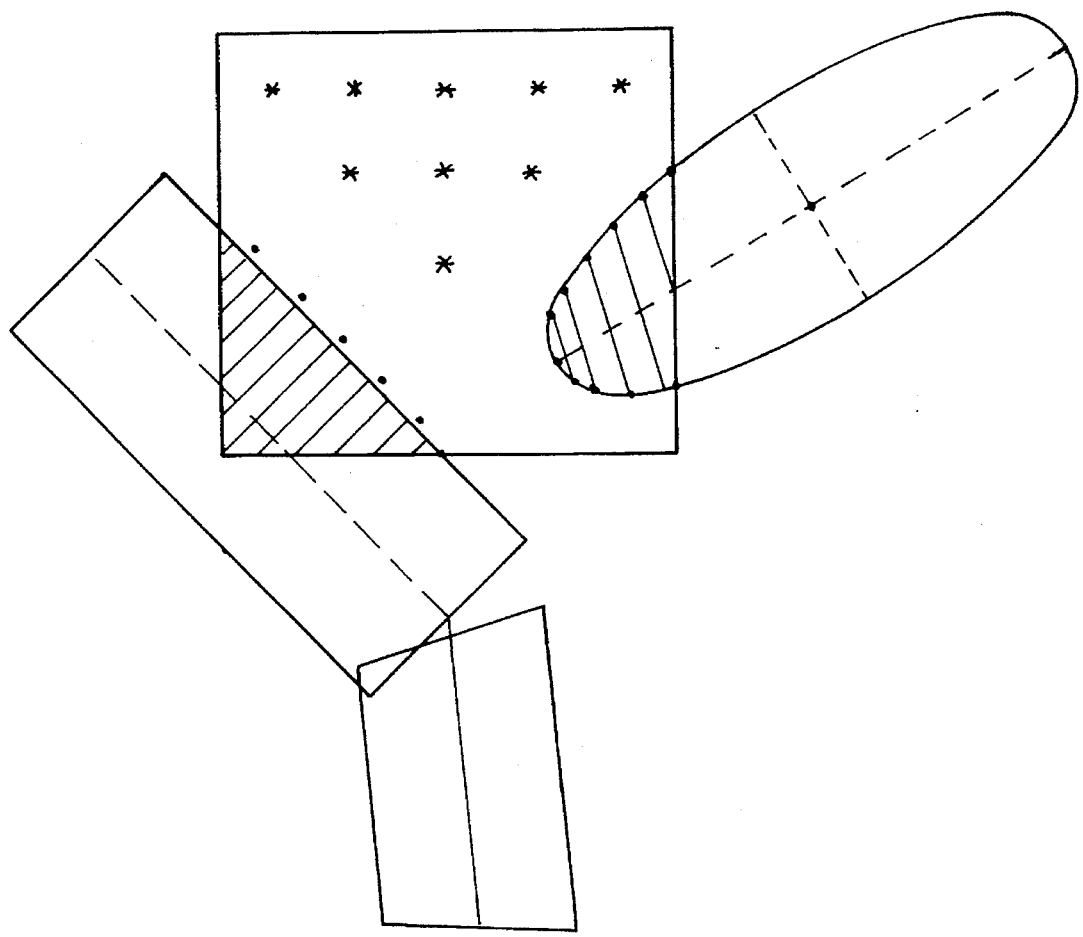

A certain part $\wp$ of the set of all the models is specified; usually, the models with the maximal visual contribution are chosen. Hereinafter a detailed description of some possible choices will be given.

a. The region is subdivided into square cells of the size m×m. Here, m is approximately equal to the basic scale L. The parameter L is the same as defined above. Below, m is usually between 6–48 pixels.

b. For each m×m—cell C, all models in $\wp$ whose supports intersect C, are considered. This situation is graphically illustrated in FIG. 30.

c. The polynomial $P_c(x,y)$ of a low degree (usually $\leq 2$) is constructed, which minimizes the square deviation from the following data:

the values "$a_{00}$" at all points in the initial grid in C, which belong to the set $A_1$ and do not belong to the model supports intersecting C;

the values of the models on the boundary lines inside C.

Various routines to compute $P_c(x, y)$ can be utilized by a skilled person.

In particular, one possible realization is as follows: a sufficient number of points is chosen on each boundary line. Now $P_c$ is constructed as the polynomial, providing the minimal square deviation of the model values at these points and the values $a_{00}$ at the $A_1$—points.

Now, a partial global model $\Phi\wp(x,y)$ is constructed, corresponding to the part $\wp$ of all the models chosen before.

$$\Phi P(x, y) = \begin{cases} P_c(x, y), \text{ for } (x, y) \text{ belonging to the m} \times \text{m} \\ C \text{ and not belonging to the supports of the} \\ \text{cell models in } P. \\ \Phi(x, y), \text{ for } (x, y), \text{ belonging to the} \\ \text{support of the model } \Phi \text{ in } P \text{ and not} \\ \text{supports of the other models in } P. \\ \text{The average of the values of all the models} \\ \Phi(x, y), \text{ to which supports the point } (x, y) \\ \text{belongs, if } (x, y) \text{ belongs to the support of} \\ \text{than one model.} \end{cases}$$

Other methods of "glueing together" the local models can be used by a skilled person. In particular, the one usually known as a "partition of unity" can be applied. It is performed as follows: let $\Phi_i(x, y)$ denote all the models in $\wp$, and let $S_i$ be the support of $\Phi_i$, i=1, . . . , N.

The functions $W_i(x,y)$ are constructed with the following properties:

a. $W_i(x, y) \leq 0$ b. $\Sigma_i W_i(x, y)=1$ c. $W_i(x, y)$ is equal to 0 out of a certain neighborhood of $S_i$-i=1,2, . . . N.

In particular, $W_i$ can be constructed as follows: one can easily construct continuous functions $W'_i(x, y)$, $W'\geq 0$, which are equal to 1 inside ½ $S_i$, and are equal to 0 outside of $2S_i$. Then, $W_i=W'_i/\Sigma_i W'_i$ satisfies conditions a, b, c.

(Here λ·S denotes the result of a homothetic transformation of the subset S.)

Then, the value of the partial global model $\Phi\wp(x, y)$ is defined as the weighted sum of the values of the models $\Phi_i$ with the weights Wi:

$$\Phi \wp(x, y)=\Sigma W_i(x, y)\Phi_i(x, y) \ (i=0,1, \ldots N)$$

(The function $W_0(x, y)$ above corresponds to the complement of all $S_i$ and $\Phi_0(x, y)$ is equal to $P_c(x, y)$, belonging to each of the m×m cells C).

Construction of a global model by the above partition of unity formula provides in particular smoothing out the discrepancies between the local models.

By now the partial global model $\Phi\wp(x, y)$ is constructed. Then the part $\wp'$ of the remaining models is chosen (see below), and the filtering is performed.

a. Namely, for each ridge model $\Phi_r$ in $\wp'$, given by the polygonal line L, consisting of the intervals $I_i$:

$\Phi_r$ is omitted if either $\Phi_r$ represents the white ridge, and the grey levels $a_i$ associated to each interval $I_i$ satisfy:

$a_i - \Phi\wp(x_i, y_i) \leq \max(F_1, Q_1 \cdot H_1)$ where $(x_i, y_i)$ is the central point of the interval $I_i$. Here, $H_1$ is the average value of $a_i - \Phi\wp(x_i, y_i)$ over the intervals of all the white ridges in $\wp'$, $F_1$ and $Q_1$ are the external parameters, or:

$\Phi_r$ represents the black ridge, and $a_i-\Phi\, p(x_i,y_i) \geq \min(-F_2, Q_2 \cdot H_2)$, where $H_2$ is the average value of $a_i-\Phi\, p(x_i,y_i)$ over all the intervals of the black ridges in $p'$.

Usually, $F_1$ and $F_2$ are between 5–20 grey levels, preferably 10, $Q_1$ and $Q_2$ are between 0.3–1.2, preferably 0.6.

b. For an edge model $\Phi_e$ in $p'$, $\Phi_e$ is omitted if:

$\max_i-\Phi\, p(x_i,y_i) \leq \max(F_3, Q_3 \cdot H_3)$ and $\min_i-\Phi\, p(x_{ii}) \geq -\max(F_3, Q_3 \cdot H_3)$.

Figure 31:
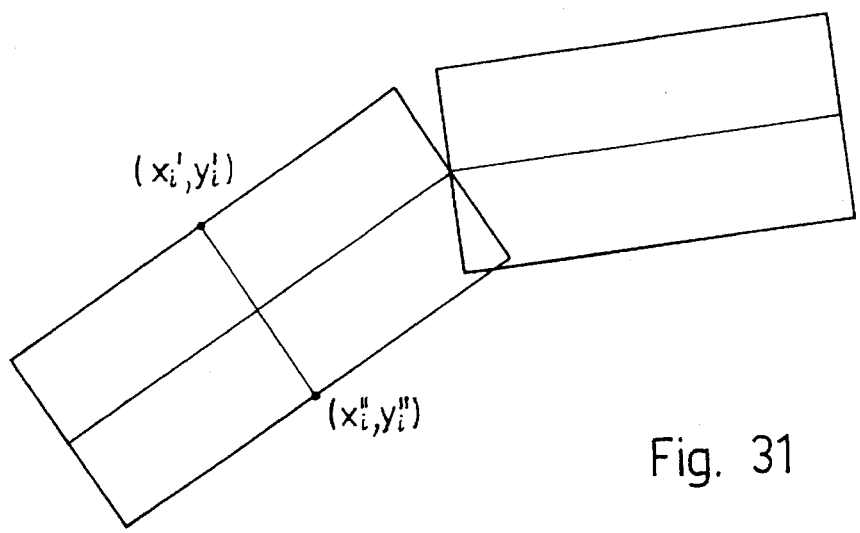

Here, $(x'_i,y'_i)$ and $(x''_i,y''_i)$ are the points on the sides of the edge interval, as shown in FIG. 31, and $H_3$ is the corresponding average. $F_3$, $Q_3$ are parameters.

c. The hill $\Phi_h$ is dropped, if $a-\Phi\, p(x,y) \leq \max(F_4, Q_4 \cdot H_4)$ and the hollow $\Phi_4$ is dropped if $a-\Phi\, p(x,y) \geq -\max(F_4, Q_4 \cdot H_5)$. Here $(x,y)$ is the center of the hill (hollow), $a=a_{00}$ is its associated grey level value, and $H_4$ ($H_5$) is the average of $a-\Phi\, p(x,y)$ over all the hills (hollows) in $p'$.

$F_4$ and $Q_4$ are the parameters, and usually $F_4$ is between 5–20 grey levels, preferably 10, $Q_4$ is between 0.3–1.2, preferably 0.6. Denote $p_1$, the set of models in $p'$ which have not been filtered out.

Now the next partial global model $\Phi\, p, p'(x,y)$ is constructed. It can be done in various ways. One possible construction is the following:

$$\Phi P, P'(x, y) = \begin{cases} \Phi P(x, y), \text{ if } (x, y) \text{ does not belong to a support of any model in } P'; \\ \Phi_j(x, y), \text{ if } (x, y) \text{ belong to the support of the model } \Phi_j \text{ in } P'; \\ \text{An average of the values of all the models } \Phi_j(x, y) \text{ in } P \text{ to whose supports } (x, y) \text{ belong, if there is more than one such model.} \end{cases}$$

Alternatively, $\Phi\, p, p'(x,y)$ can be constructed, using the partition of unity as described above.

The part $p''$ of the remaining models is chosen, and the filtering and the construction of the next partial model, $\Phi\, p, p', p''$, are performed as described hereinbefore.

This process is now repeated until all the models detected are used or filtered out.

Now will be described some specific choices of $p, p'$, etc.

i. $p$ is empty. Thus, as the first partial global model we take $\Phi(x,y)=P_c(x,y)$, for $(x,y)$ belonging to each m×m—cell C.

This partial global model is called a "rough background", and it is given by a piecewise polynomial function which on each m×m—cell C is equal to the corresponding polynomial $P_c$.

$p'$ here consists of all the models detected. Thus, on the second step we filter out insignificant models and complete the construction of a global model.

ii. Here we first construct a partial global model, called "background". It includes the smooth domains as well as the "best smooth approximation" of the domains, containing ridges, hills and hollows.

Figure 32:
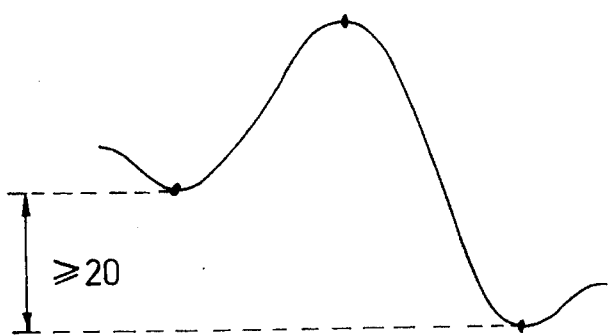

Usually, smooth areas of the background are separated by the edges and ridges with strongly different grey level values on two sides. Thus, the ridge polygonal line is called "separating" if for at least one of its intervals, the associated sidevalues, differ for more than $S_r$. Here, $S_r$ is a threshold, usually between 10–30 grey levels, preferably 20. A profile of a separating ridge is shown in FIG. 32.

Now $p$ is defined as consisting of all the edges and separating ridges and $p'$ contains all the remaining ridges, hills and hollows. The partial model $\Phi\, p$ is called a background.

iii. Here the background is constructed as in ii. Then $p'$ is taken to contain all the remaining ridges, for which $$|a_i-\Phi\, p(x_i,y_i)| \geq Q_6 \cdot H_6$$

for at least one interval Ii of the corresponding polygonal line. Here $H_6$ is the average of $1a_i-\Phi\, p(x_i,y_i)$ over the intervals of all the remaining ridges, $Q_6$ is a parameter. Usually $Q_6$ is the same as above.

Then, the second partial model is $\Phi\, p\, p'$ and $p''$ is taken to contain all the remaining (after a filtering according to $\Phi\, p$, $p$)ridges, hills and hollows.

iiii. Here $p$ contains all the detected ridges, edges, hills and hollows.

Among the variants i, ii, iii and iiii above, i is usually computationally simple, while iiii usually provided the best visual quality.

Version iii is relatively simple computationally and moreover provides high visual quality and high compression. It is preferable.

Various options for the choice of boundary lines have been described above. The option a (c for edges), i for hills and hollows—provides the best quality but usually the lowest compression, since additional information must be memorized.

The option e (iiiii) is compatible only with the version (i) of the "rough" background construction. It provides higher compression, but usually lower quality.

The option c usually provides both a good quality and a high compression ratio.

Figure 33:
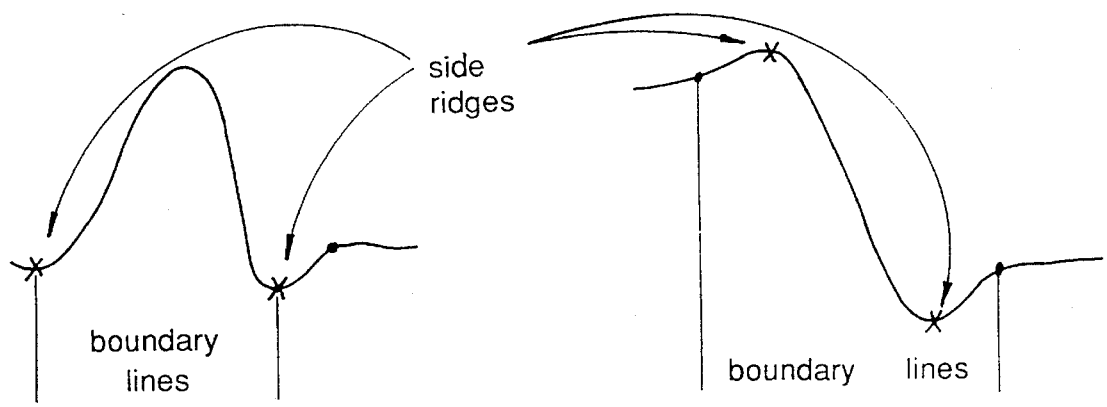

Usually the profiles of the ridges and edges look as in FIG. 33.

Thus, if the bounding lines will be chosen as shown in FIG. 33, and the profile functions $\Psi$ used in the model's construction as described above, this will provide the required shape and usually the inclusion of these edges and ridges to the partial model allows one to filter out the "side ridges", as shown in FIG. 33.

Figure 34:
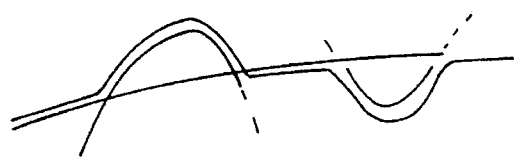

One of the possible ways to add the local models (ridges, hills and hollows) to the background is to define the resulting models as shown in FIG. 34.

$$\Phi(x, y) = \begin{cases} \max(\Phi_{backgr.}(x, y), \text{ white models}), \\ \text{if } (x, y) \text{ belongs to the support of the white models min } (\Phi_{backgr.}(x, y), \text{ black models}, \\ \text{if } (x, y) \text{ belongs to the support of the black models.} \\ \text{Average value of all the models to whose support } (x, y) \text{ belongs, if it belongs both to the supports of black and white models.} \end{cases}$$

Figure 35:
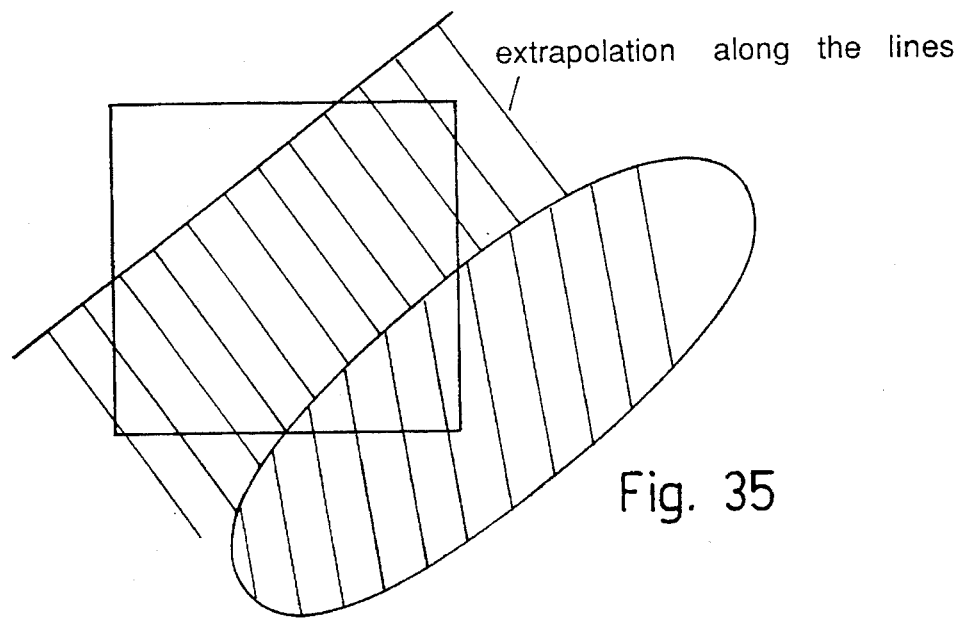

The local approximation in the m×m—cells C can be obtained in various ways, not only using the polynomials $P_c(x,y)$. For example, if two or more models supports intersect this cell, the gray levels on it can be obtained just by extrapolating the model values on the boundary lines. Thus, no information must be stored for the cell shown in FIG. 35.

The "smooth cells" can be represented by only one value (at the center), and then linearly interpolated, taking into account the models values on the boundary lines.

Figure 36:
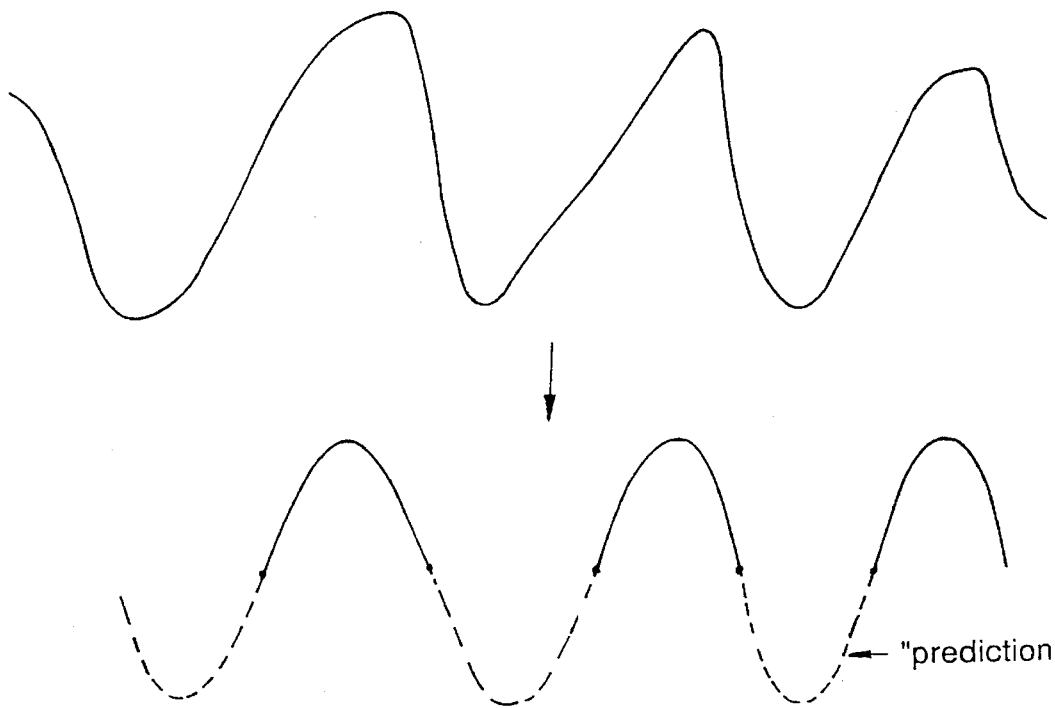

Other principles of choice of $p$, $p'$, etc., than those described above, can be used. In particular, in the regions, where a large number of hills and hollows are densely positioned, $p$ can be chosen to contain only hills. The partial model $\Phi\, p$ is constructed in such a way that the hollows of a typical height (average height) are produced between the hills. In the subsequent filtering, usually many of the detected hollows are filtered out (being "well predicted" by Φ $\wp$): see FIG. 36.

Since various smooth domains and the domains with different types of texture are usually separated by edges, it may be desirable to form a partition of the entire region into subpieces, separated by edges and separating ridges. These subpieces can be defined in various ways. In particular, one can form a polygonal subdivision of the region.

As such a subdivision is constructed, it can be used as follows:

a) various average values, as above, can be computed with respect to those naturally defined subpieces, and not to the square region, which is not related to the picture structure; and b) The size m of a subdivision of the region into the m×m—cells, can be chosen separately for each subpiece, thus allowing for an economic representation of the smooth areas.

Global Model Construction by linear interpolation

The way of constructing global models, hereinafter described, can lead to a particularly simple realization of the process. The structure of the compressed data, obtained in this way, is convenient for operations on compressed pictures and for videosequence compression.

Hereinafter a more detailed description of this realization is given.

1. Let the set $\wp$ of models be chosen. All the models in this set are assumed to be provided with their boundary lines and their values on the boundary lines, as described above.

2. As usual, the region is sub-divided into m×m cells. The corners of these cells form a grid, which will be denoted by G.

3. To each point w in G, a grey value v(w) is associated, which is the (averaged over a small neighborhood) grey level value of the original picture at the point w. In particular, we can always assume that G is a subgrid of the basic grid, used in the models identification process. Then u(w) can be defined as the constant term $a_{00}$ of the polynomial p(x,y) constructed at w.

4. The value of the global model Φ(x,y) at each point x,y of a certain m×m—cell C is defined as follows:

a. Consider all the models in $\wp$ whose supports intersect C. The part of the boundary of C not covered by the supports of these models, is subdivided into segments with the end point either at the corners of C or on the boundary lines of the models involved.

b. Thus the values of Φ are defined at each endpoint either as v(w) for a corner w, or as the value of the corresponding model at its boundary point. Define the values of Φ at the interior points of the boundary segments by linearly interpolating the values of the endpoints: see FIG. 43.

c. Finally, for any (x,y) in C, not belonging to the supports of the models intersecting C, the horizontal line through (x,y) is drawn until the first intersection on the left and on the right either with the boundary segments of C or with the boundary lines of some of the models. The values of Φ at these intersection points are already defined (either by b. above, for the boundary segments of C, or by the value of the corresponding model on its boundary line). Then the value of Φ at (x,y) is defined by linear interpolating the values at the intersection points.

d. The values of Φ(x,y) for (x,y) belonging to the support for one of the models is defined as the value of this model at (x,y). If (x,y) belongs to the support of several models, the value Φ (x,y) is determined by averaging the values of the models involved, as described above.

For example, in FIG. 43 the values of Φ on AB, CD, DE, EF and GA are defined by linear interpolation of the values at the endpoints. The values at $(x_1,y_1)$, $(x_2,y_2)$, $(x_3,y_3)$ are defined by linear interpolation of the values at $A_1$ and $B_2$ )$A_2$ and $B_2$, $A_3$ and $B_3$, respectively.

5. The global model has some important advantages:

a. Its values are continuous, by construction. This prevents certain visual distortions. This continuity is maintained also on the boundaries of the regions, if the same values v(w) are used for the boundary gridpoints w in both adjacent regions. This eliminates the necessity of smoothening operations.

c. Computations of the values of Φ are local: for each point in a m×m cell C, only information concerning C is used in computations. This property is important for a hardware implementation of the process.

d. Very simple structure of compressed data: the parameters of the local models and the values v(w) at the points of G, not covered by the supports of the models.

6. Filtering operations can be performed on this model as herein described. In particular, in smooth regions the grid G may be too dense. Then one can compare the values v(w) at G with the values interpolated from the, say, twice-spaced grid, and to omit the gridpoint in G, whose values are approximated closely enough by this interpolation.

In the filtering stage (Step 11) the following considerations and examples should be kept in mind. In this stage we eliminate some excessive information, according to its psychovisual significance. This involves simplification of the models, carried out by eliminating some excessive parameters, without dropping the model completely. Since the models are constructed on the base of a local analysis, a posteriori they may contain "excessive" parameters. The following examples will clarify this step of the process.

EXAMPLE 1

Figure 37:
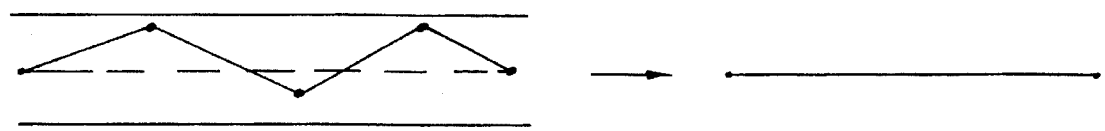

Assume that a central line of a certain curvilinear structure is represented by a broken line, consisting of a number of straight segments. However, if the deviation of the intermediate points from the straight segment connecting the endpoints is less than a certain threshold $T_8$, the broken line can be replaced by said segment with no visual degradation (see FIG. 37), and all the parameters, representing the intermediate points of the broken line, can be omitted. $T_8$ is usually between 0.3–1 pixel, preferably 0.5.

EXAMPLE 2

Figure 38:
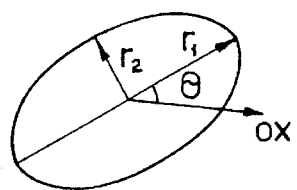

Hills and hollows may be represented by bell-shaped models with an elliptical base (see FIG. 38).

Let $r_1 r_2$ be the semiaxes and θ the angle of the biggest semiaxis with the ox.

For $|r_2/r_1-1| \leq T_9$, the ellipse is visually indistinguishable from the circle of radius $r=\frac{1}{2}(r_1+r_2)$. Thus we can replace the ellipse by this circle and to store only r, instead of $r_1$, $r_2$, θ. $T_9$ is usually between 0.1–0.3, preferably 0.2

EXAMPLE 3

Smooth regions can be represented by polynomials of degree 2, $z=a_0+a_1x'+a_2y'+a_{11}x'^2+2a_{12}x'y'+a_{22}^{'2}$ (in local coordinates x',y' at each cell).

If all the coefficients of the second order are less than $T_{10}$, all the three second order terms can be omitted with no visual degradation.

For any specific model realization the corresponding thresholds $T_{10}$ can be found in advance in a straightforward psychovisual experiment. $T_{10}$ is usually between 5–20 grey levels, preferably 10.

In a further filtering stage, entire models may be filtered out, viz. screened out entirely, because of their small psychovisual contribution.

A general scheme is as follows: We choose a part of models and construct on their base a partial global model. Then for each of the remaining models we measure its contribution to this partial picture. If it is less than $T_1$, the model is omitted. Next we add a part of the surviving models to the partial model, and construct a second partial global model. Once more, we measure the contribution of the remaining models, then repeat the procedure. In detail this procedure is described above.

EXAMPLE 4

We construct a background using the edges and smooth regions detected (see detailed description below). This background is our partial model. Then we add the ridges, the hills and hollows, dropping those whose height over the background is less than $T_{12}$.

EXAMPLE 5

Figure 39:
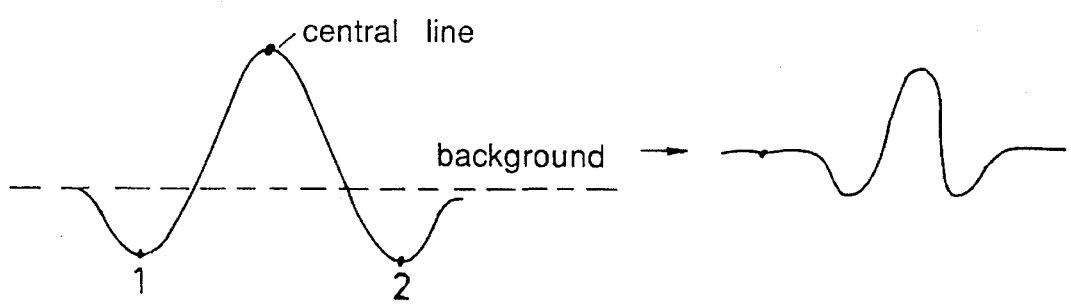

We construct the background and perform the first filtering, as in Example 4. Then we add part of the "surviving" ridges to the background (those of greater than average height), using the profile illustrated in FIG. 39.

Here the height of the side channels 1 and 2 is proportional (within a certain fixed coefficient) to the height of the ridge.

Experiments show that this profile is typical for ridges on the usual pictures, and in this way we form a second partial model.

Usually the ridges, corresponding to the side channels are detected and stored. However, now they will be screened out, since their contribution has been already provided by the chosen profile.

The threshold value T in the filtering process depend strongly on the structure of the picture, the distribution of sharpness, brightness, on the geometry of the models, etc. An important point is that the primarily compressed data provide an adequate and easily extractable information of this sort. So highly adaptive methods of filtering can be constructed, providing a high degree of utilization of the visual perception properties.

On the other hand, a very simple form of thresholds T can be given:

$$T = \max(T_{abs}, KI_{aver}),$$

where $T_{abs}$ is the (usually low) absolute threshold, and $I_{aver}$ is the average value of the threshold quantity. Above, a detailed description is given.

Step 12-

In this, the quantization step, we approximate the parameters values of the primarily compressed data by the values from a certain smaller array, constructed according to the psychovisual significance of each parameter and their combinations.

Since the parameters have very simple geometric and visual interpretation (position, slope, curvature and width of curve position and form of hills, their brightness, etc.), the levels of admissible quantization in their various combinations can be established rather accurately. Thus, the quantization is performed in several steps:

Aggregation of parameters and models

At this stage we aggregate together those parameters whose psychovisual significance and/or their dynamic range depend on their mutual values.

Part of this aggregation can be built into the model's structure, but another part depends on the mutual position of the models on the picture, and hence can be performed only when the models have be identified.

Aggregation can be followed by the substitution of other parameters and/or a coordinate change, to express in a better way a mutual dependence of parameters.

EXAMPLE 6

Figure 40:
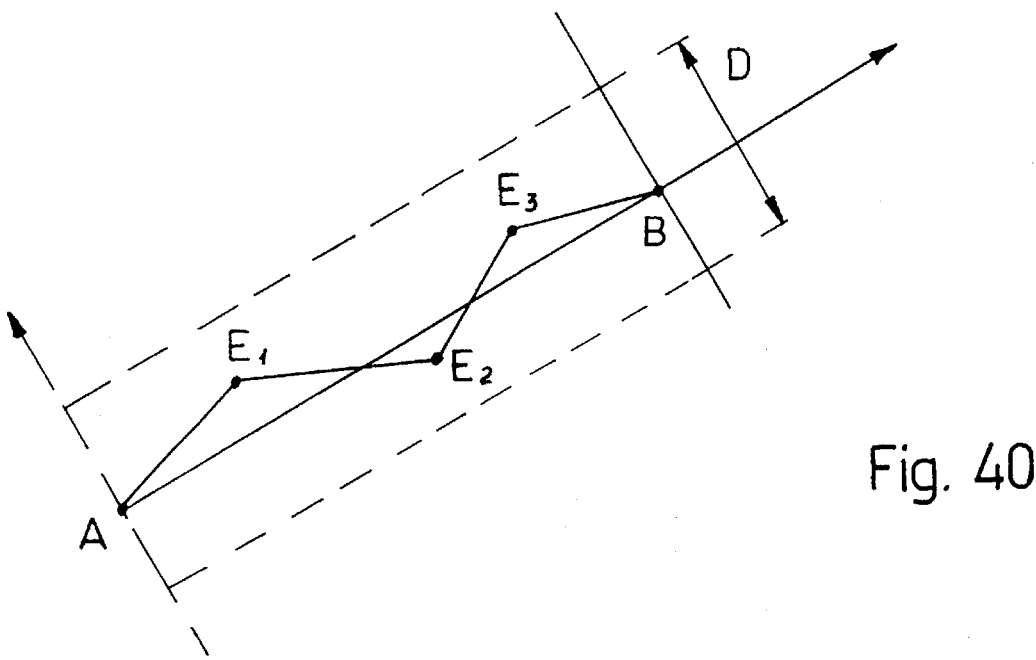

This is similar to the preceding filtering Example 1—see FIG. 40.

Experiments show that the replacements of the intermediate vertices $E_1, E_2, E_3$ in the direction perpendicular to the segment AB, are visually much more important than the replacements in the AB direction.

Thus, we aggregate the parameters in the following way:

a) The coordinates of the endpoints A and B are quantified with respect to the global region coordinate system.

b) The new coordinate system is constructed, its first axis being parallel to AB and the second axis perpendicular to AB.

c) Coordinates of the intermediate points $E_i$ are expressed with respect to this new system.

d) The coordinate values are quantized, the quantization step for the first coordinate being bigger than the step for the second coordinate.

e) The dynamic range of the new coordinates is also determined naturally. The first coordinate for the point $E_i$ is bounded by its values for A and B. For the second coordinate the experiments show that its range usually is bounded by approximately 20% of |AB|.

EXAMPLE 7

Figure 41:
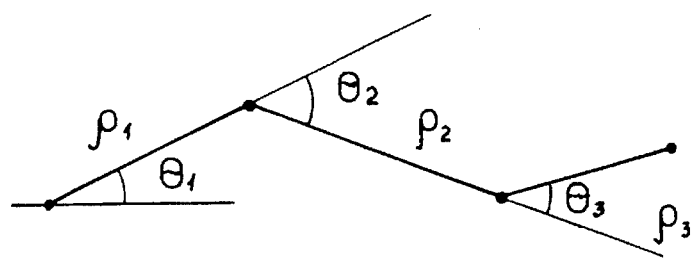

The same broken line as in Example 6 can be described by the following parameters: lengths ρ of the segments and the angles θ between the consequent segments: see FIG. 41:

The psychovisual considerations allow one to define the appropriate quantizations steps and dynamic ranges for ρ's and θ's.

EXAMPLE 8

Figure 42:
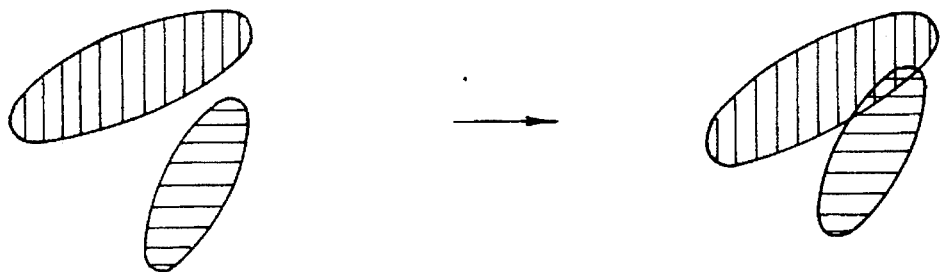

For models that are geometrically close to one another, the experiments show, that of the greatest visual importance are the perturbations, which change the "topological" structure of the picture, viz. create new visual contacts between the models or separate visually unified models, as illustrated in FIG. 42.

On the other hand, parameter perturbations, which alter the positions and forms but preserve the topological structure, are much less detectable.

Thus the parameters of nearby models, responsible for their mutual positions, can be aggregated, and their dynamic range and quantized values can be chosen in such a way that the topology of the picture to be preserved by the quantization.

EXAMPLE 9

This is similar to Example 2 under filtering. Experiments show that for the description of the ellipses, the closer the ratio $r_1r_2$ to 1, the smaller is the visual significance of the angle θ.

Thus, we can use new parameters: $r_1$, $e=r_2r_1$ and θ. The dynamic range of $r_1$ depends on the scales chosen, e is bounded by 1 ($r_2 \leq r_1$), and θ belongs to [o,π].

However, the quantization steps for θ can be chosen in greater size as the values of e are closer to 1.

Subdivision of the dynamic range of the aggregated parameters

At this stage the common dynamic range of the aggregated variables is subdivided into subparts. In each subpart, one specific value of the parameters is fixed, which represents this subpart.

The quantization consists of replacing parameter values belonging to a certain subpart by the value representing this subpart chosen above. The first two steps are performed according to the psychovisual significance of the parameters values. These steps have partially been described in Examples 5–9 above.

A general procedure, described above, is well known under the name "vector quantization" (see [A. Gersho and R. M. Gray, Vector Quantization and Signal Compression, Kluwer Academic Publishers, Boston/Dordrecht/London, 1992]). Thus, for any other realization of basic models and their parameters, the corresponding quantization procedures can be constructed by skilled persons.

Step 13-Encoding

This is a procedure which ultimately represents the quantized data, obtained in step 12, in the form of a binary file (or a bit-stream). This procedure is without loss in the sense that after decoding we obtain exactly the quantized values of all the parameters. In principle, any lossless encoding process can be applied at this stage. However, a correct organization of data reflecting the specific nature of the parameters to be encoded, can greatly reduce the volume of the final encoded file.

Encoding of geometric parameters

The order of the models representing the basic elements detected is not important in the construction of the global model. This fact can be utilized in constructing a more economic encoding.

The geometric parameters must be encoded with respect to a correct scale. For example, in order to encode the positions of the points entering our models, we can subdivided the region into the smaller cells. Since the order of the objects is not important, we can encode the coordinates of the points in each cell separately. Since each cell is smaller than the entire domain, for the same level of quantization we need fewer bits to encode the coordinates with respect to a cell.

Additional data which must be memorized for each cell is the number of the points in it. Even if the distribution of the points is ordinary, an easy computation shows that in such a subdivision we usually gain a significant amount of bits. However, if the cells have approximately the size of the basic scale L, we know that the possible number of objects in each cell is small, and therefore the number of bits we need to memorize the amount of objects in each cell drops.

Thus we encode the geometric parameters with respect to the cells approximately of the size of the basic scale L. In this way we utilize the experimentally known uniformity of distribution of the basic elements on the picture.

The parameters, which are (or can be) correlated, must be aggregated in a correct way. For example, the slopes or widths of the curvilinear structures, or the brightness of the models, etc., within one region are usually concentrated around a small number of typical values.

Thus, values can be memorized once per region, and for each model only the difference must be encoded. In particular, the average value can be used as a typical one.

Huffman-like coding can be used to utilize non-uniformity in distribution of the values of certain parameters. In order that this coding be effective, the parameters must be properly subdivided into groups with similar distribution. For example, the values of the slopes by themselves usually are distributed uniformly around the picture and hence Huffman encoding will not reduce the amount of data. However, if in each region we subtract the average value, for the differences distribution, we can expect a strong concentration around zero and application of Huffman encoding will reduce significantly the volume of data.

Some transformations of parameters in each region can be used to make their distributions over different regions similar.

The size of the regions into which the picture is subdivided is important in the effectiveness of the Huffman encoding, as earlier detailed.

Finally, the binary data encoding the quantized values of the parameters, as well as the types of the models, is organized in a binary file. In principle, this file can be further compressed by any lossless method.

On the other hand, this file can be organized in such a way that provides easier access to various parts of the encoded picture and in order to make it error-resistant. Usually these operations increase the volume of data insignificantly.

Note that the models are constructed in an invariant way. And subdivisions into regions is done only for reasons of convenience. Thus some models from one region can be encoded in a neighbouring one, and the pointers can be used to identify the correct regions for each model in the process of decompression.

Step 14-

At this stage—decompression—we produce from the binary file obtained in Step 13 the picture represented by its RGB values at each pixel. The binary file is transformed to the quantized values of parameters. This is done by the same encoding procedures which are used in Step 13, since by nature these procedures are invertible.

The quantized values are interpreted as the values of "primarily compressed data". This means that the quantized values obtained are represented by the figures with the number of digital or binary digits which are required by the computer being used and by computations accuracy considerations.

The obtained values of the parameters are substituted into the global model $z=\Phi(x,y)$ (for each region separately). This global model represents an explicit instruction for a computer, how to compute the value of the grey level z (or RGB) for each given values x,y of the coordinates of the pixel. The computer finds the values of z for all the regions. For each region the coordinates (x,y) of each pixel are substituted to the model Φ, and the corresponding value $z=\Phi(x,y)$ is computed.

In this way, we obtain the values z (or RGB) at each pixel of the picture.

At the decompression stage some smoothening operations can be performed, to eliminate the discrepancies between the adherent models in different regions.

It can happen that the detection (or filtering, or quantization) procedures introduce certain systematic distortions into the parameter values. These distortions can be corrected in the decompression process by introducing appropriate corrections to the values of the parameters stored.

For example, the detection process with a large "l" scale introduces a certain low-pass effect. In particular, the widths of the ridges and edges and the sizes of hills may be obtained at a size which is 20% larger than their correct values on the picture. Then, in the process of decompression, each value of the width or size can be multiplied by 0.8, which will partially correct the undesirable distortion.

An important property of our models is that they scale-invariant. They are mathematical expressions which can be interpreted according to any given scale.

Thus, the size of the picture to be obtained in the process of decompression is a free parameter of this process. In particular, we can obtain the picture of the same size as the initial one, but any desired zoom or contraction can be produced. The same obtains with respect to non-uniform rescalings in x and y directions. In particular, the picture, compressed in one of the TV standards (PAL, NTS) can be decompressed into another one.

The same can be said, in fact, of more complicated geometric transformations. See "Operations" below.

Size of the windows

It is important to stress that although in all the examples the linear dimension "l" of the window was 4, it can (and sometimes should) be different, for example, 3 or 5 pixels. In particular, l=3 can be used to capture properly the finest scale details on the usual video or pre-press pictures.

The process, in particular the identification of the basic structure, can also be arranged in the following way: The basic identification is performed with l=4 until all the segments and hills and hollows are identified. Then at each point where segment or hill (hollow) has been found, the polynomial of degree 2 is constructed which provides the best mean square approximation of the picture on the 3×3-cell around the center of the segment or the hill. Then, the initial polynomial (constructed on a 4×4-cell) is replaced by this new one. All the rest of the processing remains unchanged. This is done in order to improve the accuracy of the detection of the parameters of the objects (their height, position and curvatures).

In the same way, in the process of edge elements construction, the degree 2 polynomials can be computed on 4×4-cells, instead of 6×6 or 5×5. Alternatively, both the polynomials can be computed and combined to provide better estimating of the edge parameters.

In the above processes, the weighting functions on the pixels of 4×4 (6×6)-cells can be used (instead of smaller cells), in order to compute approximating polynomials.

Compression of color pictures

Color pictures are represented by several color separations, according to various approximations and standards (RGB, YIQ, CMYB, etc.; see e.g. [R.J. Clarke, Transform Coding of Images, Academic Press, 1985, from page 248]. Each color separation usually represents a grey-level picture of a certain quantization. For example, for RGB each of these basic colors is represented by 256 grey values (8 bits) on each pixel.

1. The simplest way to compress color pictures consists in compressing each color separately.

2. The compression process described above provides a tool for a much better utilization of a redundancy, existing in color information.

Different color separations of the same picture represent essentially the same objects in various parts of the light spectrum. The models described above capture the geometry of these objects. Therefore, each color separation can be represented by exactly the same models with exactly the same geometric parameters. Only the brightness parameters of these models differ from one separation to another.

3. Thus the color compression is performed as follows:

a. One of the separations (for example R) is compressed as a grey level picture. In particular, all the models are constructed.

b. The same models, with the geometric parameters, are used to represent G and B.

c. The brightness parameters of these models are adjusted for each separation of G and B separately, to provide a faithful representation.

d. In the compression data, a complete information is stored only for R, and only the value of the brightness parameters are stored for G and B.

4. The same method can be applied to other combinations of the basic colors, for example to YIQ (see [R. J. Clarke, Transform Coding of Images, Academic Press, 1985, from page 248]). Then the grey level picture corresponding to the luminance Y is compressed, as described above, and only the values of the brightness parameters are stored for the chrominances I and Q. Since the visual sensitivity to the values of I and Q is much lower than to Y, the required accuracy of a quantization of the brightness parameters for I and Q is much less than for Y.

5. In the preferred embodiment described above, the geometric parameters of the models are:

the coordinates of the centers and the directions of the eigenvectors for hills and hollows;

the coordinates of the vertices of the polygonal lines, representing ridges and edges;

the width (or right(left)width) for each interval of the polygonal line;

the position of the boundary line.

The brightness parameters are:

the height $a_{00}$ and the curvatures $\lambda_1$ and $\lambda_2$ for hills and hollows;

The height a, the curvature $\lambda$ and the values left (right) value for each interval of a ridge.

the min(max) values for each interval of an edge.

All these brightness parameters are the average grey level (or curvature) values of certain points or on certain curves. Thus, to find the values of these parameters for a given color separation (say, G), we compute (for this separation) the required averages at the same points and along the same curves.

In particular, the following procedure can be applied: in the original compression (say, for R) all the brightness parameters are obtained by certain calculations described above from the polynomials p(x,y) and q(x,y) of degrees 2 and 3 respectively, approximating the original pictures on certain cells.

Then to find the brightness parameters for another separation (say, G), we compute the approximating polynomials p(x,y) and q(x,y) for G exactly at the same cells and then repeat the same calculations as for R.

In many cases, the values of brightness parameters for different color separations are strongly correlated, This is due to the fact that different color separations are the intensities of the light reflected by the same objects in different parts of the spectrum. Then (on small regions of a picture) these intensities are usually related by very simple transformations.

To remove this redundancy we can try to represent the brightness parameters of the separations G and B by means of simple transformations of the brightness parameters of R.

For example, assume that $p_1, \ldots, p_n$ are the brightness parameters of the model, representing the separation R on a certain region, and $p'_1, \ldots, p'_n$ and $p''_2, \ldots, p''_n$ are the corresponding parameters for G and B. We find the numbers a', b' and a", b", which provide the minimum of the mean square $$\text{deviations } \sum_{i=1}^{n} (p'_i - a'p_i - b')^2 \text{ and}$$

$$\sum_{i=1}^{n} (p_i'' - a''p_i - b'')^2.$$

the form (*) $p'_i = a'p_i + b' + r'_i$
$p''_i = a''p_i + b'' + r''_i$.

Usually the correction terms $r'_i$, $r''_i$ are visually negligible (if the regions are small enough—say, 24×24). Then, instead of memorizing $p'_i$ and $p''_i$, we store for each region only four numbers: a', b', a", b".

Various modifications of this method can be used. For example, we can try to find representations of the form (*) separately for various kinds of brightness parameters, say for edges, ridges, hills and hollows; or for the white and black models separately, etc.

7. A possibility of a simple expression of one color separation through another on small regions can be used to provide a color compression scheme, which can be combined with any grey level compression process (for example, DCT). This color compression procedure is less accurate than the one described above. However, it usually leads to much better results than the color compression scheme used, say, in JPEG standard. It is performed as follows:

a. The picture is subdivided into cells of the size s×s (usually s is between 8 and 24).
  b. For the color separations chosen (for example, YIQ), on each block the numbers a', b' and a", b" are determined, which minimize the mean quadrate deviations $$\sum_{(x,y)} (I(x,y) - a'Y(x,y) - b')^2 \text{ and}$$

$$\sum_{(x,y)} (Q(x,y) - a''Y(x,y) - b'')^2.$$

Here the summation is performed over all the pixels in the cells, and Y(x,y), I(x,y) and Q(x,y) denote the grey level values of the corresponding separations at the pixel with the coordinates (x,y).
  (The numbers a', b', a", b" can be found by standard procedures well known to the skill person.)
  c. The basic separation Y is compressed by the chosen compression method. Let Y' denote the grey values after decompression.
  d. Then the grey values of I and Q after decompression are given by
  I(x,y)=a'Y'(x,y)+b'
  Q(x,y)=a"Y' (x,y)+b".

Thus, the compressed data for a color picture consists of a compressed data for Y, and of four numbers, a', b', a", b" for each cell, to represent I and Q. The example of a color compression according to this scheme is given below.

Processing of pictures in a compressed form

Picture processing consists in performing on pictures various visually meaningful operations: extraction of various features (defined in visual terms), comparison of pictures or their parts, stressing certain visual features and suppressing others, picture enhancement, creation of visual effects (conturing, quantization, etc.), various color operations, geometric transformations (rotation, zoom, rescaling, non-linear transformations as a "fish-eye"), 3D-geometric transformations (perspective projections, etc.), transformations related with a "texture" creation (i.e. matching pictures as a texture with 2D or 3D computer graphics primitives), etc.

1. In the compression process described above, pictures are represented by models, whose parameters present the (primary) compressed data. These parameters, as described above, have very simple visual meanings. As a result, any picture processing operation defined in terms of a desired visual effect, can be interpreted as a simple operation on the parameters of our models, i.e. as an operation on compressed data. As a consequence, in our compressed data structure, picture processing is performed much faster than the same operations on the original pictures; the same is true for the memory required.

2. This important property is not shared by conventional compression methods, like DCT. The reason is that the parameters representing the picture in these methods, like the digital cosine transform (DCT) coefficients, are related to the visual structures of the picture in a complicated way. Therefore, the effect of processing operations on these parameters is difficult to evaluate.

Examples of picture processing in the compressed data structure according to the invention One of the very important operations in picture processing is edge detection, which consists in determining the location of abrupt changes of brightness.

In the compression process of the invention, the edges are detected and represented by corresponding models in the course of the compression process. Therefore, to show a picture consisting of only the edge regions, it is enough to drop all the models in our compressed data but the edges.

Our compressed data allows for a much more detailed shape analysis. The edges or ridges can be classified according to their profile; textured areas can be analyzed according to the type and the density of the texture elements (usually represented by hills and hollows in our compressed data).

Our compressed data comprises a very convenient input for a higher level picture analysis (picture comparison, complicated features extraction, computer vision, etc.).

Picture enhancements that can be performed

Sharpening a picture (high-pass filter). This visual effect can be achieved by increasing the "slope" of all the models involved. Increasing the brightness parameters and decreasing the width (size) of the models provides the required increasing of the slopes. A low-pass filter effect is achieved by an opposite variation of the parameters.

Much more specific effects can be achieved. For example, all the edges can be sharpened, while the small-scale textures (hills and hollows) can be smoothed.

Various visual effects can be produced. For example, replacement of the usual profiles by new ones, like those illustrated in FIG. 44(a) and (b) leads to a "granulation" effect.

One more, if required, this operation can be performed only on the models of a certain type.

Various color operations require only corresponding transformations of the brightness parameters for each color separation, as described above with reference to color pictures compression.

Artificial textures of various types can be created in our compressed data structure.

Geometrical transformations
Zoom and rescaling.

One of the important properties of our compressed data is its scale invariance. This means that the picture is represented by a mathematical model, which allows for computation of the brightness value $\phi(x,y)$ at any point. This computation is not related to the specific position of pixels. Therefore, the scaling and zoom, i.e. the size and proportion of the picture after decompression, are only the parameters of the decompression. In this sense the rescaling and zoom operations on the compressed data do not take time at all.

One of the important consequences of this scale invariance is that pictures can be compressed in one standard (PAL, NTSC, ... ) and decompressed into the same or any other standard with no additional processing, General transformations Also more complicated transformations than zoom and rescaling can be interpreted as the parameters of decompression. However, in may applications it is important to represent a picture after a transformation in exactly the same compressed format as the initial picture.

In order to define this operation precisely, let us assume that a picture A and a screen B are given (not necessarily of the same size). Let $\Psi: B \rightarrow A$ be a transformation which associates to each point p on the screen B the point $q=\Psi(p)$ on the picture A.

Now a new picture $\Psi(A)$ is defined on the screen B as follows: at any point p on B, the grey value (or the color) of the picture $\Psi(A)$ is equal to the grey value of the picture A at the point $q=\Psi(p)$.

Intuitively one can imagine that the picture A is printed on a rubber film. Then the rubber film is stretched by a transformation $\Psi^{-1}$ (inverse of $\Psi$) to match the screen B. The resulting picture on B is $\Psi(A)$.

If we want to represent $\Psi(A)$ in our standard compression format, using the compressed representation of the picture A and the transformation $\Psi$, we operated in the following way.

Figure 45:
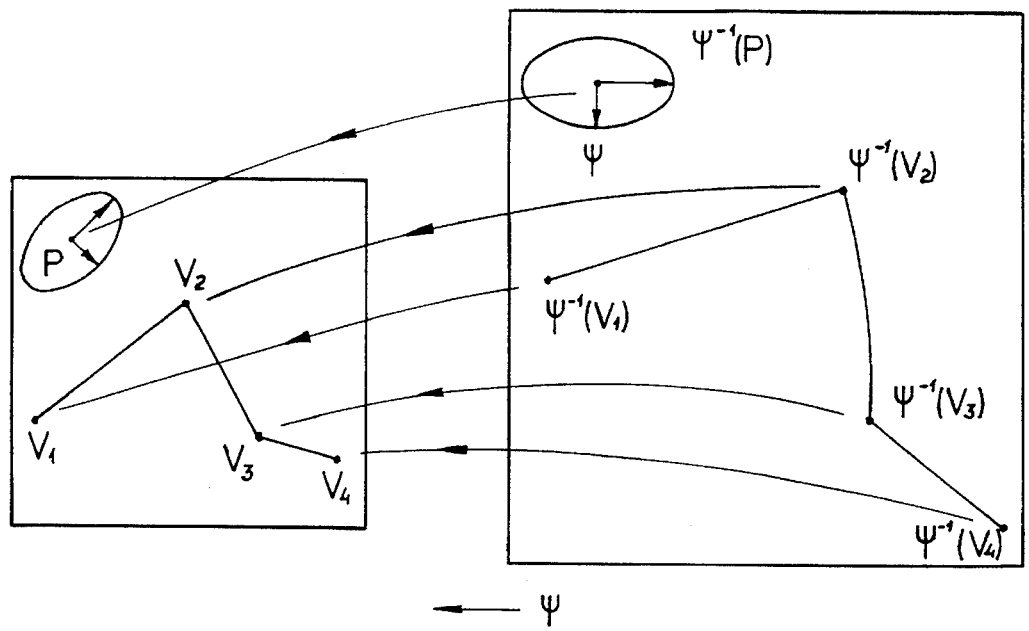

1. For each model in the compressed representation of A, the geometrical parameters are transformed by a linearization of $\Psi$. More precisely, each polygonal line on A with the vertices $v_i$ is transformed into a polygonal line on B with the vertices $\Psi^{-1}(v_i)$. This is illustrated in FIG. 45.

2. In the same manner, the central point p of a hill (hollow) on A is transformed into the point $\Psi^{-1}(p)$ on B.

3. The eigenvectors of hills and hollows are transformed by the differential $d\Psi^{-1}$. Similarly, the curvatures $\lambda$ are transformed.

4. Finally, the heights of the hills, hollows, edges and ridges do not change in this transformation.

5. The polynomials representing the smooth regions are transformed by the differential of $\Psi$ on corresponding cells.

Especially simple form geometric transformations take in the global model structure described above.

1. The models are transformed from A to B as described.

2. For those of the points w of the grid G on B, which are not covered by the supports of the models, the grey level values v(w) are defined as the grey level values of the picture A at the points $\Psi(w)$ (more precisely, as the values of the global model, representing A).

In fact the procedure described above replaces $\Psi$ by its differential, i.e., it is based on local linearization of $\Psi$. This inaccuracy is justified, since usually the scale of our models is much finer than the scale of non-linearity of $\Psi$.

Rotation is an especially simple example of geometric transformation. Here, all the geometry of the models is rotated to a corresponding angle, while the $\lambda$'s and the rest of the brightness parameters do not change.

Similarly, zoom and rescaling can be interpreted.

3D-geometric transformations

Figure 46:
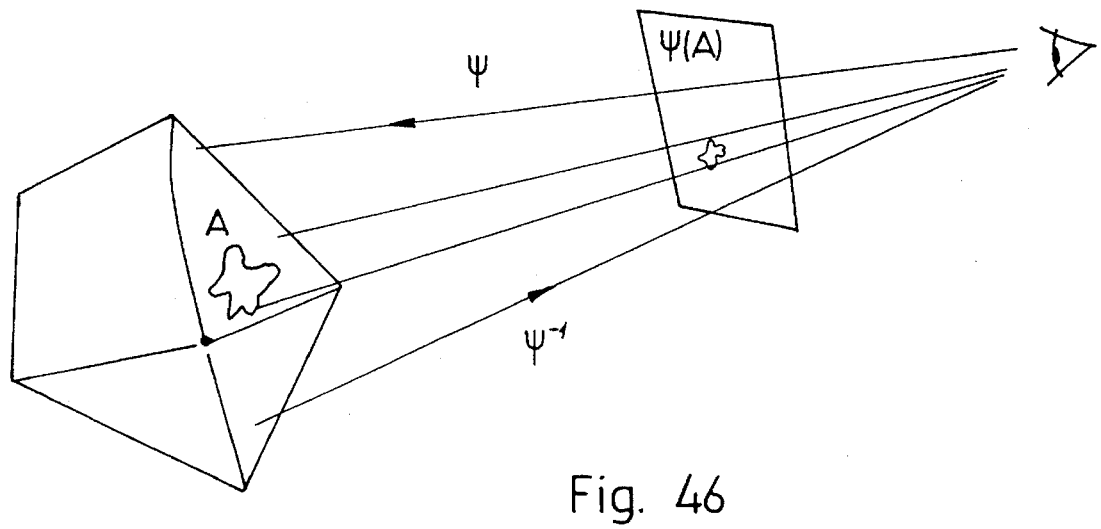

Here the picture A is associated with a certain 3D object, and the transformation $\Psi^{-1}$ is the projection of the object onto the viewer's screen. This is illustrated in FIG. 46.

To produce a picture on the screen in a conventional way, the intersection of the viewing rays through each pixel on the screen with the object must be computed (as well as the grey values (colors) of the picture A at these intersection points—Ray tracing).

The method described above produces from a compressed representation of A and the 3D data the compressed representation of the picture on the viewer's screen. It requires computation of the ray's intersection with the body only for a very small number of points (vertices of polygonal lines and centers of the hills and hollows). Thus, the required amount of computations is drastically reduced.

In this way, high quality pictures can be attached to 2D and 3D graphic primitives as a texture.

As a result, 3D scenes with a high quality realistic texture can be created. It will be possible to produce (with a small amount of computations) the view of this scene from any given position. Thus the user will interactively be able to choose (in real time) his viewpoint, and to "travel" inside the textured scene created.

In particular, a combination of a 3D terrain information (digital terrain model) with a high quality picture of a corresponding landscape will allow one to interactively create a view of this landscape from any desired position. This possibility can be used in entertainment and advertising applications.

Various additional effects in computer graphics, requiring long computation in conventional data structure (texture reflection, shading, etc.) can be performed very fast, if our compressed picture representation is used.

Our compression process for video sequences (see below) preserves the abovementioned properties. Therefore, all the operations described above can be applied to compressed video data. Since these operations are very fast (being performed on compressed data), the real time interactive video manipulation and processing becomes feasible.

Compression of video sequences

1. Generally, moving scenes are represented by sequences of still pictures (called frames), reproducing the scene in fixed time intervals.

Various standards are used for moving scenes representation in TV, video, cinema, computer animation, etc. As an example, we shall discuss below video sequences consisting of 480×720 pixels RGB still pictures, representing the scene in intervals of 1/30 sec. (30 frames per second). However, the compression method described below can be equally applied to other standards (see, for example , discussion of interlaced frames compression below).

In principle, video sequences can be compressed by compressing each frame separately. However, this approach presents two problems:

a. Compression of still pictures usually involves various discontinuities filtering of models and parameters according to certain thresholds, quantization, etc. For a single still picture these discontinuities cause no visual problem. However, in a sequence of frames, the jumps in grey values caused by these discontinuities lead to a serious quality degradation ("flickers", since they usually change from frame to frame in a completely unpredictable way.).

To avoid this affect, the compression must provide a certain continuity in time.

1. Usually, subsequently frames in a video sequence are strongly correlated, being the images of the same scene in a very short time interval. This correlation, which promises a much higher compression ratio for video sequences than for still images, is not utilized by a frame by frame compression.

Therefore, one expects a good video compression process to provide a desired continuity of the compressed pictures in time and to utilize the correlation between the neighboring frames.

Great efforts have been made in developing such processes (see MPEG documents, in publications of the International Standard Organization—ISO, ISO/IEC, JTC 1/S1, 2/WG8). In particular, various "motion compensation" methods have been developed to utilize the fact that some parts of the adjacent frames are obtained from one another by a certain replacement. However, these methods reveal only a small part of a similarity between the neighboring video frames. Indeed, only nearby parts of the scene are moving in a coherent way. Usually various objects are moving in different directions, including the objects in the finest scale (leaves of a tree under the wind, waves on the water surface, texture details on two overlapping objects moving in different directions, etc.). Typically, brightness of the picture can be changed from frame to frame gradually, or sharpness of the frame can change as the result of refocusing of a camera, etc. These types of frame evolution, which certainly present a strong correlation between the neighboring frames, cannot be captured by conventional "motion compensation" procedures. (We shall call below these types of evolution "generalized motions".)

As a result, the existing video compression methods utilize only a small part of interframe correlation, give a low compression ratio and encounter serious quality problems.

2. We propose a method for video sequences compression, based on a still compression scheme, described above. Its basic advantage is that representation of the adjacent frames in our compressed data structure reveals much deeper similarity between them than in any conventional method. In fact, experiments show that in video sequences, representing natural moving scenes or resulting from animation, scientific visualization, etc., the neighboring frames can be represented by essentially the same models, with slightly different parameters.

Thus in our method the neighboring frames are always obtained from one another by a "generalized motion"—i.e., by a variation in time of the parameters of the same models.

Therefore, to represent several neighboring frames in a video sequence, it is enough to compress one of them (i.e., to represent it by our models) and to find the variation of the parameters of these models in time.

Of course, this representation will be visually faithful only for a small number of frames, so we have to repeat this procedure several frames later.

Figure 50:
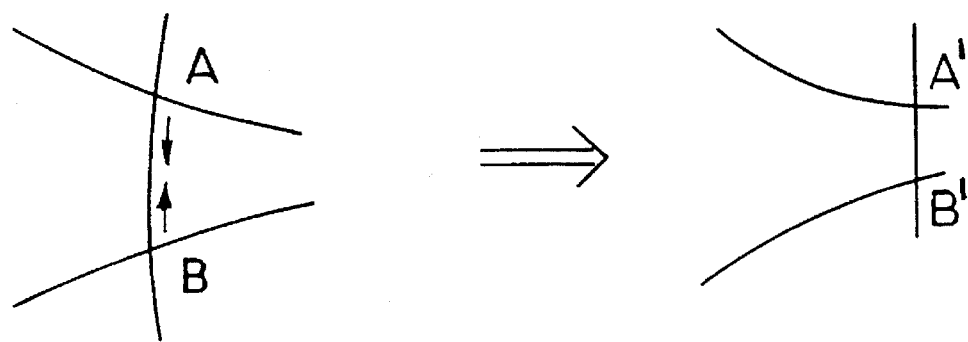

3. Let us give some examples of a representation of a generalized motion by our models.

a. A usual motion of a part of the picture. In this case, the "position parameters" (coordinates of the vertices of the polygonal lines for ridges and edges and coordinates of the centers for hills and hollows) of our models are described in a first order approximation by $x(t)=x(0)+v_1 \cdot t$ $y(t)=y(0)+v_2 \cdot t$ where $v=(v_1, v_2)$ is the motion vector of this part of the picture.

b. In a case where different models are moving in different directions, we have the same representation (*), but the motion vector changes from model to model.

c. In some situations, different vertices of the same model are moving in different directions. For example, (see FIG. 50). for a curvilinear structure in FIG. 50, vertices A and B are moving in opposite directions. In such situations, for each vertex its own motion vector is defined.

d. Gradual changes in sharpness. Here, the "widths" of the models involved decrease and their slopes increase in time. In a first order approximation, this evolution can be described by the same expression (*).

e. Gradual changes in brightness or color—the same as above, but for brightness and color parameters of the models involved.

Usually a first order approximation (*) of the parameters evolution in time provides a visually faithful representation of video sequences for 3 to 6 frames or more.

4. The compression method as above provides a serious additional compression factor (in comparison with a still compression). Indeed, for each 3 to 6 frames we need to memorize only the parameters of one frame and the corresponding generalized motion vectors, which have exactly the same structure as the corresponding parameters. Thus, the data to be stored is less than twice that of a still compressed picture. Since this information is enough to reconstruct 3 to 6 frames, we get an additional factor of 1.5 to 3.

5. However, mostly one does not need to memorize the generalized motion vectors for each model separately, since the parameters of different models usually change in time in a coherent way. Utilization of this coherency we call "generalized motion compensation". It is performed in the following way: We analyze the individual generalized motion vectors for each model and try to find correlations between these vectors.

For example, on certain blocks of the picture we represent these vectors in a form $v_i = v + r_i,$ where v is an average generalized motion vector over all the models in the block, and $v_i$ are the correction vectors for each model.

Usually on relatively small blocks the corrections $v_i$ are negligible, and then only the global generalized motion vector "v" must be memorized per block.

6. In some situations models can appear, disappear or change their type in the process of their evolution in time. Such changes cannot be described by variations of the parameters. However, most of these situations can be covered by simple mathematical models (time-depending), which we call "bifurcations".

Figure 48:
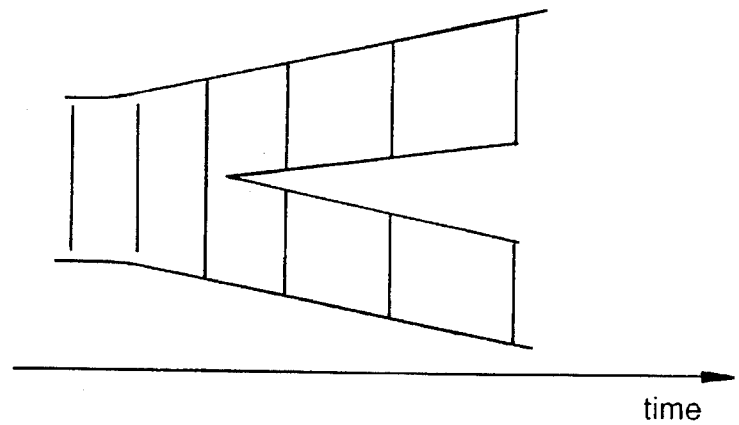

For example, a ridge component can be split into two parts (see FIG. 48).

Figure 49:
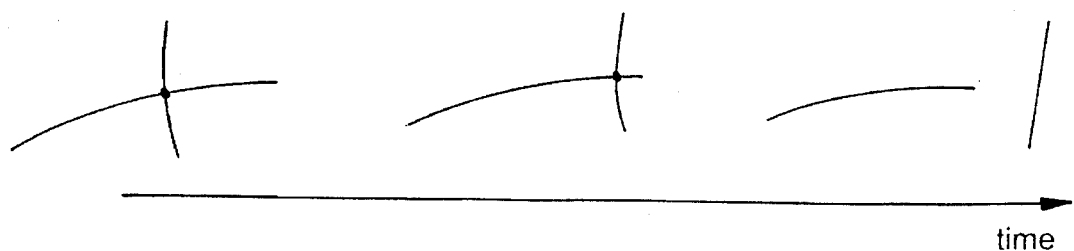

Topology of a curvilinear structure can be changed (see FIG. 49).

To represent such situations, we memorize the type of a bifurcation model involved and its parameters.

7. The general compression scheme above can be implemented in various ways: as the prediction of the following frame on the basis of the previous ones, as an interpolation (not of grey values, but parameters of the models), or as a combination of these and other methods. Below we describe in more detail one specific realization of the method.

Figure 47A:
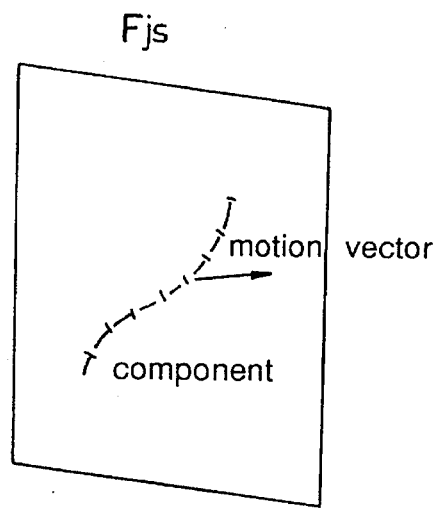
Figure 47B:
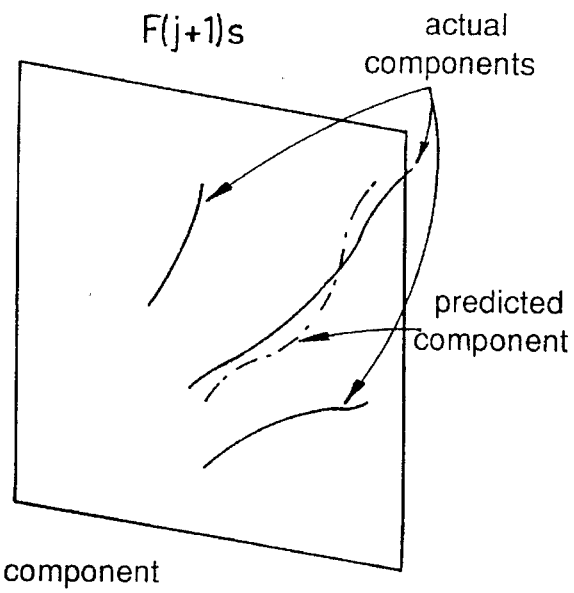

8. The specific realization is based on an explicit compression of some subsequence of the control frames and an intrerpolation of the models parameters from the control frames to intermediate ones. Thus, for a sequence $F_0, F_1, \ldots, F_i$ of frames, we define the frames $F_0, F_s, F_{2s}, F_{3s}, \ldots$ as the control frames and the rest as the intermediate ones. Here s is usually between 3 and 6.

a. Each control frame is compressed as a still picture, as described above.

b. Consider a certain control frame $F_{js}$. For each model $\Phi$, representing this frame, we estimate the motion of its geometric "skeleton" (which consists, by definition in the underlying component for edges and ridges, and in the central point for hills and hollows). Below, this operation is described in more detail.

c. On the basis of a motion estimation obtained in stage b, we predict a position of a model $\Phi$ considered (or of its geometric skeleton) on the next control frame F(j+1)s (see FIG. 47).

d. We try to "match" the predicted model position with one of the models actually detected on a frame F(j+1)s. This is done by calculating the "Hausdorf" distance of the predicted component (center to the actually detected ones and choosing the nearest component $\Phi$. If its distance to the predicted component (center) is less than a certain threshold, we "match" the model $\Phi$ on the frame Fjs with the model $\Phi'$ on the frame F(j+1)s. Hausdorf distance of two sets A and B is defined as max(x in A)min(y in B) distance (x,y).

Now we construct a representation of intermediate frames by the models: for each pair of matched models $\Phi$ and $\Phi'$ on the control frames Fjs and F(j+1)s, we define a model $\Phi''$ of the same type on each frame between Fjs and F(j+1)s, with all the parameters obtained by a linear interpolation of the parameters of $\Phi$ and $\Phi'$.

f. For each unmatched model $\Psi$ on Fjs we define a model $\Psi$ of the same type on each frame between Fjs and F(j+1)s with parameters, obtained by an extrapolation from the previous control frames, and with the brightness parameters multiplied by a factor, linearly decreasing from 1 to 0 from Fjs to F(j+1)s.

For unmatched models on F(j+1)s, exactly the same procedure is performed, but in an opposite time direction.

g. The background or smooth regions data (approximating polynomials or values at the grid G-points—see above) are linearly interpolated from the control frames to intermediate ones.

h. Finally, the color parameters (see above) are also linearly interpolated from the control frames.

Motion estimation

At stage b, we estimate the motion of each component (for ridges or edges) and each central point for hills and hollows. This is done as follows:

a. For ridge components, at the center of each segment in this component we compute (on a 3-dimensional cell of the size n×n×n) a polynominal P of degree 2 of three variables, providing the minimal square deviation from the 3D-grey level distribution, formed by the subsequent frames, where the time t is considered as the third coordinate. Here n is measured in pixels in the frame directions and in frame numbers in time direction. Its typical values are between 4 to 6. Then the quadrated part of P is transformed to the main axis (diagonalized). We define the plane of a motion of the segment as the plane, spanned by the two eigenvectors of P, corresponding to the smallest eigenvalues (Note that a segment was spanned by the eigenvector, corresponding to the smallest eigenvalue in a two-dimensional case.).

Then the motion plane of the component is defined by an averaging of the motion planes of its segments.

Finally, if between the motion planes of the segments are pairs, forming sufficiently big angle between them, we define the motion vector of the component as the average of the vectors corresponding to the intersections of the motion planes of these pairs of segments.

b. For edge components, at the center of each edge element, forming this component the same polynomial P of three variables as in "a," is constructed. The motion plane of the edge element is defined as the tangent plane to the level surface of P. The motion plane and the motion vector for the component are defined from the motion planes of the edge elements in the same way as in a for ridges.

c. For the central points of hills and hollows, the same polynomial P as above is computed and diagonalized. The motion vector of the center is defined as the eigenvector of P, corresponding to the smallest eigenvalue.

For interlaced sequences the corresponding 3-dimensional array is constructed by subsequent half-frames (each on its corresponding pixels). The approximating polynomials is then constructed on a cell of the size n pixels×n pixels×2n half frames. The rest of the compression process is performed as above.

The compressed data according to the procedure described above, consists of:

compressed data for each control frame;

pointers of watching, showing for each model on the control frame the watched model on the next one (or indicating that the model is unmatched).

Since the pointers require a relatively small percent of a compressed data volume, the additional compression factor here is approximately s-the distance between control frames.

Usually, almost all the pointers can be eliminated by the following procedure:

a. Using the compressed data on the two previous control frames, one can predict a motion of each model, and its position on the next control frame. Usually, this prediction is accurate enough to find the nearest actual model, which is a matched one, thus eliminating the necessity of a pointer.

b. Moreover, the same prediction can be used to simplify encoding of the next control frame-for each its model only corrections of the parameters with respect to the predicted ones must be memorized.

c. A "generalized motion compression" as described above can be applied.

Decompression

For each control frame its compressed representation is stored in a compressed data. For each intermediate frame, its (compressed) representation is constructed, as described above. Finally, each frame is decompressed as a still image.

9. Operations on compressed data

All the properties, which allow for image processing operations to be performed on a compressed data for still images, are preserved in a video compression scheme described above. Therefore, all these operations can be performed on a video compressed data. Moreover, they become relatively even more effective, since they must be performed only on the control frames: the interpolation procedure described above automatically extends them to the intermediate frames.

10. The video compression procedure, described above, is computationally effective, for the following reasons:

a. Only the control frames are entirely compressed as still images (Note that all frames can be analyzed to provide a better detection.).

b. The most computationally intensive part—motion detection—is performed only for components and centers—i.e., for a significantly reduced data.

c. Finally, the "motion compensation" part is performed on a compressed data.

The results obtained by the process according to the invention and its stages are further illustrated by FIGS. 51 to 67.

The following pictures represent the results and some intermediate steps of a compression of still images and video sequences, performed according to our method. All the operation has been performed on a SUN sparc 1 workstation.

Figure 51:
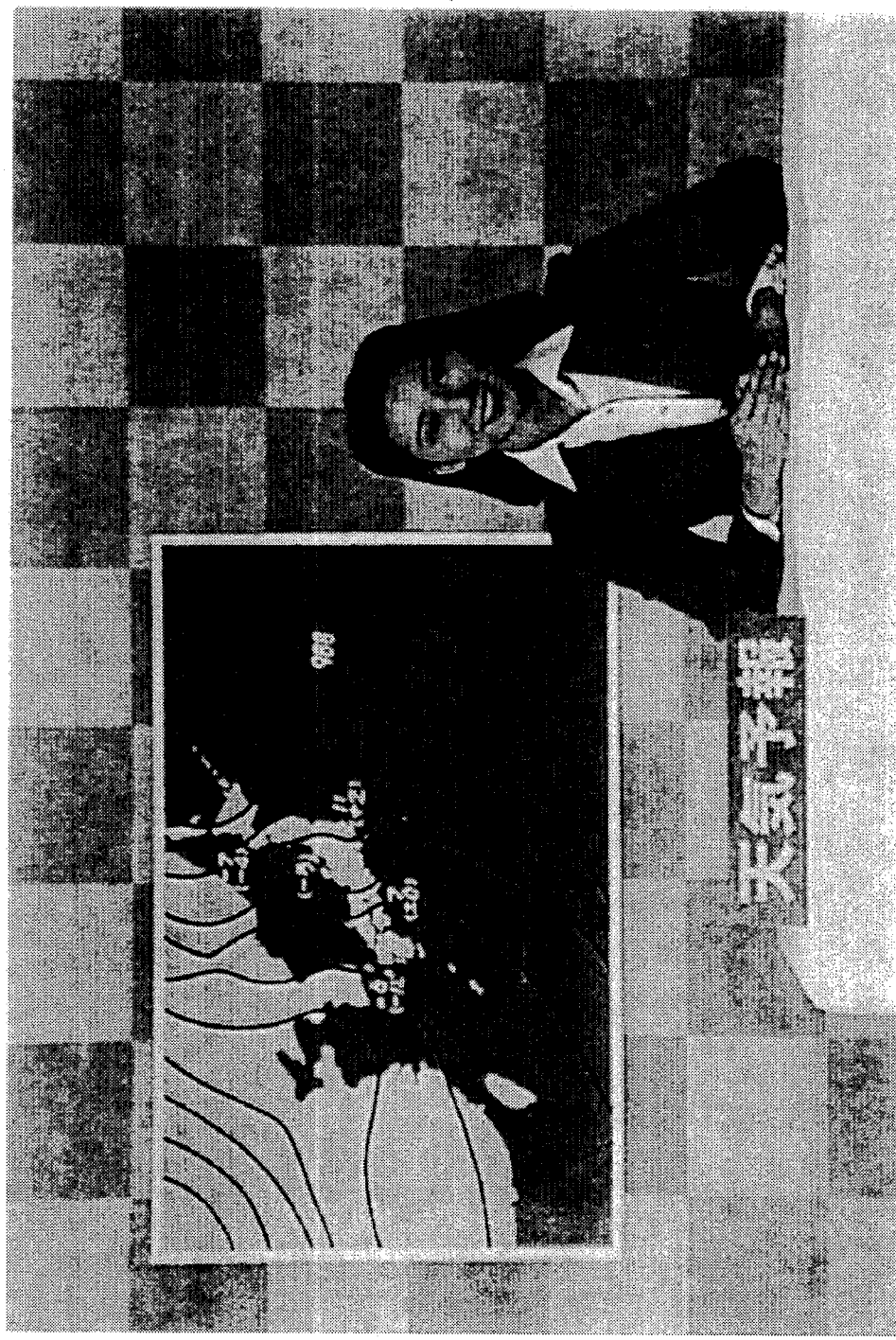
FIG. 51 is an original RGB still picture of the size approximately 480×720 pixels.

1. FIG. 51 represents the original RGB still picture of the size approximately 480×720 pixels.

Figure 52:
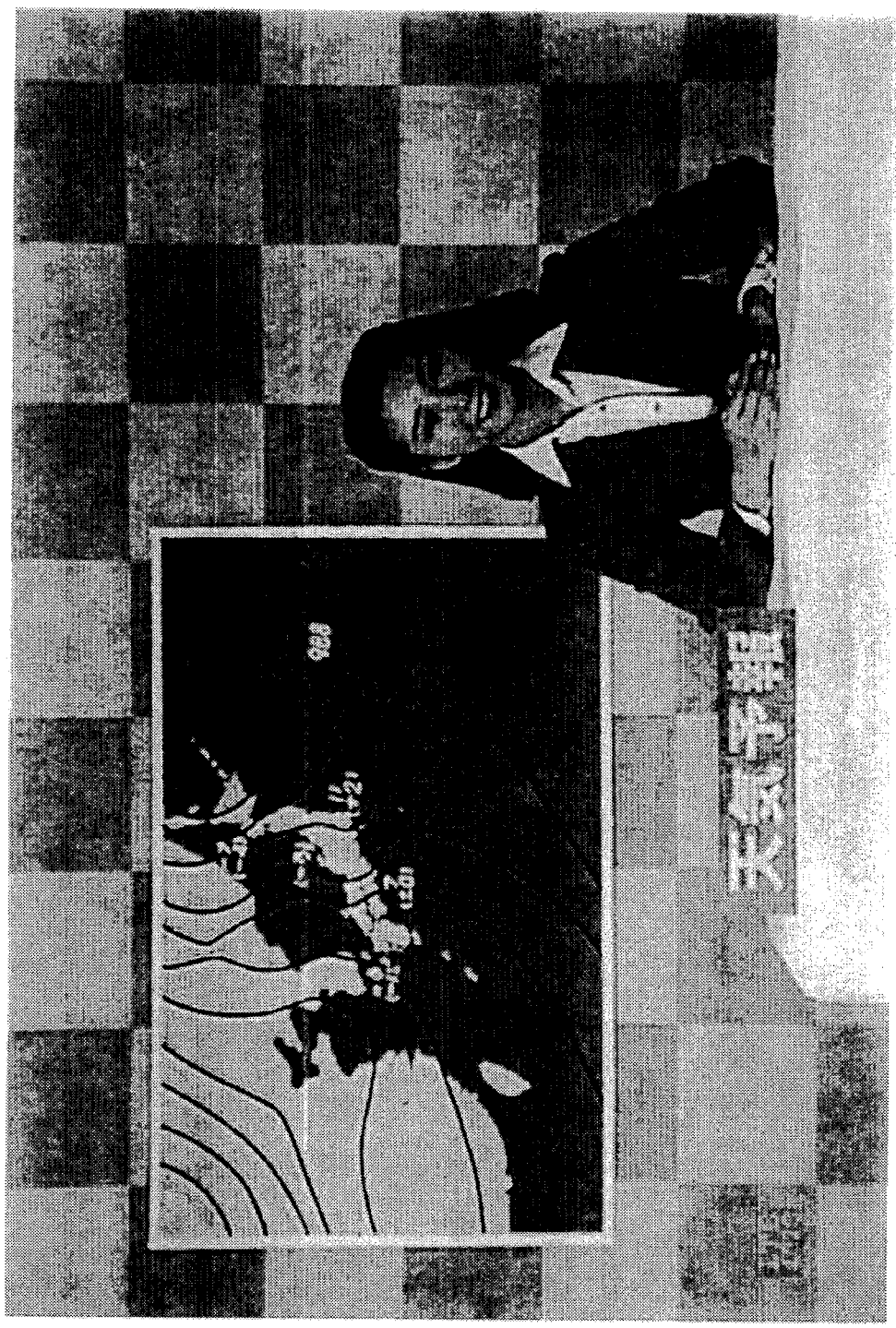
FIG. 52 represents the same picture after compression by the process according to the invention to 1/50 of the initial data volume and decompression.

FIG. 52 represents the same picture after compression by our method to 1/50 of the initial volume and decompression.

Figure 53:
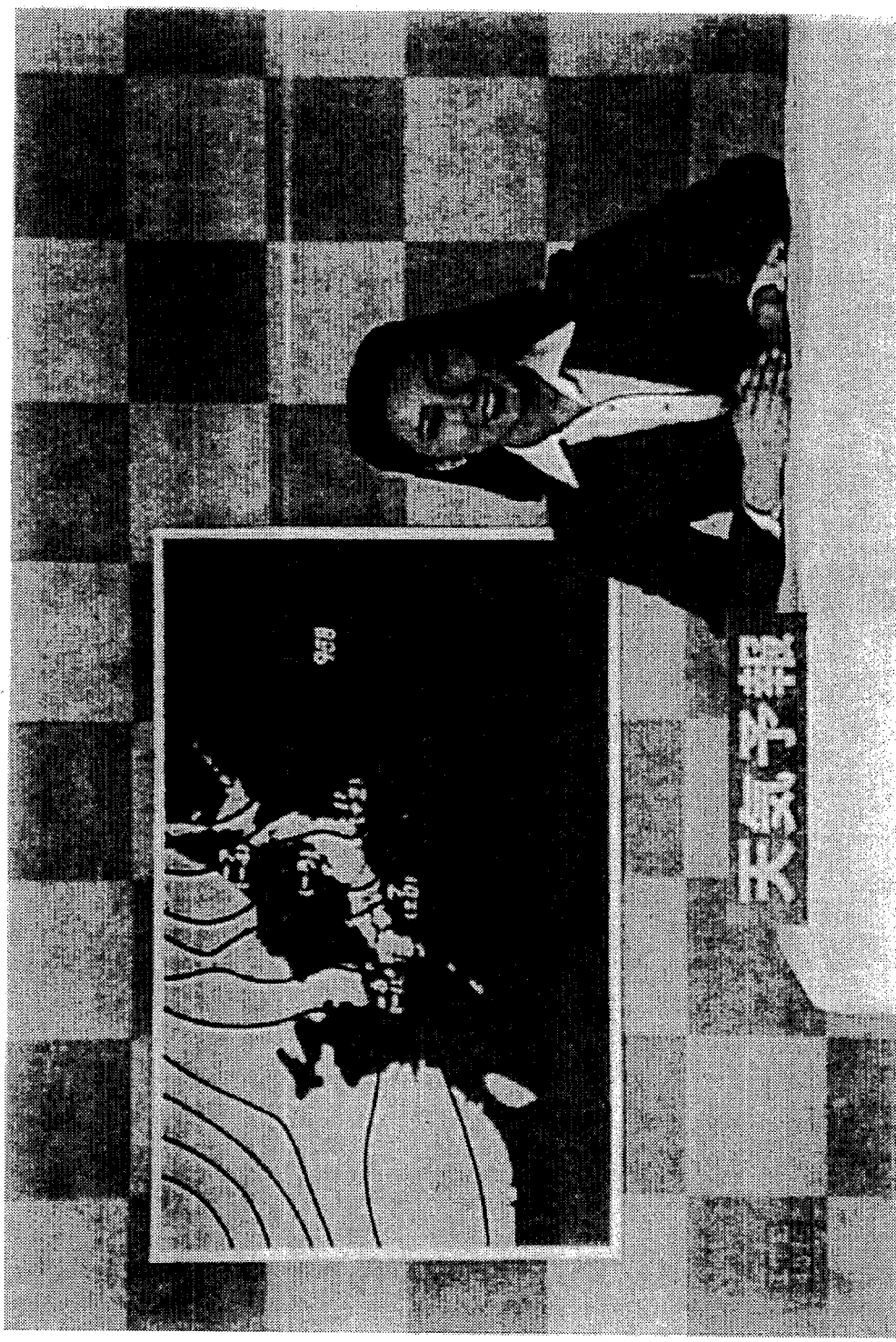
FIG. 53 represents the same picture after compression to 1/40 by the standard JPEG method and decompression.

FIG. 53 represents the same picture after compression to 1/40 by the standard JPEG method and decompression.

Figure 55:
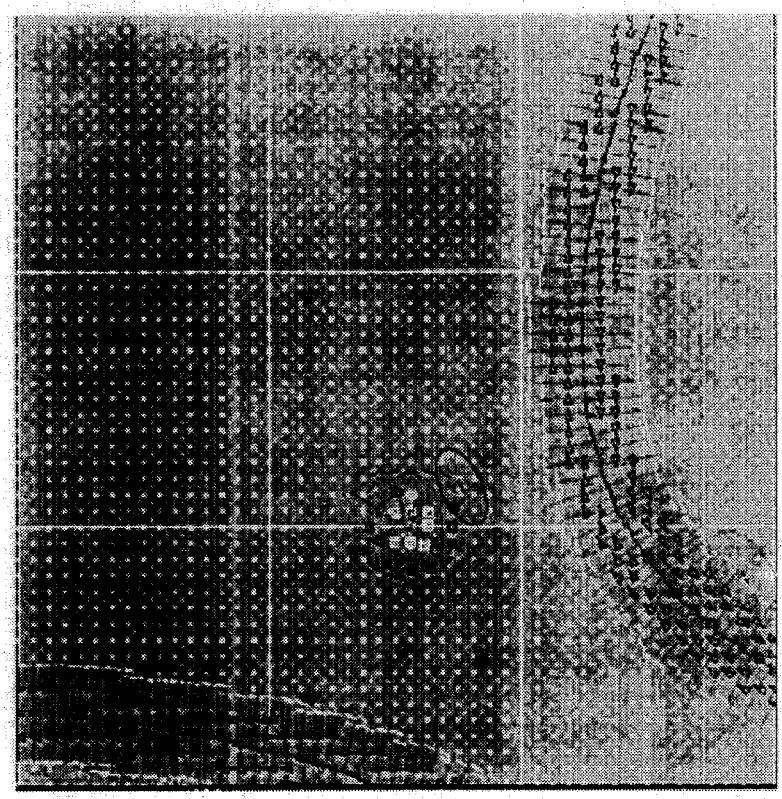
Figure 54:
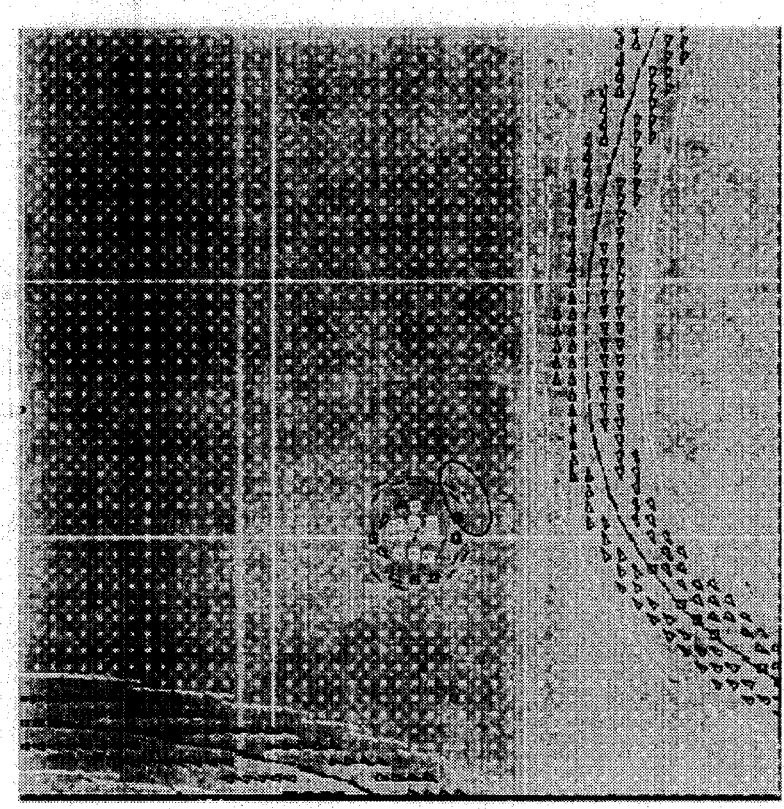
Figure 56:
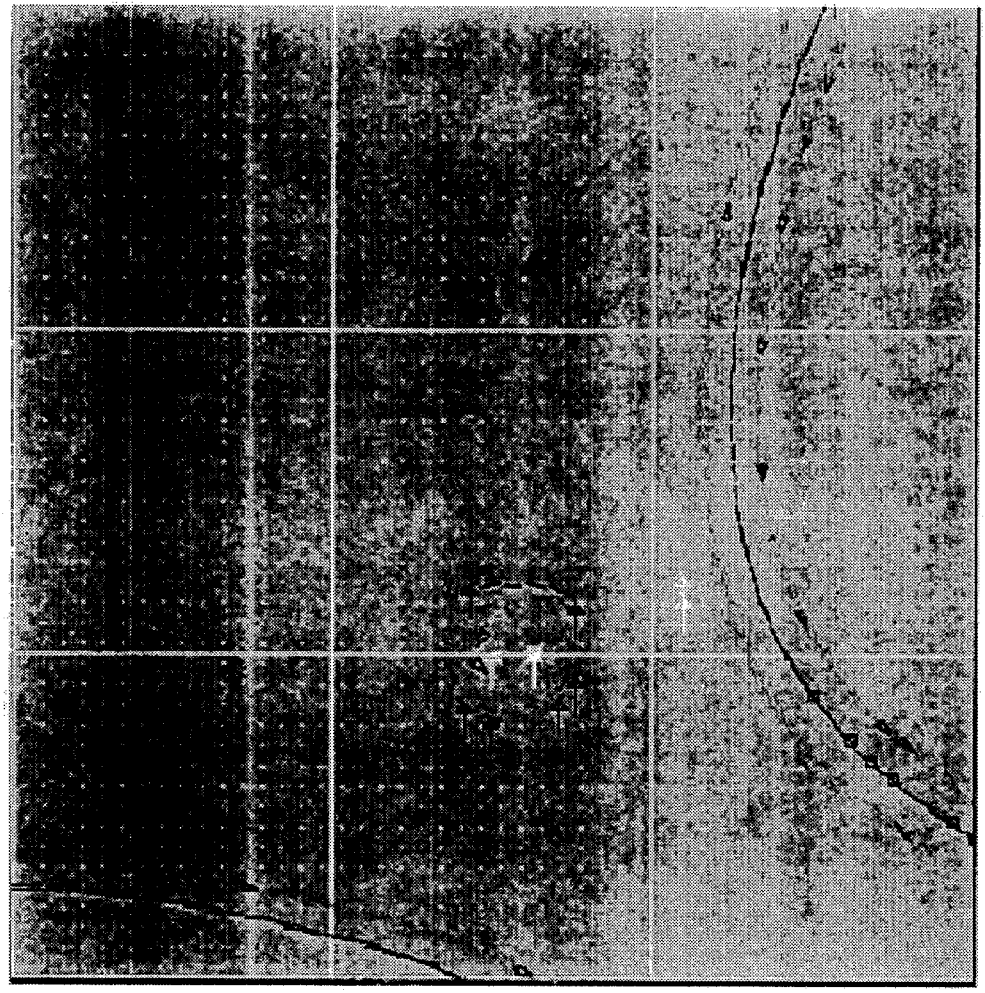

2. FIGS. 54, 55, 56 show the stages of analysis of the 48×48 pixels region, indicated by a black square in FIG. 51. They represent this region at an enlarged scale.

Each white point represents a pixel. White stars on FIGS. 54 and 55 represent the points of the basic grid in the region $A_1$.

The black and white segments detected in the region $A_3$ are shown by small intervals of the corresponding color. Hills and hollows are shown by ellipse, and the gridpoints in the region $A'_2$ are shown by the triangles (FIG. 54).

The green intervals on FIG. 55 represent the edge elements detected.

FIG. 56 represents the result of the edge-line procedure, as described above.

Figure 57:
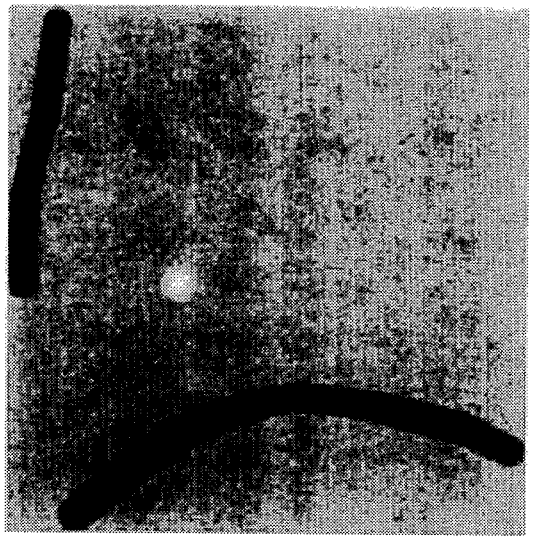
FIG. 57 represents the original of the 48×48 pixels region, its representation by the global model before quantization and after quantization (small pictures from left to right). Big pictures represent the same images in a 1:5 zoomed form.
Figure 57:
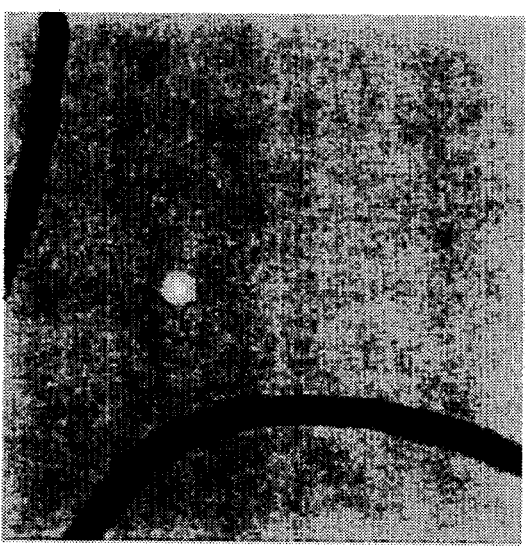
Figure 57:
Figure 57:
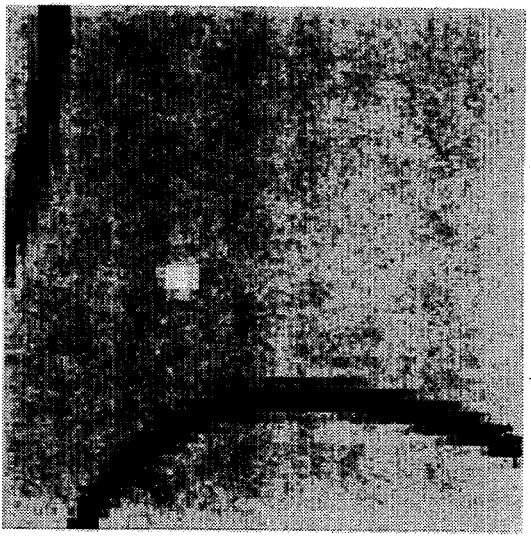

3. FIG. 57 represents the original of the 48×48 pixels region, its representation of the global model before quantization and after quantization (small pictures from left to right). Big pictures represent the same pictures in a 1:5 zoom form.

Figure 58:
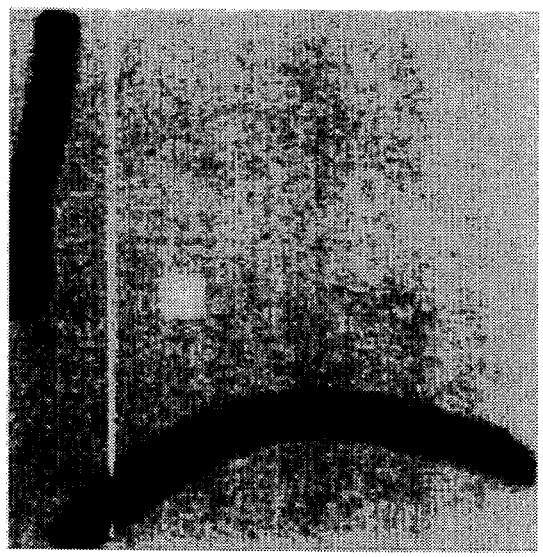
FIG. 58 represents the result of a picture processing operation, performed on a compressed form of the above picture.
Figure 58:
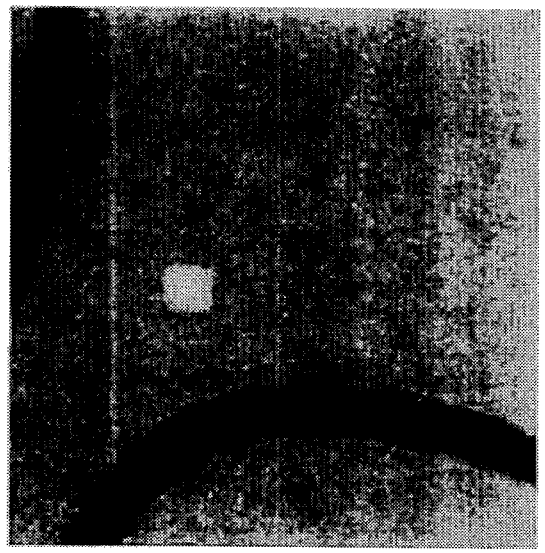
Figure 58:
Figure 58:
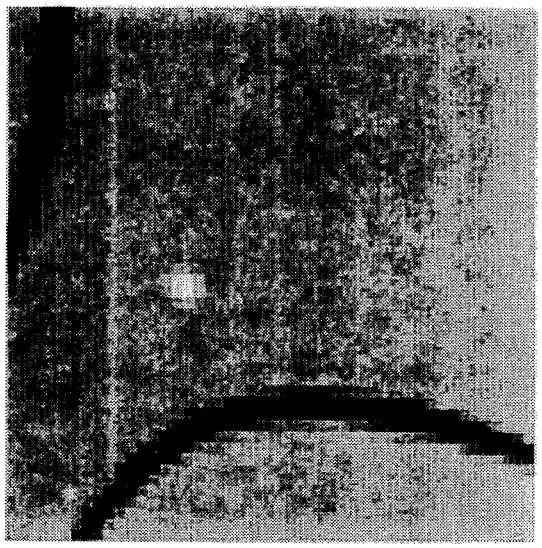

4. FIG. 58 represents the result of a picture processing operation, performed on a compressed form of the above picture:

The width of the models has been enlarge and their brightness has been decreased.

The zoom, represented on FIGS. 57 and 58, gives another example of an operation on compressed data. It has been performed by changing the decompression parameters, as described above.

Figure 59:
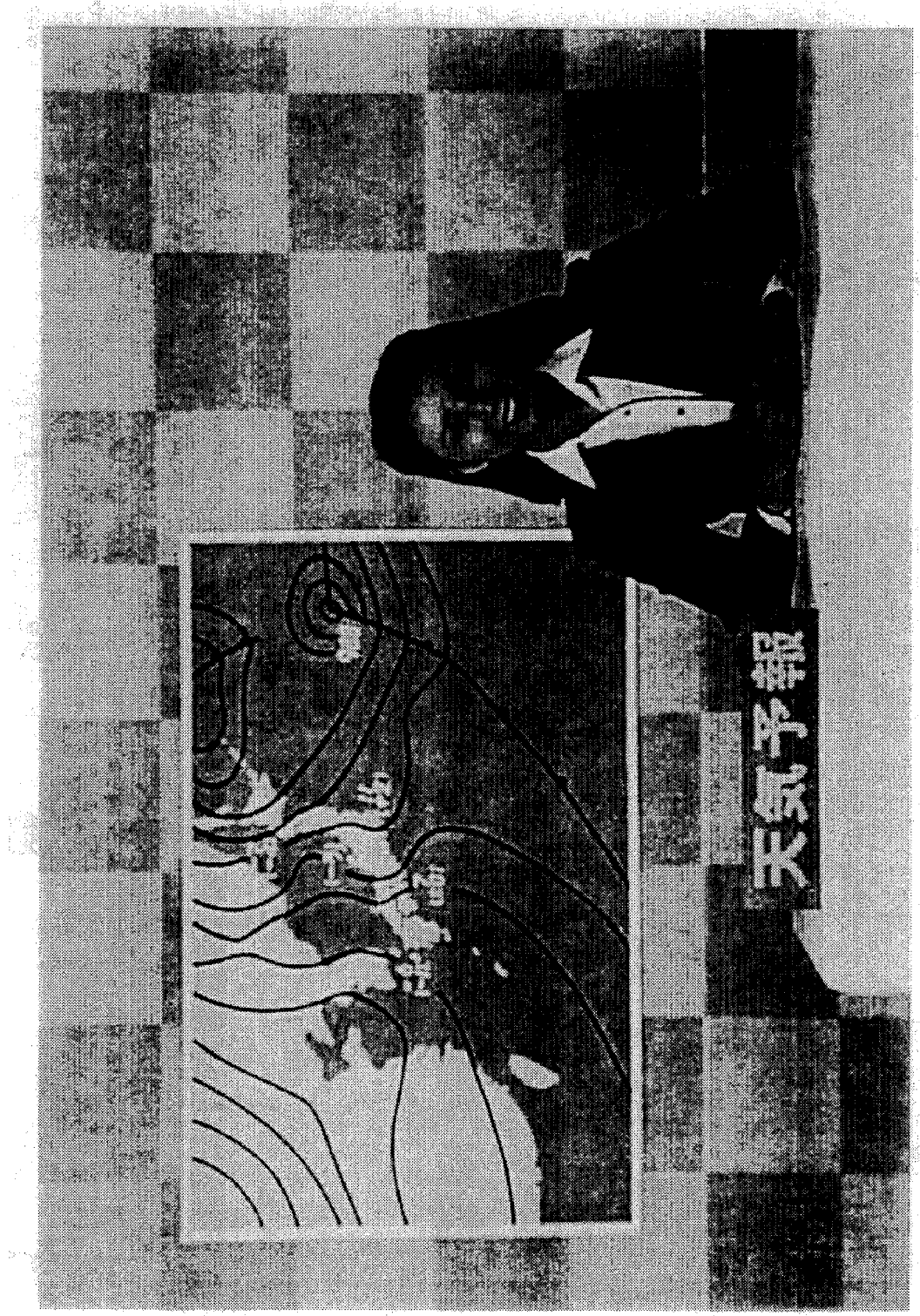
FIGS. 59, 60, 61 represent three color separations (R,G,B) of the picture of FIG. 52 compressed and decompressed according to the invention.
Figure 60:
Figure 61:

5. FIGS. 59, 60, 61 represent three color separations (R,G,B) of FIG. 52 compressed and decompressed by our method. The R separation is compressed according to the complete process described above. Separations G and B are represented through R, as described hereinbefore.

6. FIGS. 62–67 represent the video sequences compression.

Figure 62:
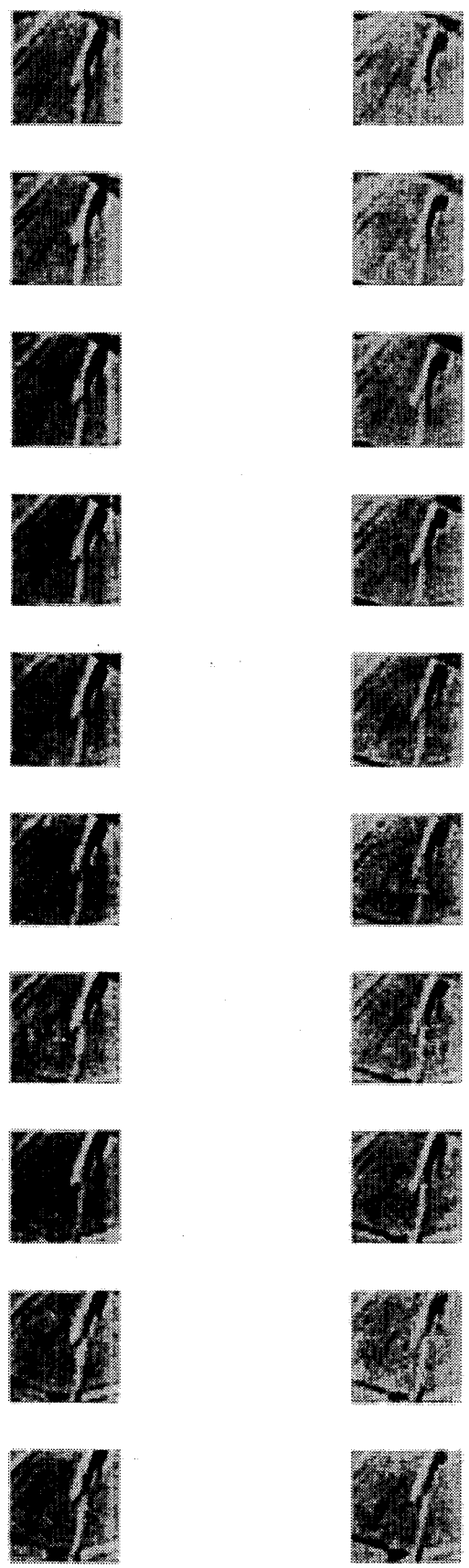
FIGS. 62–67 represent the video sequences compression.

FIG. 62 represents 10 frames of a videosequence (on a 48×48 region). The upper line is the original sequence, and the bottom line is the sequence after compression (1:150).

Figure 63:
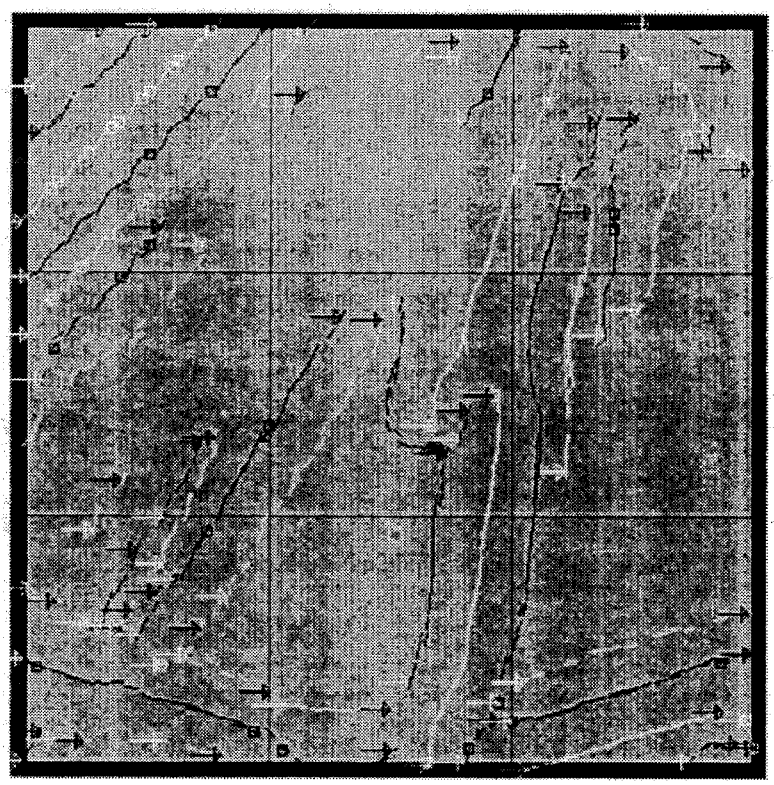
Figure 64:
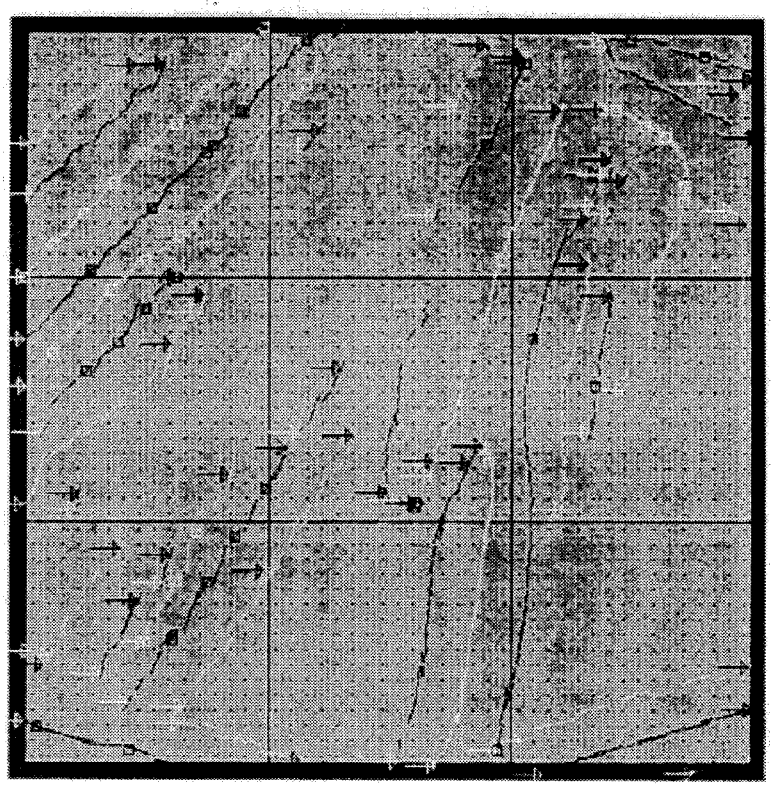

FIGS. 63 and 64 show the results of analysis of the frames 4 and 7 (control frames) as still pictures (the arrows represent the endpoints of the ridge components detected).

Figure 65:
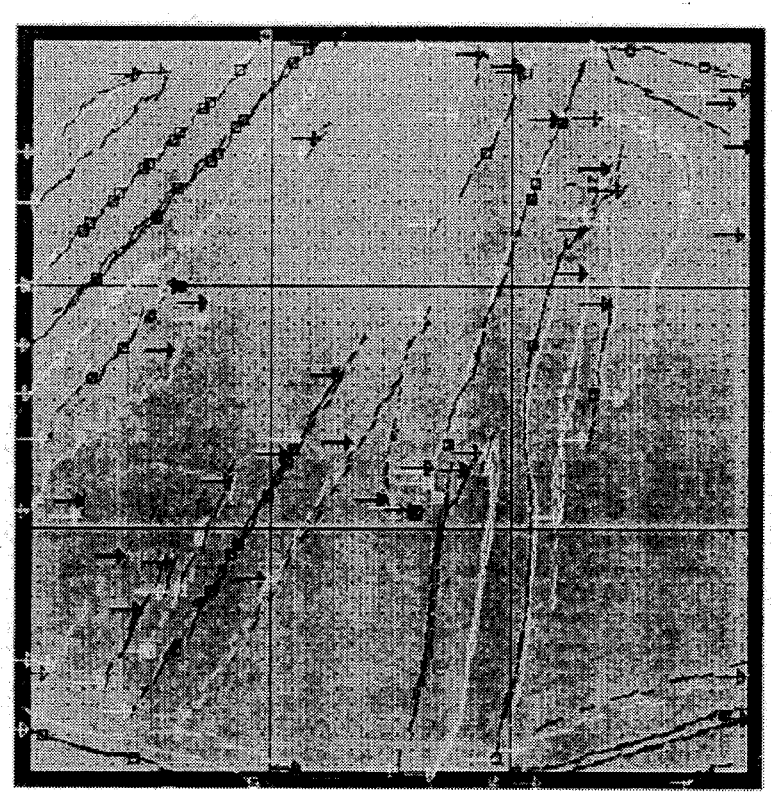

FIG. 65 shows (by yellow and blue components) results of the motion predicted for the components from the frame 4 on frame 7.

Figure 66:
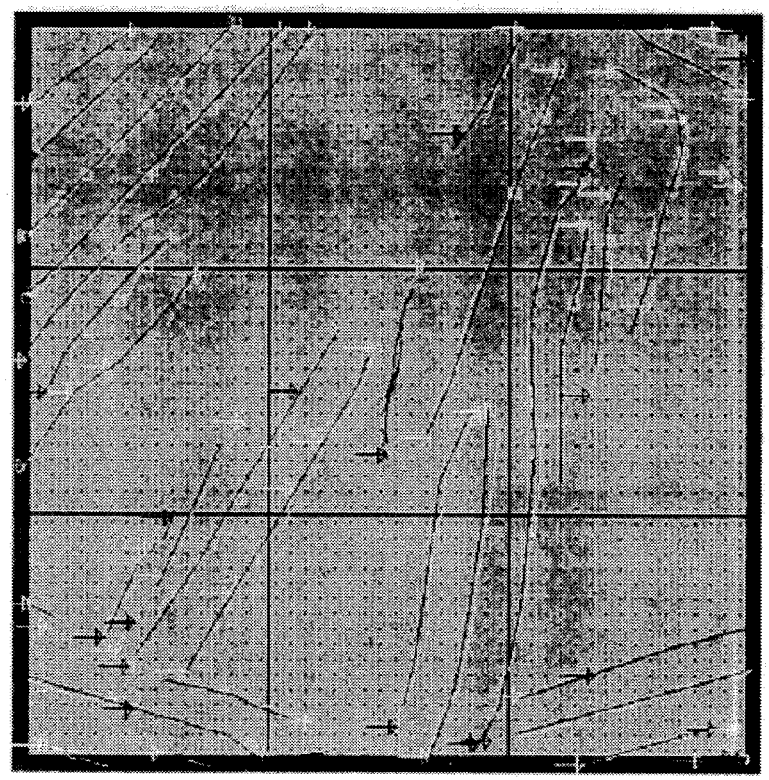
Figure 67:
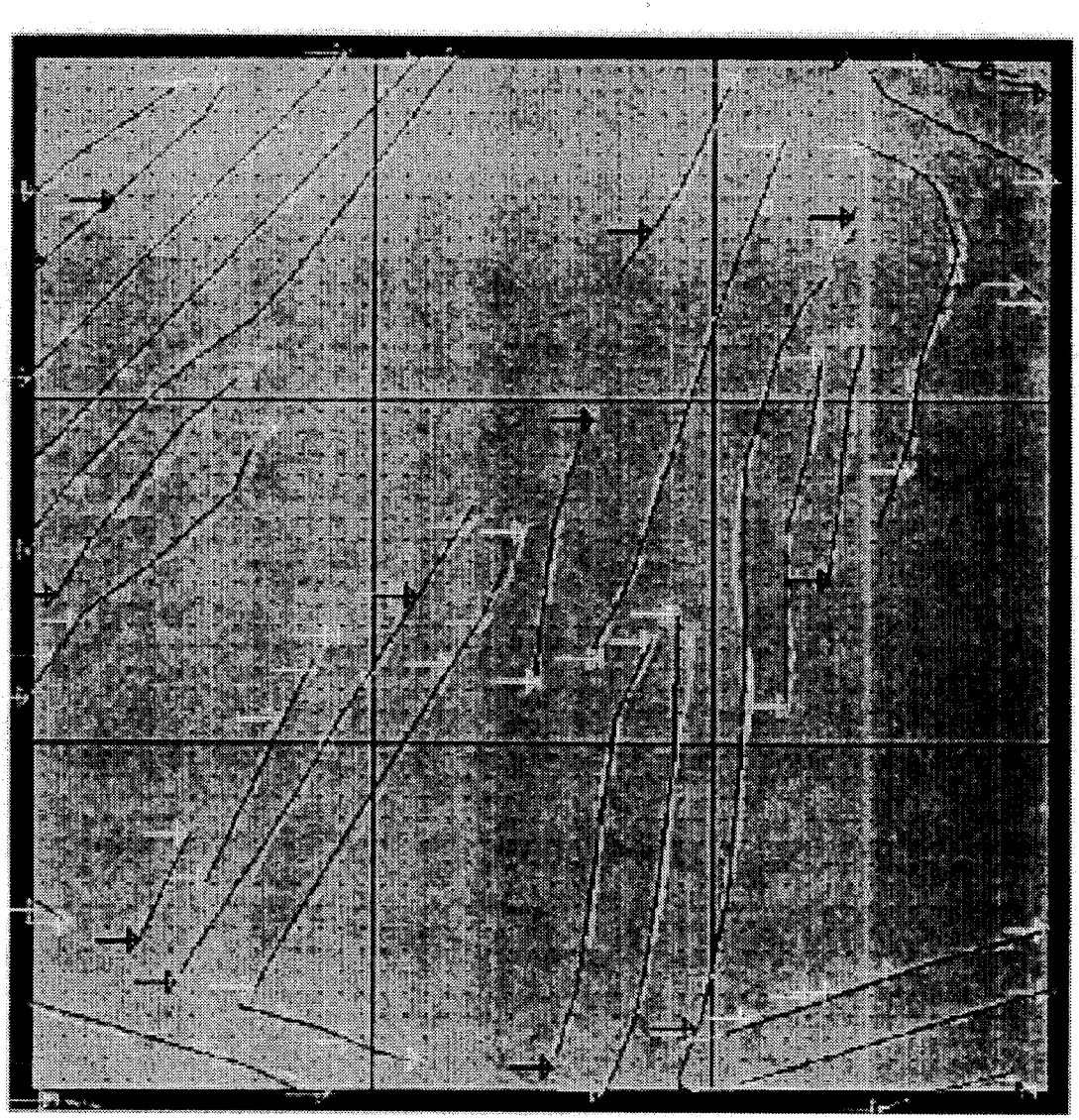

FIGS. 66 and 67 show the interpolated positions of the components (blue lines) against the real position (yellow lines) on the intermediate frames 5 and 6.

In another embodiment of the invention, in which the basic structures are not identified as in the previous embodiment, the following operations are performed:

A picture is always considered as an array of pixels, $P_{ij}$, of various sizes, for example 480×700, viz. $1 \leq i \leq 480$ and $1 \leq j \leq 700$. This array is assumed to be contained in the plane with coordinates x,y. Thus each pixel has discrete coordinates x,y, though the coordinates themselves are considered as continuous. The grey level brightness distribution z=f(x, y) assumes at each pixel $P_{ij}$ the value $z_{ij}=f(x_i,y_j)$, where the values of z vary between 0 and 255. A colour picture is generally defined by three intensity functions R(x,y), G(x,y) and B(x,y), each assuming values between 0 and 255, or by equivalent expressions obtained by the transform coding methods hereinbefore mentioned.

Considering now a single cell, one of the possible implementation processes according to the invention is carried out as follows. The simplest basic element type is chosen and the corresponding model's parameters are determined by minimizing, by known minimization routines, the deviation thereof from the actual object contained in the cell. As a measure of said deviation it is convenient to assume what will be called the "square deviation", viz. the sum of the squares of the differences between the values which the function z=f(x,y), defining the object, has at the various pixels and the corresponding value of the function Φ defining the model, viz.:

$$\sigma(f,\Phi)=\sigma[f(x,y)-\Phi(x,y)]^2.$$

σ is minimized for each cell with respect to the parameters of Φ, e.g. by a standard minimization routine such as those from the IMSL library. If σ is not greater than a predetermined threshold value T, the model is assumed to represent the object and the processing of the cell is stopped. The threshold value T may vary for various applications, but in general it is comprised between 5 and 15, and preferably is about 10, in the scale of the z or RGB values. If σ>T, the procedure is repeated with another basic element model, and if none of them gives a small enough square deviation, the procedure is repeated with a model which is the sum of all the previously tried models. If, even thus, the square deviation is greater than the threshold value, the scale L is decreased. Experience has shown that, if the characteristic scale L is small enough, every object can be represented by a few basic element models.

Each model or combination of models is identified by a code number. Said number and the parameters of the model or combination of models assumed to represent the object of the cell, constitute the "primary compression" data relative to said cell.

At this stage, part of the primary compression data may be omitted and another part simplified, depending on their psychovisual contribution. Thus some small structures may be neglected, some other may be approximated (e.g. ellipsoidal ones by spherical ones), etc.

After the said secondary compression, quantization may be carried out. "Quantization" means herein using only a number of the possible parameter values, e.g. approximating each value by the nearest among an array of values differing from one another by a predetermined amount, e.g. 0, 32, 64 etc, thus considerably reducing down from 256 the number of possible values.

At this stage, the correlations between parameters relative to different cells may be taken into account, whereby larger models, which extend throughout regions that are bigger—e.g. 2–3 times bigger—than a single cell, may be defined. This further simplifies the compression data by extending the validity of certain parameters to larger areas. E.g., the same polynomial may represent a smooth curve extending through several neighbouring cells, curvilinear structures extending through several neighbouring cells may form regular nets, and the like. Small corrections on a single cell level may be required and stored.

All the aforesaid approximation methods may lead to discrepancies between neighbouring cells. These discrepancies may be smoothed out during the decompression stage, during which the basic elements of the same type (e.g. smooth regions, curvilinear regions etc) are smoothed out separately.

A particular application of the invention is the compression of TV pictures. It has been found that in any such picture, one can find certain smooth regions, curvilinear structures and local simple objects, such that:

a) the number of such basic elements in any standard cell is small, usually 5 or 6, the value of L being, as stated hereinbefore, preferably about 12 pixels;

b) any array of models, which represents faithfully (in a visually undistinguishable way) each of the above elements, faithfully represents the whole picture.

Rather high compression of TV-pictures is thus possible: the models contain a small number of parameters; each of them must be defined by at most 256 values.

An example of the implementation of the process according to the invention will now be given.

Figure 68:
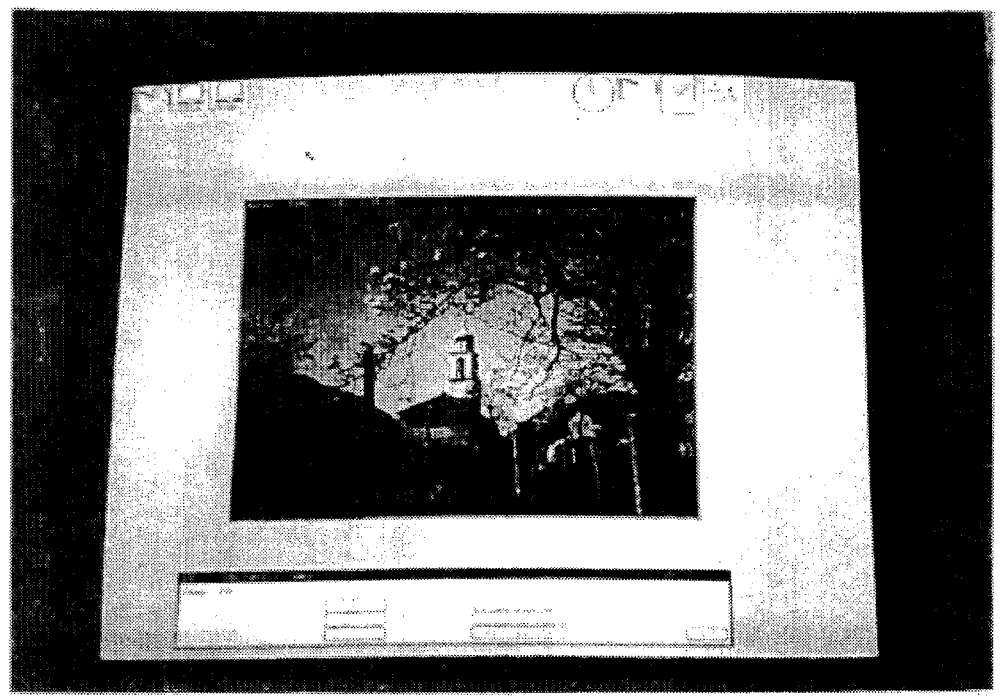
FIG. 68 is a picture to be represented by compression.
Figure 70:
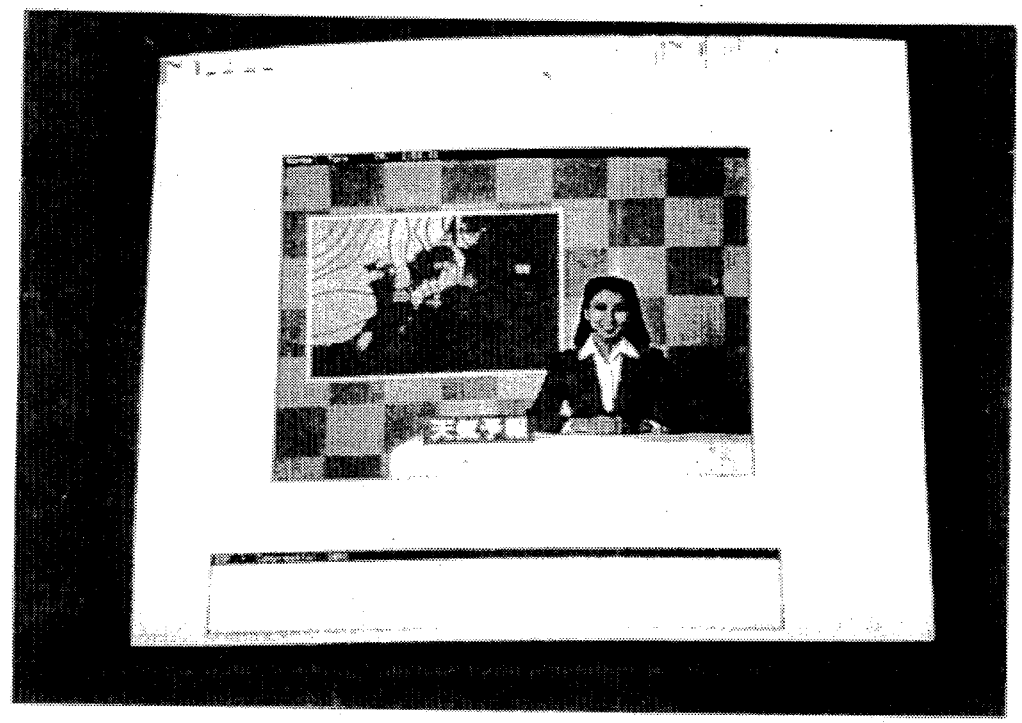
FIG. 70 is another picture to be represented by compression.

The picture to be represented by compression is a colour picture, as shown in FIG. 68 or FIG. 70. The following basic elements and models are used:

1 Model: smooth region—$z=\Phi^1(x,y)=P_1(x,y)=a_{00}+a_{10}x+a_{01}y+a_{20}x^2+a_{11}xy+a_{02}y^2+a_{30}x^3+a_{21}x^2y+a_{12}xy^2+a_{03}y^3$. This model has 10 parameters.

2-Model: curvilinear structure—$z=\Phi_2(x,y)$

To define this model we use an orthonormal system of coordinates $u,v$ that is rotated by an angle $\theta$ counterclockwise with respect to the system $x,y$. The central curve of the "line" is given by the equation $v=r+ku^2$. The model is defined by:

$\zeta=\Phi_2'(x,y)=z_1=p_{00}+p_{10}x+p_{01}y$ for $v \geq r+ku^2+h$ $z_2=p_{00}'+p_{01}'x+p_{01}'y$ for $v \leq r+ku^2-h$ $z_3=tz_1+(1-t)z_2$, where $t=(v-ku^2+h)/2h$, for $r+ku^2+h>v>r+ku^2-h$, and $z=\Phi_2(x,y)=\Phi_2'(x,y)+cA$, where A is the "profile function", equal to $[(2t)^2-1]^2$, with t as above, for $0 \leq t \leq 1$, and A equal to 0 otherwise.

Thus the model $\Phi_2$ is completely determined by the parameters $\theta, r, k, h, p_{00}, p_{10}, p_{01}, p_{00}', p_{10}', p_{01}', c$—altogether 11 parameters.

3-Model: simple local objects—$z=\Phi_3(x,y)$. Firstly we define a "supporting ellipse" by the angle $\theta$ which the short semiaxis makes with the x-axis, by the coordinates $x_0, y_0$ of the center, and by the values $r_1 \leq r_2$ of the semiaxis. The $\Phi_3$ is defined as $x=\Phi_3(x,y)=c(u^2/r_1^2+v^2/r_2^2)$, where u and v are the coordinates of the point (x,y) in the coordinate system (u,v) hereinbefore defined. Here $\psi(s)$ has the form $(s^2-1)$. Finally, the model generated by the objects contains "l" objects, with $1 \leq l \leq 6$. The value of z that is finally obtained is the sum of the values of $\Phi_3$ for all objects.

Usually, one stores the coefficients of the orthonormal system $(u,v)$ rotated by the angle $\theta$. Thus the model is characterized by:

1-the number of objects;

2-for each object, the coordinates $x_0$, $y_0$, the angle $\theta$, $r_1<r_2$, and the coefficient c of each object in the linear combination.

3-thus the model on a cell of the third type is given by $z=q_0+q_1x+q_2y+c_1\Phi_3^1(x,y)+\ldots+c_l\Phi_3^l(x,y)$ It is more convenient to store the coefficients q and c in a transformed form. We consider the functions 1, x, y, $\Phi_3^1$, ..., $\Phi_3^l$ as vectors in the inner product space of all the functions $z=g(x,y)$ on the pixels of the cell under consideration. Then we apply the Gramm-Smidt orthogonalization procedure to the vectors and store the coefficients of the orthogonalized system. Those are the coefficients given in the Tables that will follow. In the following examples L=10, the cells are squares 10×10.

Figure 69:
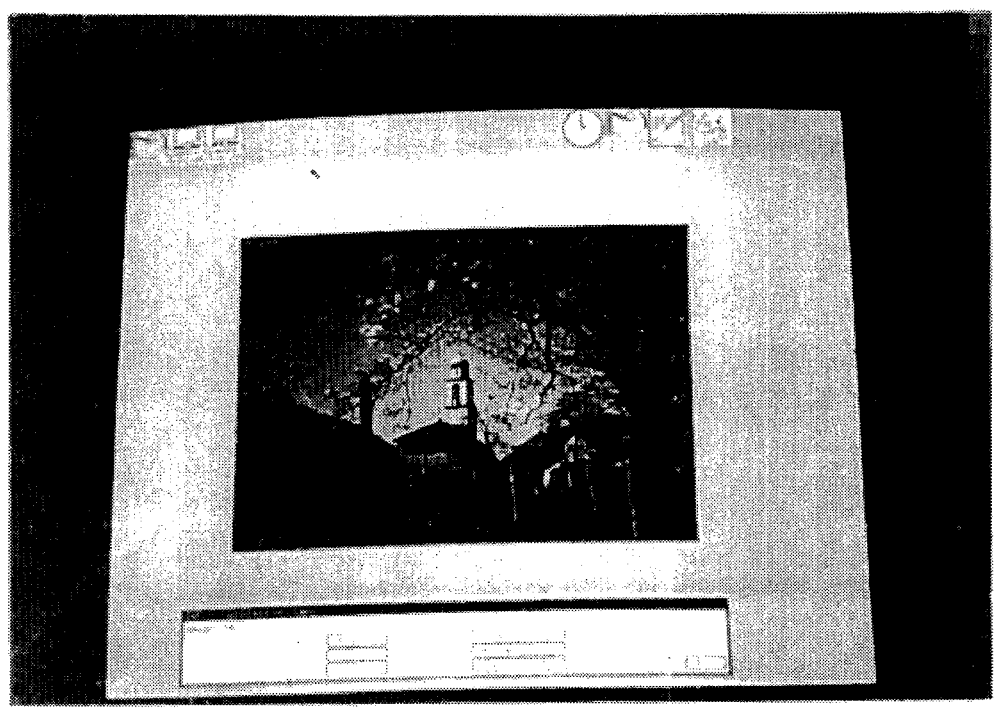
FIG. 69 is a representation obtained by decompressing data that had been compressed at a ratio of 1:35.
Figure 71:
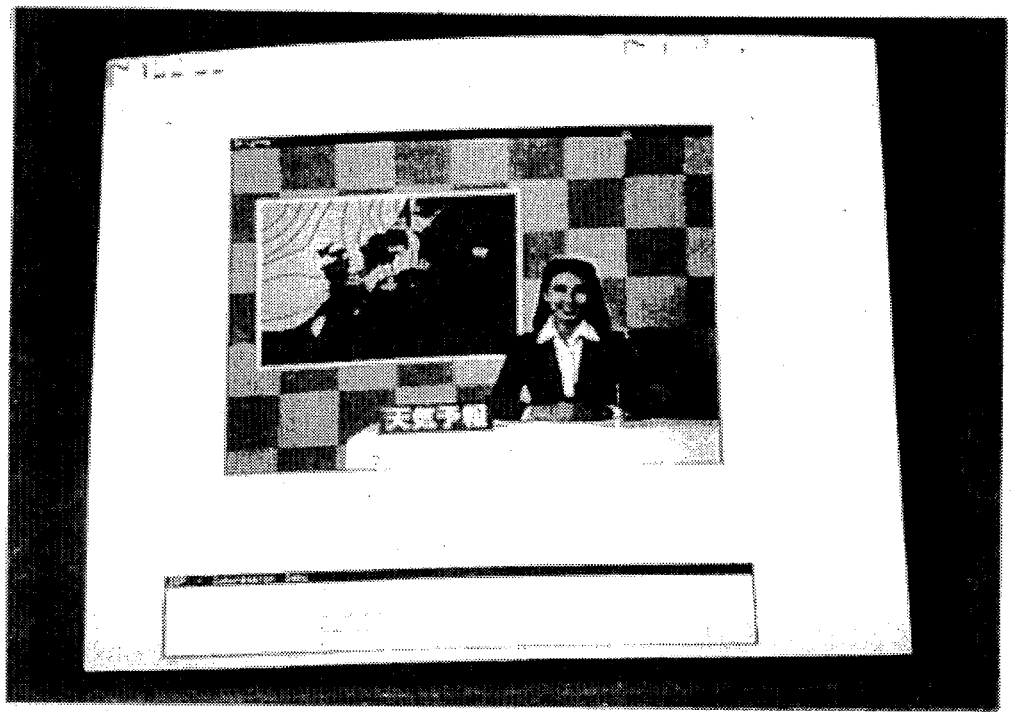
FIG. 71 is its representation obtained by decompressing data that had been compressed at a ratio of 1:50.

FIG. 68 shows an original picture—a landscape—to which the invention is applied. The procedure hereinbefore described has been followed. Table 1 shows the grey level values of a 40×40 region of the original, which is marked by a black dot in FIG. 69, which shows the decompressed reproduction. It is seen that this latter is quite undistinguishable from the original. Table 2 lists the grey levels of the models of the same region. Table 3 lists the same data of Table 2, but after quantization of the models. Table 4 lists the parameters of the models, which are of the type 3 (simple local objects) described above, indicated by code H, which constitute the compressed data. Each group of successive 5 rows contains the coefficients of one cell. Table 5 lists the same data as Table 4, but after quantisation. FIG. 70 shows another original picture—a girl sitting at a desk—and FIG. 71 the decompressed reproduction. Once again, the two images are undistinguishable. Tables 6 to 10 respectively correspond to Table 1 to 5 of the preceding example. However it is seen in Tables 9 and 10 that models indicated by E and T have been used: these respectively indicate models of the type 2 (curvilinear structures) and 1 (smooth regions) described hereinbefore.

While particular embodiments have been described by way of illustration, it will be understood that they are not limitative and that the invention can be carried out in different ways by persons skilled in the art, without departing from its spirit or exceeding the scope of the claims.

TABLE 1

| 125 | 57 | 58 | 89 | 74 | 57 | 64 | 57 | 50 | 64 | 73 | 66 | 72 | 78 | 74 | 75 | 76 | 95 | 105 |
|---|---|---|---|---|---|---|---|---|---|---|---|---|---|---|---|---|---|---|
| 106 | 150 | 167 | 98 | 38 | 66 | 167 | 230 | 189 | 171 | 168 | 99 | 60 | 47 | 59 | 123 | 143 | 149 | 134 |
| 63 | 113 | 164 | 161 | 149 | 104 | 52 | 59 | 126 | 146 | 130 | 145 | 149 | 149 | 121 | 71 | 70 | 76 | 44 |
| 45 | 145 | 177 | 65 | 95 | 153 | 98 | 189 | 240 | 171 | 183 | 198 | 157 | 75 | 59 | 113 | 84 | 97 | 137 |
| 68 | 26 | | | | | | | | | | | | | | | | | |
| 122 | 166 | 175 | 186 | 193 | 171 | 112 | 112 | 188 | 174 | 147 | 188 | 190 | 191 | 199 | 182 | 146 | 73 | 38 |
| 84 | 155 | 126 | 100 | 207 | 161 | 44 | 119 | 208 | 202 | 197 | 221 | 195 | 124 | 132 | 156 | 116 | 81 | 86 |
| 77 | 30 | | | | | | | | | | | | | | | | | |
| 169 | 174 | 177 | 180 | 193 | 194 | 134 | 117 | 188 | 182 | 122 | 141 | 173 | 178 | 195 | 182 | 110 | 58 | 75 |
| 93 | 77 | 55 | 107 | 198 | 132 | 48 | 114 | 196 | 222 | 201 | 180 | 172 | 132 | 123 | 130 | 103 | 101 | 94 |
| 53 | 55 | | | | | | | | | | | | | | | | | |
| 185 | 176 | 173 | 179 | 192 | 193 | 127 | 90 | 165 | 198 | 159 | 155 | 138 | 109 | 92 | 69 | 96 | 151 | 139 |
| 67 | 34 | 85 | 139 | 158 | 118 | 50 | 92 | 218 | 227 | 164 | 162 | 159 | 110 | 103 | 124 | 109 | 114 | 87 |

TABLE 1-continued

| | | | | | | | | | | | | | | | | | |
|---|---|---|---|---|---|---|---|---|---|---|---|---|---|---|---|---|---|
| 25 | 71 | | | | | | | | | | | | | | | | |
| 183 | 170 | 161 | 176 | 201 | 189 | 122 | 85 | 155 | 204 | 189 | 199 | 134 | 51 | 50 | 79 | 168 | 207 | 137 |
| 68 | 70 | 162 | 184 | 131 | 110 | 94 | 143 | 205 | 187 | 135 | 125 | 159 | 116 | 61 | 99 | 143 | 142 | 83 |
| 32 | 71 | | | | | | | | | | | | | | | | |
| 186 | 156 | 142 | 161 | 204 | 180 | 105 | 100 | 179 | 221 | 172 | 120 | 86 | 78 | 71 | 106 | 201 | 182 | 101 |
| 65 | 83 | 179 | 187 | 108 | 99 | 153 | 164 | 121 | 142 | 157 | 147 | 176 | 132 | 75 | 84 | 147 | 182 | 93 |
| 38 | 92 | | | | | | | | | | | | | | | | |
| 189 | 165 | 136 | 128 | 155 | 129 | 119 | 180 | 205 | 180 | 102 | 68 | 145 | 175 | 104 | 78 | 142 | 149 | 74 |
| 91 | 158 | 155 | 141 | 124 | 120 | 155 | 172 | 161 | 168 | 188 | 197 | 201 | 168 | 85 | 63 | 135 | 161 | 82 |
| 41 | 92 | | | | | | | | | | | | | | | | |
| 185 | 182 | 154 | 113 | 114 | 148 | 180 | 190 | 151 | 79 | 70 | 141 | 184 | 192 | 171 | 84 | 67 | 117 | 99 |
| 149 | 212 | 120 | 85 | 144 | 162 | 182 | 201 | 181 | 186 | 193 | 166 | 158 | 135 | 93 | 74 | 80 | 87 | 56 |
| 47 | 126 | | | | | | | | | | | | | | | | |
| 182 | 179 | 179 | 166 | 164 | 190 | 203 | 166 | 116 | 83 | 116 | 184 | 185 | 189 | 201 | 127 | 52 | 63 | 148 |
| 205 | 179 | 109 | 102 | 176 | 161 | 150 | 207 | 158 | 128 | 122 | 75 | 77 | 62 | 60 | 69 | 44 | 49 | 35 |
| 39 | 133 | | | | | | | | | | | | | | | | |
| 189 | 178 | 185 | 190 | 206 | 209 | 145 | 148 | 196 | 136 | 137 | 204 | 174 | 186 | 214 | 147 | 66 | 56 | 163 |
| 211 | 118 | 81 | 147 | 187 | 135 | 145 | 166 | 77 | 65 | 110 | 83 | 45 | 65 | 94 | 59 | 46 | 42 | 47 |
| 94 | 150 | | | | | | | | | | | | | | | | |
| 189 | 191 | 193 | 208 | 200 | 152 | 82 | 93 | 188 | 158 | 118 | 195 | 192 | 184 | 224 | 156 | 71 | 54 | 121 |
| 154 | 77 | 96 | 183 | 145 | 85 | 111 | 131 | 81 | 79 | 142 | 145 | 143 | 133 | 62 | 87 | 108 | 51 | 113 |
| 145 | 83 | | | | | | | | | | | | | | | | |
| 166 | 196 | 186 | 160 | 128 | 97 | 62 | 64 | 160 | 150 | 104 | 195 | 200 | 182 | 204 | 117 | 69 | 63 | 57 |
| 79 | 90 | 150 | 159 | 71 | 69 | 93 | 66 | 60 | 95 | 166 | 162 | 116 | 121 | 105 | 140 | 188 | 90 | 50 |
| 98 | 84 | | | | | | | | | | | | | | | | |
| 70 | 128 | 117 | 90 | 122 | 99 | 59 | 137 | 183 | 120 | 100 | 172 | 201 | 130 | 86 | 99 | 138 | 115 | 53 |
| 109 | 146 | 108 | 99 | 59 | 103 | 146 | 50 | 33 | 88 | 136 | 146 | 81 | 93 | 165 | 199 | 199 | 128 | 57 |
| 33 | 69 | | | | | | | | | | | | | | | | |
| 74 | 43 | 49 | 82 | 94 | 112 | 160 | 184 | 190 | 168 | 119 | 158 | 183 | 79 | 38 | 123 | 185 | 137 | 115 |
| 163 | 105 | 49 | 97 | 111 | 122 | 137 | 74 | 31 | 71 | 100 | 104 | 146 | 182 | 192 | 188 | 146 | 108 | 96 |
| 68 | 45 | | | | | | | | | | | | | | | | |
| 95 | 74 | 78 | 64 | 119 | 190 | 188 | 196 | 201 | 196 | 211 | 189 | 125 | 53 | 67 | 166 | 199 | 139 | 78 |
| 71 | 99 | 146 | 178 | 165 | 154 | 154 | 117 | 56 | 72 | 127 | 83 | 95 | 188 | 165 | 108 | 91 | 105 | 153 |
| 145 | 113 | | | | | | | | | | | | | | | | |
| 142 | 143 | 103 | 123 | 170 | 181 | 190 | 174 | 165 | 194 | 207 | 148 | 72 | 49 | 81 | 159 | 193 | 113 | 50 |
| 70 | 120 | 177 | 200 | 191 | 205 | 195 | 146 | 133 | 135 | 94 | 67 | 52 | 49 | 121 | 163 | 96 | 94 | 181 |
| 194 | 148 | | | | | | | | | | | | | | | | |
| 137 | 104 | 81 | 67 | 92 | 107 | 105 | 103 | 71 | 79 | 111 | 72 | 56 | 119 | 156 | 158 | 129 | 93 | 151 |
| 165 | 104 | 130 | 175 | 190 | 210 | 194 | 154 | 159 | 186 | 110 | 48 | 105 | 137 | 167 | 186 | 107 | 119 | 190 |
| 162 | 138 | | | | | | | | | | | | | | | | |
| 65 | 87 | 122 | 115 | 103 | 100 | 100 | 117 | 109 | 77 | 44 | 30 | 91 | 194 | 188 | 97 | 76 | 139 | 198 |
| 199 | 166 | 117 | 88 | 140 | 185 | 154 | 113 | 144 | 199 | 112 | 53 | 153 | 202 | 195 | 191 | 110 | 95 | 153 |
| 127 | 118 | | | | | | | | | | | | | | | | |
| 20 | 101 | 180 | 180 | 175 | 188 | 181 | 181 | 153 | 109 | 85 | 79 | 117 | 162 | 124 | 70 | 79 | 131 | 194 |
| 196 | 184 | 185 | 132 | 111 | 123 | 115 | 90 | 96 | 166 | 118 | 41 | 136 | 210 | 202 | 205 | 126 | 68 | 100 |
| 113 | 122 | | | | | | | | | | | | | | | | |
| 79 | 61 | 132 | 175 | 195 | 212 | 202 | 143 | 87 | 119 | 168 | 111 | 48 | 77 | 143 | 170 | 113 | 92 | 173 |
| 196 | 172 | 193 | 186 | 170 | 168 | 156 | 143 | 120 | 133 | 115 | 48 | 115 | 211 | 212 | 199 | 116 | 74 | 137 |
| 147 | 141 | | | | | | | | | | | | | | | | |
| 170 | 122 | 92 | 83 | 144 | 185 | 155 | 87 | 94 | 183 | 159 | 81 | 55 | 108 | 195 | 191 | 166 | 154 | 157 |
| 191 | 181 | 182 | 194 | 184 | 190 | 188 | 188 | 189 | 172 | 125 | 47 | 87 | 207 | 229 | 178 | 121 | 117 | 164 |
| 180 | 167 | | | | | | | | | | | | | | | | |
| 190 | 186 | 177 | 135 | 104 | 71 | 75 | 123 | 151 | 120 | 72 | 81 | 101 | 143 | 204 | 188 | 178 | 187 | 176 |
| 183 | 180 | 181 | 186 | 182 | 187 | 185 | 190 | 203 | 204 | 158 | 66 | 69 | 189 | 225 | 142 | 121 | 166 | 182 |
| 198 | 191 | | | | | | | | | | | | | | | | |
| 189 | 189 | 208 | 203 | 161 | 69 | 66 | 162 | 120 | 43 | 106 | 157 | 103 | 108 | 191 | 192 | 175 | 204 | 190 |
| 179 | 184 | 179 | 185 | 183 | 183 | 186 | 187 | 199 | 214 | 195 | 109 | 50 | 111 | 160 | 102 | 113 | 185 | 180 |
| 186 | 202 | | | | | | | | | | | | | | | | |
| 183 | 190 | 206 | 210 | 158 | 92 | 137 | 164 | 65 | 85 | 190 | 193 | 147 | 100 | 144 | 210 | 188 | 209 | 202 |
| 171 | 198 | 186 | 186 | 196 | 182 | 195 | 196 | 198 | 191 | 173 | 143 | 61 | 33 | 62 | 49 | 53 | 101 | 124 |
| 128 | 164 | | | | | | | | | | | | | | | | |
| 192 | 193 | 193 | 172 | 125 | 131 | 173 | 103 | 85 | 183 | 187 | 172 | 171 | 99 | 110 | 194 | 192 | 180 | 188 |
| 167 | 178 | 192 | 184 | 188 | 181 | 180 | 176 | 151 | 129 | 116 | 99 | 58 | 48 | 65 | 35 | 38 | 95 | 103 |
| 74 | 89 | | | | | | | | | | | | | | | | |
| 187 | 169 | 144 | 101 | 137 | 190 | 108 | 60 | 151 | 200 | 164 | 154 | 155 | 98 | 58 | 119 | 169 | 147 | 154 |
| 151 | 136 | 156 | 137 | 122 | 139 | 150 | 154 | 108 | 51 | 60 | 117 | 165 | 159 | 105 | 39 | 57 | 154 | 182 |
| 139 | 82 | | | | | | | | | | | | | | | | |
| 128 | 42 | 110 | 89 | 164 | 166 | 57 | 95 | 194 | 183 | 180 | 186 | 174 | 165 | 123 | 79 | 91 | 132 | 139 |
| 138 | 120 | 63 | 60 | 117 | 164 | 180 | 148 | 75 | 65 | 144 | 185 | 198 | 202 | 118 | 62 | 113 | 143 | 136 |
| 143 | 88 | | | | | | | | | | | | | | | | |
| 95 | 107 | 66 | 64 | 113 | 89 | 66 | 156 | 195 | 171 | 190 | 187 | 187 | 197 | 187 | 175 | 133 | 98 | 91 |
| 89 | 86 | 55 | 55 | 123 | 172 | 142 | 86 | 110 | 180 | 187 | 191 | 215 | 179 | 103 | 116 | 185 | 118 | 68 |
| 137 | 80 | | | | | | | | | | | | | | | | |
| 51 | 57 | 94 | 62 | 29 | 70 | 132 | 182 | 188 | 175 | 187 | 182 | 185 | 197 | 191 | 197 | 192 | 169 | 152 |
| 144 | 139 | 121 | 101 | 115 | 127 | 101 | 110 | 174 | 194 | 185 | 201 | 216 | 197 | 114 | 88 | 147 | 152 | 172 |
| 156 | 50 | | | | | | | | | | | | | | | | |
| 105 | 127 | 125 | 71 | 119 | 170 | 162 | 190 | 185 | 175 | 190 | 177 | 185 | 189 | 189 | 187 | 175 | 191 | 196 |
| 184 | 189 | 183 | 182 | 181 | 158 | 142 | 170 | 195 | 187 | 194 | 208 | 212 | 180 | 83 | 46 | 132 | 208 | 185 |
| 105 | 51 | | | | | | | | | | | | | | | | |

TABLE 1-continued

```
188  148   96  139  201  181  184  192  175  187  184  180  187  183  194  172  137  168  201
188  189  197  197  202  170  154  194  198  192  208  181  135   85   42   81  177  210  159
 77   57
160  106  146  193  183  184  187  181  185  180  184  186  183  187  192  172  123  141  199
184  178  195  192  190  149  150  206  204  195  169   90   47   58  105  154  183  201  157
 77   88
 98  116  193  186  179  186  179  185  181  182  185  182  179  174  198  192  133  127  184
194  176  193  197  167  133  162  221  188  133  110   92   71  105  195  183  170  227  187
100  119
 98  173  196  170  187  183  178  187  178  186  185  179  159  148  195  207  154  117  152
200  184  191  204  156  127  179  206  108   88  178  145   89  179  236  184  206  246  187
132  169
167  188  176  185  179  182  185  179  185  180  185  189  165  138  154  196  178  107  104
188  209  187  215  175  125  159  132   91  175  222  133  129  221  218  204  235  224  182
159  192
195  173  180  183  177  186  181  184  183  179  184  187  188  171  150  153  155  110   91
165  207  198  213  171   90   78  125  178  218  201  133  166  220  162  176  228  189  142
146  193
195  168  190  180  181  187  178  186  180  181  185  184  192  193  183  156  152  135   59
 68  149  166  145  106   47   40  118  211  227  162  129  198  228  146  109  149  159  102
110  178
185  179  188  183  186  185  180  184  180  182  185  184  188  194  191  169  155  156  141
104   54   49   64   41   53   73   64  147  190   90  113  215  196  164  153  143  118   78
126  178
182  173  182  186  188  191  181  189  184  180  188  182  187  192  192  195  192  198  202
147   61   36   45   52  122  164  105   74   69   42   72  126  119  139  204  192  132   81
 99  176
```

TABLE 2

```
 94   89   94   95   86   65   35   25   80   72   66   66   67   67   68   69   69   70   71
 71  120  124   99   75   81  157  249  205  164  174  115   52   36   68  121  142  126  110
 94   78
111  122  138  146  140  116   78   67  127  130  118  141  149  139  116   88   73   73   74
 75  120  126  131  109   86  102  181  216  178  175  188  128   86   81  105  126  112   96
 80   64
131  151  173  186  180  155  113  100  165  174  130  173  209  222  202  163  120   85   77
 78  121  127  133  139  133   74  119  210  207  175  193  177  151  129  121  114   98   82
 66   50
145  166  190  204  199  173  130  111  180  199   91  143  188  200  177  146  121   96   82
 81  121  127  133  139  123   69   99  218  221  176  179  163  147  131  116  102   91   76
 53   36
150  167  187  198  196  181  128  100  169  202  145  171  164  129   91   82  101  152  121
 85  121  128  149  144   97   62   97  205  214  176  165  149  133  117  107  112  116   96
 46   38
154  157  168  176  211  198  122   79  153  213  170  168  138   98   85   86  170  212  136
 88  122  153  189  142   90   85  136  172  192  177  151  136  119  103  106  129  150   96
 43   59
165  152  149  158  198  175   99  104  182  214  137  117   92   90   88  102  191  193  106
 91  122  178  183  130  107  127  159  165  172  177  171  174  135   90  101  137  160   82
 45   89
176  163  149  140  154  126  135  176  186  166   91  102  133  141  119  100  143  120   94
 95  123  155  141  136  136  153  159  165  171  177  186  206  166   92   84  125  139   62
 51  119
188  174  161  147  134  148  195  202  149   94   95  142  189  197  161  109   96   97   97
 98  123  129  135  141  147  153  159  165  172  178  142  163  136   75   58   92  100   39
 57  135
200  186  173  159  151  186  202  166  103   78  103  157  205  211  169  113   99  100  101
101  124  130  136  142  148  154  160  166  172  178   95   86   69   47   32   48   55   17
 55  123
164  189  202  204  195  179  155  138  138  153  161  176  191  206  200  139   85   78  129
220  108  109  145  171  115  111  111  112  112  113  102  101  100   99   98   97   96   95
 94   93
181  201  210  207  185  151  124  117  135  159  152  167  182  197  206  152   82   58   89
172  111  119  189  159   92   99  104  104  115  116   99   98   97   96   95   92   88   92
 91   90
160  175  180  158  123   96   90  110  145  167  144  159  174  189  187  128   78   59   68
135  114  146  159   76   73  107   74   59  103  118   96   95   94   99  132  149   94   50
 81   87
115  126  115   89   68   68   95  133  161  173  135  150  165  152  101  101  110   82   70
116  116  114   76   63  102  118   61   24   73  121   93   92  114  173  209  193  133   40
 33   77
 78   84   73   65   75  112  155  178  177  180  146  169  161   73   38  111  168  119   91
108  101   75   79  110  121  121   79   29   62  123   90  105  166  210  204  150   96   99
 82   69
 81   87   87   94  131  178  204  205  194  188  185  207  126   45   60  155  199  158   88
 80  113  133  163  169  159  142  116   71   84  126   87  115  151  153  119   84  110  140
```

TABLE 2-continued

| | | | | | | | | | | | | | | | | | | |
|---|---|---|---|---|---|---|---|---|---|---|---|---|---|---|---|---|---|---|
| 140 | 108 | | | | | | | | | | | | | | | | | |
| 88 | 100 | 108 | 120 | 148 | 175 | 187 | 185 | 177 | 182 | 183 | 161 | 76 | 54 | 120 | 184 | 190 | 129 | 72 |
| 99 | 135 | 164 | 193 | 209 | 207 | 187 | 157 | 125 | 120 | 129 | 84 | 87 | 98 | 108 | 105 | 89 | 125 | 170 |
| 178 | 142 | | | | | | | | | | | | | | | | | |
| 95 | 105 | 104 | 98 | 103 | 107 | 103 | 92 | 90 | 108 | 129 | 79 | 46 | 89 | 158 | 168 | 118 | 86 | 108 |
| 172 | 127 | 144 | 172 | 195 | 202 | 193 | 169 | 143 | 131 | 131 | 81 | 97 | 145 | 176 | 166 | 122 | 120 | 168 |
| 184 | 154 | | | | | | | | | | | | | | | | | |
| 102 | 114 | 124 | 121 | 112 | 101 | 87 | 79 | 79 | 88 | 80 | 56 | 81 | 135 | 151 | 114 | 74 | 99 | 177 |
| 219 | 129 | 130 | 133 | 145 | 154 | 155 | 146 | 135 | 133 | 134 | 80 | 129 | 193 | 223 | 201 | 139 | 98 | 134 |
| 154 | 135 | | | | | | | | | | | | | | | | | |
| 109 | 121 | 133 | 145 | 156 | 163 | 162 | 159 | 157 | 160 | 80 | 91 | 113 | 128 | 123 | 90 | 102 | 162 | 202 |
| 217 | 132 | 132 | 133 | 133 | 134 | 134 | 135 | 135 | 136 | 136 | 80 | 132 | 191 | 212 | 182 | 119 | 70 | 87 |
| 103 | 94 | | | | | | | | | | | | | | | | | |
| 95 | 74 | 110 | 177 | 214 | 204 | 179 | 154 | 137 | 135 | 177 | 106 | 60 | 81 | 141 | 158 | 153 | 152 | 152 |
| 148 | 174 | 181 | 182 | 173 | 161 | 152 | 148 | 138 | 125 | 118 | 65 | 85 | 168 | 216 | 187 | 118 | 108 | 120 |
| 131 | 127 | | | | | | | | | | | | | | | | | |
| 183 | 121 | 75 | 83 | 134 | 170 | 148 | 123 | 111 | 116 | 130 | 62 | 55 | 110 | 162 | 160 | 165 | 171 | 172 |
| 166 | 177 | 185 | 189 | 185 | 184 | 182 | 182 | 176 | 159 | 137 | 54 | 104 | 203 | 247 | 208 | 133 | 138 | 166 |
| 184 | 182 | | | | | | | | | | | | | | | | | |
| 196 | 198 | 178 | 130 | 94 | 88 | 107 | 102 | 97 | 110 | 107 | 74 | 104 | 158 | 164 | 171 | 183 | 190 | 190 |
| 180 | 179 | 185 | 191 | 190 | 192 | 197 | 202 | 204 | 193 | 169 | 53 | 98 | 181 | 211 | 169 | 122 | 155 | 187 |
| 207 | 204 | | | | | | | | | | | | | | | | | |
| 192 | 195 | 197 | 194 | 161 | 109 | 81 | 95 | 94 | 116 | 128 | 125 | 153 | 166 | 171 | 184 | 196 | 202 | 198 |
| 184 | 184 | 183 | 189 | 189 | 185 | 190 | 199 | 209 | 206 | 189 | 63 | 65 | 110 | 123 | 98 | 102 | 145 | 173 |
| 188 | 183 | | | | | | | | | | | | | | | | | |
| 188 | 191 | 194 | 185 | 153 | 114 | 142 | 115 | 93 | 127 | 172 | 173 | 132 | 125 | 169 | 190 | 200 | 202 | 194 |
| 176 | 190 | 185 | 185 | 186 | 182 | 174 | 179 | 190 | 194 | 180 | 83 | 49 | 44 | 46 | 61 | 89 | 118 | 136 |
| 142 | 134 | | | | | | | | | | | | | | | | | |
| 185 | 187 | 184 | 157 | 117 | 160 | 178 | 86 | 102 | 146 | 182 | 176 | 147 | 93 | 105 | 170 | 192 | 190 | 178 |
| 159 | 194 | 178 | 172 | 178 | 180 | 173 | 166 | 167 | 139 | 102 | 112 | 73 | 67 | 54 | 61 | 85 | 108 | 113 |
| 104 | 93 | | | | | | | | | | | | | | | | | |
| 180 | 168 | 146 | 115 | 129 | 201 | 125 | 84 | 125 | 172 | 180 | 174 | 168 | 125 | 77 | 96 | 159 | 169 | 156 |
| 138 | 160 | 128 | 121 | 142 | 171 | 177 | 172 | 112 | 61 | 86 | 146 | 144 | 157 | 103 | 70 | 88 | 108 | 116 |
| 106 | 94 | | | | | | | | | | | | | | | | | |
| 153 | 126 | 100 | 80 | 158 | 143 | 75 | 112 | 156 | 193 | 179 | 173 | 167 | 164 | 124 | 80 | 96 | 141 | 135 |
| 124 | 119 | 78 | 75 | 107 | 155 | 182 | 113 | 56 | 81 | 151 | 180 | 207 | 203 | 123 | 87 | 97 | 112 | 120 |
| 111 | 99 | | | | | | | | | | | | | | | | | |
| 113 | 84 | 62 | 76 | 109 | 73 | 104 | 144 | 179 | 197 | 177 | 176 | 183 | 191 | 193 | 163 | 121 | 124 | 132 |
| 122 | 104 | 64 | 64 | 101 | 156 | 132 | 76 | 98 | 163 | 170 | 204 | 210 | 183 | 122 | 111 | 113 | 121 | 125 |
| 116 | 104 | | | | | | | | | | | | | | | | | |
| 79 | 55 | 44 | 52 | 66 | 96 | 133 | 167 | 189 | 193 | 176 | 178 | 190 | 202 | 207 | 202 | 183 | 150 | 137 |
| 121 | 129 | 95 | 97 | 132 | 144 | 118 | 135 | 182 | 181 | 176 | 214 | 198 | 174 | 152 | 138 | 133 | 133 | 131 |
| 120 | 109 | | | | | | | | | | | | | | | | | |
| 159 | 160 | 126 | 73 | 132 | 171 | 174 | 181 | 181 | 174 | 184 | 186 | 187 | 189 | 191 | 181 | 179 | 185 | 186 |
| 191 | 204 | 199 | 193 | 188 | 182 | 177 | 171 | 184 | 199 | 180 | 159 | 153 | 139 | 91 | 79 | 117 | 159 | 149 |
| 125 | 107 | | | | | | | | | | | | | | | | | |
| 162 | 150 | 100 | 122 | 189 | 195 | 192 | 187 | 183 | 174 | 184 | 186 | 187 | 189 | 189 | 173 | 146 | 178 | 186 |
| 192 | 194 | 188 | 183 | 177 | 171 | 166 | 179 | 212 | 209 | 167 | 157 | 131 | 67 | 47 | 96 | 167 | 180 | 157 |
| 125 | 105 | | | | | | | | | | | | | | | | | |
| 153 | 107 | 140 | 195 | 175 | 182 | 186 | 187 | 181 | 174 | 184 | 186 | 188 | 189 | 188 | 179 | 126 | 145 | 191 |
| 197 | 183 | 177 | 172 | 166 | 161 | 163 | 203 | 221 | 189 | 138 | 136 | 70 | 39 | 88 | 172 | 203 | 189 | 157 |
| 120 | 103 | | | | | | | | | | | | | | | | | |
| 107 | 109 | 203 | 196 | 171 | 177 | 183 | 183 | 177 | 176 | 184 | 175 | 179 | 189 | 189 | 189 | 134 | 113 | 181 |
| 199 | 184 | 176 | 162 | 156 | 150 | 175 | 206 | 194 | 146 | 122 | 99 | 64 | 100 | 178 | 213 | 213 | 196 | 163 |
| 129 | 114 | | | | | | | | | | | | | | | | | |
| 113 | 156 | 187 | 175 | 174 | 177 | 180 | 178 | 178 | 179 | 185 | 172 | 149 | 158 | 187 | 193 | 163 | 100 | 141 |
| 199 | 195 | 196 | 176 | 149 | 143 | 170 | 176 | 144 | 118 | 130 | 113 | 126 | 178 | 208 | 222 | 226 | 211 | 183 |
| 160 | 147 | | | | | | | | | | | | | | | | | |
| 165 | 174 | 175 | 176 | 177 | 178 | 178 | 179 | 180 | 181 | 185 | 186 | 168 | 143 | 154 | 187 | 191 | 116 | 109 |
| 187 | 197 | 215 | 204 | 170 | 138 | 142 | 129 | 131 | 171 | 193 | 149 | 161 | 189 | 210 | 221 | 222 | 208 | 189 |
| 182 | 168 | | | | | | | | | | | | | | | | | |
| 176 | 177 | 177 | 178 | 179 | 180 | 181 | 182 | 183 | 184 | 185 | 186 | 188 | 179 | 152 | 150 | 164 | 126 | 84 |
| 149 | 183 | 215 | 220 | 179 | 118 | 77 | 107 | 179 | 230 | 223 | 149 | 166 | 189 | 200 | 198 | 191 | 179 | 175 |
| 175 | 162 | | | | | | | | | | | | | | | | | |
| 178 | 179 | 180 | 181 | 182 | 183 | 184 | 185 | 186 | 187 | 185 | 187 | 188 | 188 | 175 | 154 | 139 | 127 | 70 |
| 92 | 148 | 157 | 143 | 104 | 53 | 34 | 103 | 187 | 219 | 180 | 149 | 163 | 179 | 180 | 164 | 145 | 137 | 143 |
| 143 | 132 | | | | | | | | | | | | | | | | | |
| 181 | 182 | 183 | 184 | 185 | 186 | 187 | 188 | 189 | 190 | 185 | 187 | 188 | 190 | 191 | 182 | 165 | 152 | 122 |
| 100 | 73 | 59 | 58 | 53 | 42 | 66 | 117 | 165 | 149 | 95 | 146 | 155 | 161 | 155 | 154 | 137 | 112 | 109 |
| 105 | 98 | | | | | | | | | | | | | | | | | |
| 184 | 185 | 186 | 187 | 188 | 189 | 190 | 191 | 192 | 193 | 185 | 187 | 189 | 190 | 192 | 193 | 195 | 195 | 191 |
| 167 | 54 | 30 | 46 | 74 | 95 | 116 | 116 | 95 | 68 | 58 | 142 | 143 | 141 | 153 | 195 | 195 | 139 | 101 |
| 96 | 90 | | | | | | | | | | | | | | | | | |

TABLE 3

| | | | | | | | | | | | | | | | | | | | |
|---|---|---|---|---|---|---|---|---|---|---|---|---|---|---|---|---|---|---|---|
| 89 | 76 | 67 | 69 | 67 | 54 | 31 | 42 | 95 | 78 | 65 | 67 | 68 | 69 | 70 | 71 | 73 | 74 | 75 | |

TABLE 3-continued

| | | | | | | | | | | | | | | | | | | | | |
|---|---|---|---|---|---|---|---|---|---|---|---|---|---|---|---|---|---|---|---|---|
| 76 | 124 | 129 | 118 | 83 | 77 | 111 | 209 | 204 | 161 | 168 | 84 | 40 | 39 | 74 | 121 | 139 | 123 | 108 | 92 | 77 |
| 102 | 92 | 102 | 118 | 123 | 110 | 80 | 102 | 145 | 120 | 80 | 108 | 127 | 126 | 105 | 80 | 75 | 76 | 78 | 79 | 63 |
| 79 | 126 | 130 | 135 | 124 | 85 | 74 | 157 | 219 | 172 | 169 | 156 | 97 | 63 | 65 | 92 | 118 | 110 | 94 | 79 | 63 |
| 115 | 115 | 139 | 164 | 173 | 160 | 126 | 159 | 193 | 153 | 85 | 143 | 205 | 235 | 220 | 171 | 117 | 81 | 80 | 81 | 127 |
| 132 | 137 | 141 | 145 | 118 | 86 | 203 | 216 | 170 | 190 | 165 | 129 | 106 | 103 | 108 | 97 | 80 | 63 | 50 | | |
| 128 | 135 | 164 | 193 | 204 | 191 | 157 | 196 | 225 | 172 | 104 | 130 | 151 | 164 | 152 | 123 | 99 | 82 | 83 | 84 | 128 |
| 133 | 138 | 143 | 148 | 104 | 72 | 223 | 239 | 172 | 177 | 161 | 146 | 130 | 114 | 103 | 97 | 64 | 46 | 45 | | |
| 141 | 145 | 173 | 199 | 210 | 197 | 165 | 206 | 233 | 178 | 153 | 169 | 160 | 132 | 97 | 82 | 83 | 95 | 104 | 87 | 130 |
| 134 | 139 | 144 | 141 | 79 | 96 | 201 | 228 | 173 | 164 | 148 | 132 | 117 | 108 | 116 | 105 | 61 | 52 | 68 | | |
| 153 | 148 | 166 | 186 | 193 | 181 | 151 | 191 | 237 | 201 | 169 | 165 | 139 | 104 | 83 | 84 | 95 | 185 | 153 | 89 | 131 |
| 136 | 141 | 145 | 126 | 101 | 149 | 165 | 193 | 175 | 169 | 147 | 119 | 103 | 108 | 132 | 102 | 60 | 67 | 103 | | |
| 166 | 154 | 154 | 162 | 164 | 151 | 125 | 207 | 255 | 193 | 142 | 123 | 97 | 87 | 86 | 87 | 141 | 220 | 137 | 92 | 132 |
| 137 | 142 | 147 | 137 | 147 | 161 | 166 | 171 | 176 | 202 | 184 | 135 | 91 | 102 | 128 | 85 | 52 | 79 | 133 | | |
| 179 | 166 | 154 | 145 | 139 | 126 | 159 | 235 | 236 | 135 | 97 | 86 | 116 | 152 | 139 | 96 | 133 | 154 | 93 | 94 | 134 |
| 138 | 143 | 148 | 153 | 158 | 163 | 168 | 172 | 177 | 208 | 199 | 152 | 90 | 84 | 101 | 55 | 35 | 80 | 146 | | |
| 192 | 179 | 167 | 154 | 141 | 158 | 193 | 184 | 150 | 111 | 86 | 92 | 159 | 212 | 192 | 122 | 94 | 95 | 96 | 97 | 135 |
| 140 | 145 | 150 | 154 | 159 | 164 | 169 | 174 | 179 | 167 | 167 | 131 | 78 | 57 | 61 | 15 | 8 | 67 | 134 | | |
| 205 | 192 | 179 | 167 | 156 | 172 | 154 | 120 | 125 | 98 | 89 | 92 | 151 | 200 | 182 | 118 | 96 | 97 | 98 | 100 | 136 |
| 141 | 146 | 151 | 156 | 161 | 165 | 170 | 175 | 180 | 107 | 104 | 82 | 51 | 34 | 20 | 0 | 0 | 38 | 92 | | |
| 148 | 178 | 199 | 209 | 209 | 200 | 182 | 163 | 150 | 148 | 171 | 181 | 192 | 202 | 178 | 119 | 74 | 70 | 113 | 189 | 99 |
| 100 | 112 | 134 | 110 | 103 | 104 | 105 | 106 | 106 | 110 | 107 | 103 | 100 | 96 | 93 | 90 | 86 | 83 | 79 | | |
| 174 | 200 | 216 | 220 | 210 | 184 | 158 | 143 | 143 | 154 | 165 | 175 | 186 | 196 | 190 | 136 | 82 | 61 | 88 | 156 | 102 |
| 106 | 151 | 147 | 106 | 107 | 107 | 107 | 109 | 110 | 106 | 103 | 99 | 96 | 92 | 89 | 86 | 82 | 79 | 75 | | |
| 158 | 177 | 188 | 178 | 150 | 124 | 112 | 119 | 141 | 162 | 158 | 169 | 179 | 190 | 184 | 130 | 106 | 72 | 82 | 135 | 106 |
| 138 | 170 | 132 | 109 | 110 | 88 | 57 | 110 | 113 | 102 | 99 | 95 | 92 | 96 | 138 | 136 | 88 | 75 | 72 | | |
| 112 | 126 | 122 | 99 | 79 | 74 | 91 | 127 | 158 | 171 | 152 | 163 | 173 | 160 | 104 | 139 | 140 | 100 | 94 | 131 | 113 |
| 156 | 152 | 112 | 113 | 114 | 82 | 16 | 83 | 117 | 98 | 95 | 92 | 117 | 197 | 212 | 140 | 75 | 71 | 68 | | |
| 73 | 80 | 68 | 58 | 64 | 96 | 140 | 168 | 171 | 180 | 146 | 157 | 158 | 69 | 75 | 184 | 176 | 138 | 122 | 143 | 140 |
| 171 | 151 | 141 | 131 | 121 | 109 | 40 | 80 | 121 | 95 | 91 | 95 | 159 | 184 | 131 | 74 | 71 | 67 | 64 | | |
| 78 | 79 | 74 | 78 | 108 | 162 | 199 | 201 | 188 | 189 | 140 | 150 | 91 | 42 | 129 | 193 | 198 | 177 | 137 | 130 | 157 |
| 178 | 190 | 193 | 183 | 164 | 141 | 107 | 113 | 124 | 91 | 87 | 86 | 93 | 79 | 74 | 71 | 93 | 104 | 79 | | |
| 87 | 92 | 98 | 112 | 152 | 191 | 206 | 200 | 186 | 192 | 134 | 132 | 70 | 103 | 176 | 186 | 197 | 146 | 100 | 148 | 144 |
| 172 | 195 | 208 | 207 | 194 | 170 | 145 | 128 | 128 | 87 | 83 | 80 | 84 | 87 | 73 | 76 | 133 | 166 | 136 | | |
| 95 | 106 | 109 | 108 | 122 | 136 | 136 | 123 | 118 | 133 | 128 | 121 | 118 | 159 | 170 | 180 | 127 | 83 | 133 | 212 | 125 |
| 139 | 159 | 176 | 184 | 180 | 167 | 149 | 134 | 131 | 83 | 80 | 115 | 160 | 161 | 113 | 73 | 139 | 190 | 172 | | |
| 104 | 116 | 119 | 114 | 106 | 100 | 89 | 80 | 81 | 89 | 121 | 132 | 142 | 153 | 163 | 138 | 90 | 124 | 201 | 216 | 127 |
| 128 | 129 | 134 | 140 | 142 | 140 | 136 | 134 | 135 | 79 | 98 | 174 | 224 | 207 | 133 | 63 | 101 | 154 | 153 | | |
| 113 | 125 | 138 | 146 | 146 | 139 | 130 | 122 | 117 | 117 | 115 | 126 | 136 | 147 | 155 | 130 | 147 | 189 | 199 | 210 | 131 |
| 132 | 132 | 133 | 134 | 135 | 136 | 137 | 137 | 138 | 75 | 106 | 176 | 208 | 175 | 99 | 55 | 55 | 84 | 90 | | |
| 93 | 77 | 112 | 176 | 208 | 201 | 178 | 151 | 131 | 123 | 163 | 98 | 51 | 51 | 95 | 144 | 147 | 144 | 139 | 131 | 184 |
| 181 | 177 | 174 | 170 | 167 | 163 | 160 | 156 | 153 | 54 | 59 | 152 | 245 | 254 | 170 | 116 | 128 | 133 | 120 | | |
| 180 | 120 | 74 | 78 | 127 | 168 | 152 | 124 | 107 | 105 | 126 | 65 | 46 | 76 | 131 | 159 | 162 | 163 | 158 | 146 | 187 |
| 184 | 180 | 177 | 173 | 170 | 166 | 163 | 159 | 156 | 50 | 61 | 163 | 244 | 240 | 177 | 158 | 182 | 190 | 175 | | |
| 194 | 196 | 177 | 127 | 90 | 81 | 100 | 106 | 95 | 101 | 109 | 73 | 85 | 129 | 165 | 173 | 182 | 184 | 176 | 160 | 190 |
| 187 | 183 | 180 | 176 | 173 | 169 | 166 | 162 | 158 | 57 | 52 | 123 | 175 | 165 | 148 | 182 | 209 | 216 | 197 | | |
| 191 | 193 | 195 | 196 | 169 | 113 | 78 | 80 | 98 | 110 | 127 | 111 | 118 | 162 | 175 | 186 | 195 | 195 | 185 | 165 | 193 |
| 190 | 186 | 183 | 179 | 176 | 172 | 168 | 165 | 161 | 75 | 47 | 61 | 82 | 85 | 128 | 176 | 197 | 199 | 178 | | |
| 188 | 190 | 192 | 190 | 170 | 135 | 113 | 95 | 102 | 129 | 168 | 173 | 141 | 109 | 151 | 190 | 196 | 194 | 181 | 160 | 196 |
| 193 | 189 | 185 | 182 | 178 | 175 | 171 | 168 | 162 | 102 | 67 | 51 | 55 | 74 | 105 | 143 | 156 | 152 | 130 | | |
| 185 | 187 | 189 | 174 | 138 | 138 | 144 | 92 | 113 | 151 | 194 | 188 | 177 | 108 | 85 | 143 | 186 | 181 | 167 | 149 | 199 |
| 195 | 190 | 188 | 185 | 181 | 178 | 174 | 142 | 104 | 136 | 96 | 71 | 66 | 78 | 98 | 116 | 117 | 106 | 88 | | |
| 182 | 180 | 160 | 130 | 134 | 192 | 141 | 97 | 137 | 178 | 196 | 190 | 184 | 167 | 94 | 76 | 132 | 164 | 152 | 142 | 193 |
| 165 | 150 | 160 | 181 | 184 | 181 | 118 | 67 | 101 | 172 | 130 | 100 | 87 | 89 | 103 | 117 | 116 | | | | |

TABLE 3-continued

```
102   88
172  146  111   95  186  190  101  124  168  197  198  192  186  180  164   99   85  134  150
143  163  114   94  111  153  185  113   55   91  166  204  166  134  114  108  114  123  121
107   93
141  103   71  119  181  124  114  157  189  196  201  194  188  182  176  167  124  117  148
146  142   85   62   82  134  124   77  108  175  176  224  198  168  145  132  130  132  127
113   99
109   75   59  118  115  105  146  180  190  193  203  197  190  184  178  172  166  150  147
148  151   96   73   92  114  120  147  186  182  179  231  216  195  173  157  148  142  132
118  104
169  171  165  107  114  173  176  177  178  179  176  178  180  181  183  180  186  188  189
191  204  199  193  188  183  178  173  182  196  178  153  149  145  127  130  169  181  166
140  116
170  167   91   73  147  176  177  178  179  180  177  179  181  182  184  171  164  189  191
192  193  188  182  177  172  167  177  211  207  163  153  144   81   69  137  200  195  172
139  114
171  103   78  121  176  177  178  179  180  181  179  180  182  184  185  174  131  174  192
193  184  177  171  166  161  161  202  219  185  137  142   65   38  113  204  214  200  168
132  113
132   90  168  193  177  178  179  180  181  182  180  182  183  185  186  186  120  129  193
195  195  183  163  155  150  172  204  190  142  124   96   62  122  201  220  219  199  165
132  120
110  135  218  182  178  179  180  181  182  183  181  183  184  186  188  189  140   98  171
196  209  206  181  150  141  167  171  139  118  125  125  149  185  211  226  224  203  172
151  144
148  175  178  177  179  180  181  182  183  184  182  182  177  172  169  170  159   92  133
197  211  225  209  170  135  138  125  128  163  182  152  166  192  212  223  217  198  177
172  166
175  176  177  178  179  181  182  183  184  185  184  181  170  156  144  137  137   87   82
167  194  224  214  164  100   61   95  167  219  216  153  169  190  201  203  194  179  175
177  171
176  177  178  179  180  182  183  184  185  186  185  186  181  167  150  134  125  111   71
123  144  147  130   91   41   32  106  187  221  185  154  167  180  181  171  159  154  161
163  158
177  178  179  180  181  182  184  185  186  187  186  188  189  189  180  166  152  143  119
126   60   53   56   53   47   82  136  182  164  106  152  160  164  159  144  131  133  136
137  133
178  179  180  181  182  183  185  186  187  188  187  189  190  192  194  195  192  186  180
173   42   28   50   78  107  136  137  114   78   58  150  150  149  141  133  128  124  120
116  112
```

TABLE 4

| H | | | | | |
|---|---|---|---|---|---|
| { 20.0700 } | { 18.4366 | −6.0736 } | | | |
| 0.0550 | { −0.3473 | −0.1166 } | { 0.9746 | 0.8863 } | 15.6148 |
| −0.1108 | { −0.2950 | 0.8697 } | { 0.4769 | 1.2215 } | 26.5451 |
| 2.3714 | { 0.6283 | 0.5195 } | { 0.9928 | 0.3900 } | 17.4865 |
| 0.5044 | { 0.2422 | −0.0007 } | { 0.3550 | 0.4786 } | 10.5647 |
| H | | | | | |
| { −7.0400 } | { 10.2532 | −14.4972 } | | | |
| 0.1672 | { −0.4982 | −0.3300 } | { 1.0439 | 0.3757 } | 23.5290 |
| 0.5170 | { 0.1764 | 0.4417 } | { 0.3524 | 0.5732 } | 18.8828 |
| 2.6203 | { 0.8412 | −0.3778 } | { 0.6141 | 0.5696 } | 15.1243 |
| 2.6043 | { −0.0078 | −0.7210 } | { 0.9375 | 0.4282 } | 18.1785 |
| H | | | | | |
| { 18.2800 } | { 3.2413 | 19.5803 } | | | |
| 1.2052 | { −0.6718 | 0.4028 } | { 1.0955 | 0.3574 } | 16.2537 |
| 2.0697 | { −0.2350 | 0.1817 } | { 1.0141 | 0.3891 } | −20.6531 |
| 0.5814 | { −0.8298 | −0.1252 } | { 0.9681 | 0.3517 } | −12.9288 |
| 0.5258 | { 0.2235 | −0.5744 } | { 0.2771 | 0.5063 } | 9.1028 |
| H | | | | | |
| { −23.1000 } | { −4.8080 | −25.0567 } | | | |
| 2.1579 | { −1.0736 | −0.7244 } | { 0.4985 | 0.9907 } | −18.7614 |
| 0.7606 | { 0.6251 | 0.7408 } | { 1.2097 | 0.8611 } | 15.3114 |
| 2.0238 | { 0.5290 | −0.6723 } | { 0.4226 | 0.5152 } | 13.5875 |
| 1.7335 | { 0.5390 | 0.6098 } | { 0.9090 | 0.4148 } | −19.6480 |
| H | | | | | |
| { 7.1100 } | { −13.3326 | 8.7161 } | | | |
| −0.1533 | { −0.7812 | −0.6231 } | { 1.4083 | 0.7261 } | 22.7463 |
| −0.4063 | { 0.2195 | 0.2612 } | { 0.6989 | 0.5217 } | 14.3231 |
| 0.1167 | { 0.6426 | 0.7914 } | { 1.5990 | 0.4263 } | −22.0065 |
| 2.5504 | { −0.3412 | 0.0391 } | { 1.0334 | 0.4872 } | −13.6814 |
| H | | | | | |
| { 1.4300 } | { −8.4689 | −4.4372 } | | | |
| 1.1469 | { −0.6161 | 0.5776 } | { 1.6198 | 0.6623 } | −27.6468 |
| 2.2397 | { 0.1120 | −0.2602 } | { 1.0931 | 0.3968 } | −26.5535 |

TABLE 4-continued

| | | | | | |
|---|---|---|---|---|---|
| 2.3735 | { 0.5480 | 0.4953 } | { 1.0602 | 0.3667 } | −21.1788 |
| −0.0810 | { 0.2136 | −0.6939 } | { 0.8490 | 0.4722 } | 15.7904 |
| H | | | | | |
| { −3.4100 } | { 13.9906 | −7.3165 } | | | |
| 1.2618 | { −0.2077 | 0.5029 } | { 0.6444 | 0.3881 } | −19.4196 |
| 0.2360 | { 0.3595 | −0.1964 } | { 0.9019 | 0.4604 } | 19.6177 |
| 0.5043 | { −0.6845 | −0.4466 } | { 0.2806 | 0.7137 } | 12.4950 |
| 2.4883 | { −0.3120 | −0.4211 } | { 0.8983 | 0.3157 } | −11.7791 |
| H | | | | | |
| { −9.1600 } | { 15.0612 | −2.1272 } | | | |
| 1.0308 | { −0.1806 | −0.1529 } | { 0.3927 | 0.8443 } | 21.3891 |
| 2.5530 | { 0.7719 | −0.2915 } | { 0.7043 | 0.5868 } | 20.1406 |
| 2.6333 | { 0.4417 | 0.6637 } | { 0.5780 | 0.7297 } | 21.4013 |
| 2.1815 | { −0.3739 | 0.5440 } | { 0.2365 | 0.6158 } | −8.5414 |
| H | | | | | |
| { 6.3900 } | { −7.8074 | −3.0968 } | | | |
| −0.6211 | { 0.8587 | −0.3780 } | { 1.8641 | 0.7945 } | −24.7811 |
| −0.9027 | { −0.4325 | 0.6556 } | { 1.5081 | 0.8819 } | −11.7734 |
| 2.0542 | { −0.7873 | −0.5476 } | { 0.3064 | 1.3196 } | −23.8431 |
| 0.6488 | { 0.2881 | 0.1207 } | { 0.2702 | 0.8305 } | 22.1091 |
| H | | | | | |
| { 25.8600 } | { 6.5314 | 5.5600 } | | | |
| 2.2851 | { −0.7313 | −0.5791 } | { 0.9312 | 0.4245 } | −22.5825 |
| 0.7607 | { 0.3073 | −0.0321 } | { 1.0390 | 0.3156 } | −21.3682 |
| 2.4944 | { −0.2122 | 0.6079 } | { 1.1660 | 0.7908 } | 12.5409 |
| 0.0589 | { 0.8791 | 0.0193 } | { 0.9180 | 0.4529 } | 10.2552 |
| H | | | | | |
| { 27.8800 } | { −20.4576 | −1.1141 } | | | |
| 1.0858 | { 0.6873 | −0.6222 } | { 0.6976 | 0.7652 } | −18.5806 |
| 2.4152 | { 0.5361 | 0.4932 } | { 1.2377 | 0.3132 } | −24.2860 |
| 0.4854 | { −0.3912 | 0.5750 } | { 1.0226 | 0.5740 } | 11.4463 |
| 1.0505 | { −0.7026 | −0.4049 } | { 1.1138 | 0.6097 } | 6.0134 |
| H | | | | | |
| { 1.3800 } | { −2.6355 | 2.7156 } | | | |
| 1.0233 | { −0.3111 | −0.6606 } | { 1.8593 | 0.9083 } | −29.0218 |
| 2.0049 | { −0.6356 | −0.3608 } | { 0.6317 | 0.5278 } | 24.0265 |
| −0.0782 | { −0.5204 | 0.8698 } | { 0.8911 | 0.6808 } | 23.9088 |
| 0.5359 | { 0.4443 | −0.5323 } | { 0.3578 | 0.4830 } | 14.7053 |
| H | | | | | |
| { 45.6700 } | { 9.9799 | 9.3010 } | | | |
| 2.2610 | { −0.5987 | −0.5291 } | { 1.1727 | 0.2857 } | −15.5455 |
| 0.0466 | { −0.4726 | −0.4997 } | { 0.3919 | 0.5131 } | 8.1386 |
| 1.5708 | { −0.7000 | 0.0000 } | { 0.3000 | 0.5000 } | 3.2578 |
| 2.0944 | { −0.7000 | 0.5000 } | { 0.9000 | 0.5000 } | 3.3765 |
| H | | | | | |
| { 42.5900 } | { −4.6566 | −11.6684 } | | | |
| 1.1429 | { 0.0554 | 0.5966 } | { 1.3173 | 0.3226 } | −20.5178 |
| 0.1971 | { 0.5506 | 0.6132 } | { 1.0509 | 0.4018 } | −12.3190 |
| 0.6258 | { 0.0528 | −0.2921 } | { 0.7666 | 0.2815 } | −8.2027 |
| 2.6180 | { −0.7000 | 0.5000 } | { 0.9000 | 0.5000 } | −2.5159 |
| H | | | | | |
| { 23.4600 } | { −32.8136 | 0.8704 } | | | |
| 2.8754 | { 0.6706 | −0.2593 } | { 1.1037 | 0.4549 } | −23.2053 |
| 0.9064 | { 0.5096 | −0.4137 } | { 1.1957 | 0.5655 } | 14.8349 |
| 2.5360 | { 0.4107 | 0.7021 } | { 1.0094 | 0.4634 } | 22.6862 |
| 2.2286 | { −0.4671 | 0.4722 } | { 0.9759 | 0.3955 } | 14.2152 |
| H | | | | | |
| { 21.8000 } | { 7.1581 | 0.1462 } | | | |
| 2.1212 | { −0.1347 | −0.0398 } | { 1.4448 | 0.6800 } | 29.3055 |
| 2.4651 | { −0.5664 | −0.4291 } | { 1.0687 | 0.3643 } | −21.2993 |
| 0.0539 | { 0.1672 | 0.6776 } | { 0.9691 | 0.6396 } | 15.3907 |
| 1.5710 | { 0.8884 | 0.0184 } | { 0.2705 | 0.4484 } | 10.9159 |

TABLE 5

| | | | | | |
|---|---|---|---|---|---|
| H | | | | | |
| { 25.0000 } | { 22.0000 | 6.0000 } | | | |
| 1.5708 | { −0.2545 | 0.0000 } | { 0.9000 | 0.9000 } | 16.5000 |
| 0.0491 | { −0.2545 | 0.7636 } | { 0.5000 | 1.4280 } | 31.5000 |
| 0.8345 | { 0.5091 | 0.5091 } | { 0.3000 | 0.8568 } | 16.5000 |
| 0.5890 | { 0.2545 | 0.0000 } | { 0.3000 | 0.3900 } | 0.0000 |
| H | | | | | |
| { −13.0000 } | { 10.0000 | −10.0000 } | | | |
| 1.7181 | { −0.5091 | −0.2545 } | { 0.3000 | 0.8568 } | 22.5000 |
| 0.4909 | { 0.2545 | 0.5091 } | { 0.3000 | 0.5070 } | 16.5000 |
| 1.5708 | { 0.7636 | −0.2545 } | { 0.5000 | 0.5000 } | 16.5000 |
| 1.0308 | { 0.0000 | −0.7636 } | { 0.5000 | 1.0985 } | 19.5000 |

TABLE 5-continued

| | | | | | |
|---|---|---|---|---|---|
| H | | | | | |
| { 21.0000 } | { 6.0000 | 18.0000 } | | | |
| 2.7980 | { −0.5091 | 0.5091 } | { 0.3000 | 0.8568 } | 16.5000 |
| 0.5400 | { −0.2545 | 0.2545 } | { 0.3000 | 0.8568 } | −16.5000 |
| 2.1108 | { −0.7636 | 0.0000 } | { 0.3000 | 0.8568 } | −13.5000 |
| 0.4909 | { 0.2545 | −0.5091 } | { 0.3000 | 0.5070 } | 0.0000 |
| H | | | | | |
| { −29.0000 } | { −6.0000 | −26.0000 } | | | |
| 2.1108 | { −1.0182 | −0.7636 } | { 0.5000 | 1.0985 } | −22.5000 |
| 2.1598 | { 0.5091 | 0.7636 } | { 0.9000 | 1.1700 } | 13.5000 |
| 2.1598 | { 0.5091 | −0.7636 } | { 0.5000 | 0.6500 } | 16.5000 |
| 0.1473 | { 0.5091 | 0.5091 } | { 0.5000 | 1.0985 } | −22.5000 |
| H | | | | | |
| { 9.0000 } | { −18.0000 | 10.0000 } | | | |
| 1.4235 | { −0.7636 | −0.5091 } | { 0.7000 | 1.5379 } | 22.5000 |
| 0.9817 | { 0.2545 | 0.2545 } | { 0.5000 | 0.6500 } | 16.5000 |
| 1.6935 | { 0.7636 | 1.0182 } | { 0.5000 | 1.8565 } | −19.5000 |
| 0.9327 | { −0.2545 | 0.0000 } | { 0.5000 | 1.0985 } | −13.5000 |
| H | | | | | |
| { 15.000 } | { 2.0000 | −2.0000 } | | | |
| 2.6998 | { −0.7636 | 0.5091 } | { 0.7000 | 1.5379 } | −25.5000 |
| 0.6381 | { 0.0000 | −0.2545 } | { 0.3000 | 0.8568 } | −22.5000 |
| 0.8345 | { 0.5091 | 0.5091 } | { 0.3000 | 0.8568 } | −19.5000 |
| 1.4726 | { 0.2545 | −0.7636 } | { 0.5000 | 0.8450 } | 0.0000 |
| H | | | | | |
| { 3.0000 } | { 14.0000 | −10.0000 } | | | |
| 2.8471 | { −0.2545 | 0.5091 } | { 0.3000 | 0.5070 } | −16.5000 |
| 1.8162 | { 0.2545 | −0.2545 } | { 0.5000 | 1.0985 } | 19.5000 |
| 0.5400 | { −0.5091 | −0.5091 } | { 0.3000 | 0.8568 } | 10.5000 |
| 0.9327 | { −0.2545 | −0.5091 } | { 0.3000 | 0.8568 } | 0.0000 |
| H | | | | | |
| { −21.0000 } | { 10.0000 | −2.0000 } | | | |
| 1.0308 | { −0.2545 | 0.0000 } | { 0.3000 | 0.6591 } | 19.5000 |
| 0.9817 | { 0.7636 | −0.2545 } | { 0.5000 | 0.6500 } | 22.5000 |
| 2.5525 | { 0.5091 | 0.7636 } | { 0.5000 | 0.6500 } | 22.5000 |
| 2.2089 | { −0.2545 | 0.7636 } | { 0.3000 | 0.8568 } | 0.0000 |
| H | | | | | |
| { 13.0000 } | { 2.0000 | −6.0000 } | | | |
| 0.9327 | { 0.7636 | −0.2545 } | { 0.7000 | 1.5379 } | −16.5000 |
| 0.6872 | { −0.5091 | 0.7636 } | { 0.9000 | 1.5210 } | −16.5000 |
| 2.0371 | { −0.7636 | −0.5091 } | { 0.3000 | 1.4480 } | −25.5000 |
| 0.6381 | { 0.5091 | 0.0000 } | { 0.3000 | 0.8568 } | 19.5000 |
| H | | | | | |
| { 23.0000 } | { 14.0000 | 2.0000 } | | | |
| 0.7363 | { −0.7636 | −0.5091 } | { 0.5000 | 1.0985 } | −25.5000 |
| 2.3317 | { 0.2545 | 0.0000 } | { 0.3000 | 1.1139 } | −22.5000 |
| 0.9817 | { −0.2545 | 0.5091 } | { 0.7000 | 0.9100 } | 10.5000 |
| 1.6199 | { 0.7636 | 0.0000 } | { 0.5000 | 1.0985 } | 0.0000 |
| H | | | | | |
| { 29.0000 } | { −18.0000 | −6.0000 } | | | |
| 1.5708 | { 0.7636 | −0.5091 } | { 0.7000 | 0.7000 } | −19.5000 |
| 0.8590 | { 0.5091 | 0.5091 } | { 0.3000 | 1.1139 } | −22.5000 |
| 2.0617 | { −0.5091 | 0.5091 } | { 0.5000 | 0.8450 } | 0.0000 |
| 2.6507 | { −0.7636 | −0.5091 } | { 0.7000 | 1.1830 } | 0.0000 |
| H | | | | | |
| { 5.0000 } | { −2.0000 | 6.0000 } | | | |
| 2.6016 | { −0.5091 | −0.7636 } | { 0.9000 | 1.9773 } | −40.5000 |
| 0.5890 | { −0.7636 | −0.2545 } | { 0.5000 | 0.6500 } | 19.5000 |
| 1.3744 | { −0.5091 | 0.7636 } | { 0.7000 | 0.9100 } | 22.5000 |
| 0.5890 | { 0.5091 | −0.5091 } | { 0.3000 | 0.3900 } | 0.0000 |
| H | | | | | |
| { 43.0000 } | { 10.0000 | 10.0000 } | | | |
| 0.7118 | { −0.5091 | −0.5091 } | { 0.3000 | 1.1139 } | −19.5000 |
| 0.1963 | { −0.2545 | −0.5091 } | { 0.3000 | 0.3900 } | 7.5000 |
| 1.4726 | { −0.7636 | 0.0000 } | { 0.3000 | 0.5070 } | 0.0000 |
| 0.4909 | { −0.7636 | 0.5091 } | { 0.5000 | 0.8450 } | 0.0000 |
| H | | | | | |
| { 41.0000 } | { −6.0000 | −10.0000 } | | | |
| 2.7243 | { 0.0000 | 0.5091 } | { 0.3000 | 1.1139 } | −19.5000 |
| 1.8162 | { 0.5091 | 0.5091 } | { 0.5000 | 1.4280 } | −16.5000 |
| 2.2089 | { 0.0000 | −0.2545 } | { 0.3000 | 0.8568 } | 0.0000 |
| 1.0799 | { −0.7636 | 0.5091 } | { 0.5000 | 0.8450 } | 0.0000 |
| H | | | | | |
| { 23.5000 } | { −31.5000 | 0.5000 } | | | |
| 1.3008 | { 0.6533 | −0.2800 } | { 0.4750 | 1.1761 } | −25.5000 |
| 2.4789 | { 0.4667 | −0.4667 } | { 0.5750 | 1.2711 } | 15.5000 |
| 0.9572 | { 0.4667 | 0.6533 } | { 0.4750 | 1.0501 } | 23.5000 |
| 0.6627 | { −0.4667 | 0.4667 } | { 0.3750 | 0.9285 } | 13.5000 |
| H | | | | | |

TABLE 5-continued

| { 29.0000 } | { 2.0000 | 2.0000 } | | | |
|---|---|---|---|---|---|
| 0.5400 | { −0.2545 | 0.0000 } | { 0.7000 | 1.5379 } | 28.5000 |
| 0.9327 | { −0.5091 | −0.5091 } | { 0.3000 | 0.8568 } | −19.5000 |
| 1.6690 | { 0.2545 | 0.7636 } | { 9.7000 | 1.1830 } | 13.5000 |
| 1.6690 | { 0.7636 | 0.0000 } | { 0.3000 | 0.5070 } | 0.0000 |

TABLE 6

| | | | | | | | | | | | | | | | | | | |
|---|---|---|---|---|---|---|---|---|---|---|---|---|---|---|---|---|---|---|
| 142 | 136 | 137 | 139 | 135 | 139 | 138 | 134 | 137 | 136 | 135 | 137 | 137 | 139 | 138 | 135 | 138 | 138 | 138 |
| 137 | 138 | 140 | 136 | 134 | 139 | 138 | 134 | 135 | 137 | 136 | 140 | 137 | 131 | 138 | 140 | 136 | 136 | 134 |
| 137 | 138 | 135 | 136 | 136 | 137 | 137 | 134 | 135 | 134 | | | | | | | | | |
| 139 | 138 | 139 | 141 | 137 | 139 | 137 | 134 | 139 | 136 | 136 | 141 | 136 | 137 | 138 | 137 | 141 | 137 | 136 |
| 135 | 137 | 139 | 136 | 137 | 140 | 136 | 136 | 141 | 135 | 131 | 142 | 138 | 133 | 137 | 136 | 137 | 136 | 136 |
| 138 | 137 | 136 | 134 | 136 | 136 | 135 | 138 | 136 | 136 | | | | | | | | | |
| 139 | 135 | 141 | 138 | 138 | 139 | 133 | 137 | 140 | 137 | 139 | 139 | 137 | 139 | 137 | 138 | 141 | 137 | 138 |
| 135 | 135 | 141 | 136 | 136 | 136 | 134 | 140 | 135 | 136 | 140 | 134 | 136 | 138 | 136 | 137 | 135 | 135 | 137 |
| 134 | 136 | 137 | 133 | 138 | 136 | 131 | 139 | 134 | 131 | | | | | | | | | |
| 137 | 140 | 139 | 136 | 140 | 141 | 135 | 138 | 142 | 135 | 135 | 137 | 137 | 139 | 139 | 140 | 136 | 135 | 140 |
| 139 | 135 | 138 | 138 | 137 | 138 | 135 | 136 | 137 | 134 | 140 | 138 | 134 | 141 | 138 | 138 | 136 | 132 | 140 |
| 137 | 134 | 138 | 134 | 140 | 141 | 132 | 136 | 137 | 133 | | | | | | | | | |
| 138 | 142 | 139 | 135 | 138 | 141 | 136 | 137 | 137 | 136 | 140 | 136 | 135 | 137 | 141 | 139 | 135 | 139 | 137 |
| 136 | 139 | 136 | 136 | 138 | 135 | 137 | 139 | 138 | 136 | 139 | 137 | 134 | 137 | 139 | 134 | 137 | 136 | 137 |
| 140 | 134 | 137 | 138 | 136 | 137 | 133 | 138 | 135 | 136 | | | | | | | | | |
| 128 | 143 | 136 | 144 | 139 | 135 | 142 | 138 | 138 | 137 | 139 | 137 | 136 | 140 | 136 | 135 | 136 | 136 | 139 |
| 139 | 141 | 140 | 134 | 136 | 139 | 138 | 137 | 139 | 135 | 137 | 140 | 134 | 136 | 136 | 136 | 141 | 134 | 133 |
| 139 | 138 | 134 | 136 | 140 | 137 | 135 | 135 | 135 | 138 | | | | | | | | | |
| 75 | 121 | 141 | 139 | 139 | 140 | 137 | 135 | 136 | 141 | 136 | 135 | 139 | 135 | 139 | 138 | 135 | 138 | 134 |
| 138 | 138 | 134 | 139 | 140 | 137 | 136 | 135 | 138 | 139 | 139 | 136 | 139 | 141 | 132 | 136 | 141 | 135 | 135 |
| 137 | 135 | 136 | 138 | 138 | 135 | 136 | 136 | 133 | 137 | | | | | | | | | |
| 38 | 66 | 108 | 136 | 140 | 138 | 144 | 137 | 137 | 141 | 137 | 139 | 138 | 133 | 139 | 137 | 135 | 142 | 135 |
| 136 | 139 | 135 | 139 | 138 | 135 | 139 | 137 | 138 | 140 | 136 | 136 | 138 | 133 | 138 | 140 | 135 | 138 | 136 |
| 135 | 140 | 138 | 137 | 136 | 135 | 137 | 135 | 136 | 136 | | | | | | | | | |
| 72 | 35 | 58 | 104 | 135 | 144 | 140 | 139 | 138 | 139 | 138 | 138 | 138 | 136 | 137 | 131 | 136 | 139 | 134 |
| 139 | 138 | 136 | 138 | 136 | 139 | 140 | 133 | 132 | 140 | 139 | 134 | 140 | 137 | 135 | 143 | 141 | 135 | 135 |
| 138 | 138 | 139 | 137 | 134 | 136 | 137 | 138 | 135 | 129 | | | | | | | | | |
| 116 | 76 | 48 | 48 | 96 | 135 | 138 | 141 | 142 | 137 | 137 | 137 | 140 | 141 | 134 | 135 | 140 | 139 | 137 |
| 136 | 140 | 136 | 136 | 141 | 135 | 139 | 136 | 134 | 142 | 135 | 135 | 141 | 137 | 134 | 139 | 139 | 134 | 138 |
| 139 | 133 | 135 | 141 | 137 | 132 | 141 | 138 | 132 | 138 | | | | | | | | | |
| 145 | 123 | 84 | 43 | 48 | 91 | 131 | 142 | 140 | 144 | 139 | 133 | 138 | 142 | 140 | 137 | 136 | 138 | 137 |
| 137 | 141 | 135 | 136 | 141 | 134 | 139 | 139 | 134 | 139 | 138 | 135 | 136 | 138 | 136 | 139 | 138 | 135 | 138 |
| 136 | 135 | 139 | 136 | 134 | 138 | 140 | 134 | 133 | 139 | | | | | | | | | |
| 144 | 148 | 128 | 92 | 46 | 41 | 82 | 124 | 142 | 141 | 141 | 140 | 138 | 139 | 138 | 140 | 138 | 136 | 136 |
| 139 | 138 | 136 | 138 | 137 | 138 | 135 | 140 | 138 | 138 | 134 | 139 | 140 | 135 | 132 | 140 | 139 | 132 | 135 |
| 139 | 138 | 137 | 136 | 136 | 135 | 136 | 135 | 135 | 137 | | | | | | | | | |
| 143 | 144 | 147 | 132 | 98 | 62 | 38 | 72 | 120 | 139 | 139 | 141 | 139 | 138 | 138 | 138 | 139 | 139 | 137 |
| 138 | 139 | 136 | 138 | 138 | 136 | 137 | 139 | 139 | 136 | 137 | 140 | 136 | 134 | 137 | 134 | 136 | 141 | 132 |
| 138 | 141 | 132 | 136 | 137 | 135 | 133 | 137 | 137 | 131 | | | | | | | | | |
| 143 | 138 | 143 | 146 | 139 | 110 | 60 | 36 | 62 | 111 | 133 | 138 | 142 | 139 | 136 | 141 | 139 | 135 | 137 |
| 140 | 138 | 136 | 138 | 138 | 136 | 136 | 137 | 136 | 138 | 139 | 136 | 139 | 135 | 134 | 142 | 135 | 135 | 141 |
| 137 | 135 | 138 | 136 | 137 | 139 | 136 | 136 | 135 | 135 | | | | | | | | | |
| 135 | 137 | 143 | 142 | 146 | 143 | 112 | 67 | 37 | 58 | 102 | 135 | 145 | 137 | 137 | 138 | 136 | 139 | 139 |
| 139 | 140 | 139 | 138 | 135 | 136 | 141 | 136 | 137 | 138 | 135 | 138 | 137 | 137 | 138 | 134 | 138 | 138 | |
| 136 | 139 | 134 | 135 | 139 | 135 | 140 | 136 | 134 | 139 | | | | | | | | | |
| 138 | 139 | 139 | 141 | 140 | 141 | 146 | 118 | 75 | 45 | 45 | 90 | 133 | 140 | 142 | 140 | 141 | 143 | 135 |
| 139 | 141 | 139 | 138 | 133 | 140 | 138 | 132 | 138 | 138 | 134 | 135 | 142 | 137 | 133 | 141 | 139 | 136 | 136 |
| 133 | 140 | 139 | 133 | 138 | 139 | 137 | 134 | 141 | | | | | | | | | | |
| 141 | 137 | 139 | 140 | 137 | 143 | 148 | 145 | 126 | 86 | 48 | 47 | 84 | 125 | 144 | 144 | 139 | 137 | 137 |
| 142 | 141 | 140 | 137 | 131 | 139 | 141 | 134 | 140 | 135 | 133 | 141 | 139 | 134 | 138 | 138 | 133 | 134 | 140 |
| 136 | 136 | 139 | 135 | 138 | 138 | 137 | 140 | 136 | 138 | | | | | | | | | |
| 136 | 136 | 140 | 138 | 138 | 140 | 139 | 143 | 148 | 130 | 96 | 53 | 41 | 76 | 120 | 139 | 140 | 142 | 142 |
| 136 | 139 | 140 | 140 | 139 | 136 | 139 | 138 | 133 | 138 | 140 | 137 | 138 | 137 | 138 | 139 | 137 | 138 | 140 |
| 135 | 134 | 139 | 139 | 134 | 137 | 140 | 134 | 137 | 141 | | | | | | | | | |
| 140 | 136 | 135 | 139 | 136 | 137 | 140 | 139 | 146 | 147 | 133 | 107 | 61 | 37 | 61 | 110 | 141 | 141 | 138 |
| 141 | 137 | 141 | 138 | 137 | 138 | 133 | 139 | 140 | 135 | 139 | 137 | 136 | 138 | 138 | 138 | 137 | 135 | 138 |
| 137 | 134 | 138 | 139 | 134 | 133 | 136 | 140 | 134 | 138 | | | | | | | | | |
| 139 | 136 | 138 | 137 | 138 | 140 | 140 | 138 | 137 | 146 | 147 | 136 | 112 | 68 | 42 | 53 | 94 | 136 | 141 |
| 142 | 146 | 137 | 140 | 142 | 139 | 137 | 135 | 141 | 137 | 136 | 136 | 133 | 141 | 136 | 134 | 143 | 135 | 137 |
| 140 | 135 | 137 | 138 | 138 | 137 | 136 | 137 | 137 | 135 | | | | | | | | | |
| 139 | 137 | 139 | 143 | 137 | 137 | 137 | 139 | 139 | 138 | 144 | 144 | 138 | 121 | 84 | 48 | 44 | 80 | 128 |
| 139 | 138 | 144 | 138 | 137 | 143 | 140 | 137 | 139 | 135 | 137 | 140 | 133 | 138 | 139 | 133 | 137 | 140 | 134 |
| 137 | 141 | 134 | 138 | 139 | 132 | 137 | 137 | 136 | 137 | | | | | | | | | |
| 137 | 140 | 140 | 137 | 139 | 138 | 138 | 137 | 137 | 138 | 140 | 142 | 145 | 143 | 132 | 96 | 54 | 38 | 63 |
| 114 | 136 | 142 | 137 | 139 | 138 | 138 | 138 | 136 | 138 | 138 | 139 | 138 | 134 | 138 | 139 | 132 | 138 | 133 |
| 132 | 142 | 135 | 136 | 139 | 134 | 139 | 137 | 135 | 140 | | | | | | | | | |
| 136 | 138 | 140 | 138 | 140 | 138 | 138 | 139 | 133 | 138 | 141 | 136 | 141 | 144 | 146 | 137 | 106 | 70 | 40 |
| 49 | 103 | 136 | 136 | 138 | 142 | 137 | 138 | 142 | 137 | 134 | 140 | 138 | 136 | 136 | 137 | 137 | 130 | 135 |
| 140 | 135 | 135 | 139 | 135 | 137 | 142 | 137 | 135 | 137 | | | | | | | | | |

TABLE 6-continued

| | | | | | | | | | | | | | | | | | | |
|---|---|---|---|---|---|---|---|---|---|---|---|---|---|---|---|---|---|---|
| 144 | 132 | 90 | 51 | 40 | 71 | 111 | 131 | 143 | 139 | 139 | 143 | 137 | 142 | 141 | 135 | 139 | 139 | 136 |
| 138 | 136 | 137 | 137 | 135 | 136 | 138 | 134 | 135 | 137 | 136 | 140 | 141 | 144 | 145 | 133 | 122 | 91 | 55 |
| 43 | 53 | 93 | 120 | 128 | 143 | 141 | 139 | 143 | 140 | | | | | | | | | |
| 143 | 139 | 135 | 139 | 140 | 139 | 137 | 136 | 138 | 138 | 133 | 138 | 139 | 134 | 142 | 143 | 139 | 146 | 133 |
| 94 | 53 | 35 | 68 | 115 | 136 | 142 | 142 | 140 | 139 | 139 | 137 | 135 | 137 | 138 | 138 | 139 | 136 | 136 |
| 136 | 135 | 135 | 139 | 138 | 133 | 137 | 138 | 135 | 139 | | | | | | | | | |
| 136 | 139 | 145 | 137 | 136 | 140 | 136 | 137 | 135 | 135 | 137 | 136 | 140 | 137 | 134 | 143 | 140 | 140 | 149 |
| 135 | 105 | 72 | 40 | 51 | 102 | 130 | 139 | 142 | 140 | 140 | 138 | 137 | 140 | 137 | 137 | 138 | 137 | 138 |
| 138 | 136 | 137 | 134 | 138 | 137 | 135 | 135 | 138 | 140 | | | | | | | | | |
| 137 | 142 | 145 | 136 | 139 | 141 | 135 | 138 | 136 | 137 | 136 | 133 | 139 | 138 | 135 | 139 | 140 | 141 | 141 |
| 146 | 144 | 120 | 78 | 50 | 46 | 76 | 118 | 140 | 140 | 140 | 139 | 139 | 134 | 135 | 142 | 135 | 137 | 135 |
| 134 | 142 | 133 | 135 | 140 | 131 | 135 | 141 | 135 | 135 | | | | | | | | | |
| 137 | 139 | 142 | 142 | 140 | 139 | 142 | 138 | 135 | 138 | 137 | 139 | 137 | 136 | 139 | 137 | 138 | 137 | 135 |
| 143 | 148 | 143 | 131 | 99 | 56 | 39 | 65 | 109 | 132 | 141 | 142 | 140 | 140 | 138 | 138 | 139 | 136 | 133 |
| 137 | 138 | 135 | 136 | 134 | 138 | 138 | 133 | 139 | 137 | | | | | | | | | |
| 140 | 140 | 142 | 138 | 135 | 139 | 138 | 136 | 143 | 137 | 135 | 141 | 137 | 136 | 138 | 138 | 140 | 136 | 138 |
| 143 | 139 | 142 | 149 | 136 | 112 | 79 | 43 | 47 | 86 | 123 | 139 | 139 | 140 | 139 | 137 | 136 | 138 | 138 |
| 134 | 137 | 136 | 136 | 139 | 134 | 134 | 137 | 138 | 139 | | | | | | | | | |
| 143 | 143 | 139 | 142 | 137 | 136 | 142 | 136 | 138 | 138 | 134 | 141 | 137 | 136 | 137 | 137 | 138 | 136 | 142 |
| 141 | 138 | 139 | 144 | 147 | 141 | 128 | 92 | 53 | 42 | 59 | 107 | 132 | 138 | 144 | 137 | 141 | 144 | 133 |
| 135 | 140 | 137 | 134 | 139 | 137 | 134 | 139 | 138 | 136 | | | | | | | | | |
| 134 | 138 | 145 | 142 | 139 | 141 | 138 | 140 | 141 | 138 | 138 | 138 | 138 | 136 | 136 | 138 | 135 | 137 | 138 |
| 134 | 134 | 132 | 140 | 143 | 139 | 146 | 136 | 107 | 81 | 48 | 43 | 84 | 118 | 131 | 141 | 144 | 137 | 139 |
| 136 | 138 | 143 | 134 | 132 | 138 | 137 | 135 | 136 | 138 | | | | | | | | | |
| 96 | 121 | 142 | 147 | 139 | 141 | 142 | 139 | 136 | 140 | 140 | 136 | 138 | 135 | 138 | 139 | 136 | 140 | 136 |
| 129 | 131 | 139 | 139 | 136 | 141 | 143 | 144 | 144 | 126 | 98 | 58 | 37 | 59 | 97 | 126 | 138 | 138 | 141 |
| 139 | 135 | 139 | 139 | 132 | 137 | 140 | 135 | 136 | 138 | | | | | | | | | |
| 47 | 75 | 119 | 142 | 142 | 143 | 141 | 139 | 139 | 139 | 140 | 138 | 140 | 138 | 134 | 137 | 140 | 138 | 135 |
| 137 | 136 | 135 | 140 | 137 | 136 | 140 | 141 | 144 | 144 | 137 | 116 | 83 | 50 | 39 | 71 | 111 | 128 | 138 |
| 141 | 139 | 142 | 140 | 138 | 137 | 138 | 139 | 133 | 135 | | | | | | | | | |
| 58 | 45 | 63 | 106 | 136 | 139 | 146 | 141 | 138 | 142 | 140 | 142 | 135 | 136 | 142 | 134 | 139 | 139 | 135 |
| 137 | 136 | 139 | 137 | 135 | 138 | 135 | 137 | 143 | 141 | 141 | 147 | 133 | 101 | 70 | 41 | 47 | 86 | 118 |
| 131 | 135 | 143 | 144 | 140 | 136 | 138 | 140 | 135 | 137 | | | | | | | | | |
| 116 | 79 | 48 | 45 | 84 | 130 | 135 | 141 | 146 | 138 | 141 | 138 | 138 | 139 | 138 | 139 | 136 | 139 | 137 |
| 135 | 138 | 136 | 137 | 139 | 136 | 138 | 137 | 135 | 137 | 140 | 144 | 142 | 140 | 128 | 95 | 58 | 39 | 53 |
| 90 | 116 | 130 | 142 | 141 | 135 | 142 | 141 | 134 | 137 | | | | | | | | | |
| 144 | 132 | 90 | 51 | 40 | 71 | 111 | 131 | 143 | 139 | 139 | 143 | 137 | 142 | 141 | 135 | 139 | 139 | 136 |
| 138 | 136 | 137 | 137 | 135 | 136 | 138 | 134 | 135 | 137 | 136 | 140 | 141 | 144 | 145 | 133 | 122 | 91 | 55 |
| 145 | 144 | 138 | 114 | 71 | 41 | 52 | 97 | 131 | 138 | 144 | 139 | 137 | 145 | 139 | 138 | 138 | 136 | 140 |
| 136 | 137 | 136 | 134 | 137 | 136 | 140 | 136 | 134 | 140 | 134 | 135 | 144 | 138 | 138 | 147 | 145 | 133 | 117 |
| 89 | 55 | 37 | 56 | 96 | 120 | 131 | 138 | 141 | 140 | | | | | | | | | |
| 142 | 143 | 147 | 144 | 124 | 88 | 46 | 45 | 83 | 122 | 136 | 140 | 141 | 138 | 140 | 140 | 139 | 136 | 136 |
| 140 | 137 | 138 | 136 | 135 | 139 | 136 | 138 | 138 | 137 | 136 | 134 | 136 | 140 | 139 | 136 | 142 | 148 | 142 |
| 133 | 116 | 90 | 56 | 38 | 58 | 91 | 116 | 132 | 137 | | | | | | | | | |
| 140 | 139 | 143 | 147 | 141 | 133 | 99 | 57 | 41 | 60 | 109 | 132 | 137 | 144 | 139 | 136 | 142 | 141 | 138 |
| 138 | 136 | 139 | 136 | 135 | 142 | 133 | 135 | 143 | 135 | 135 | 137 | 133 | 136 | 137 | 138 | 139 | 140 | 144 |
| 140 | 141 | 137 | 113 | 83 | 56 | 38 | 55 | 98 | 117 | | | | | | | | | |
| 138 | 144 | 136 | 139 | 148 | 145 | 137 | 113 | 75 | 45 | 48 | 85 | 119 | 133 | 138 | 143 | 141 | 138 | 140 |
| 139 | 136 | 136 | 139 | 139 | 135 | 135 | 136 | 136 | 141 | 136 | 131 | 138 | 139 | 134 | 138 | 137 | 138 | 141 |
| 139 | 142 | 145 | 144 | 128 | 112 | 92 | 58 | 40 | 55 | | | | | | | | | |
| 142 | 134 | 136 | 143 | 137 | 144 | 148 | 143 | 131 | 102 | 67 | 42 | 55 | 92 | 120 | 134 | 141 | 143 | 139 |
| 141 | 140 | 139 | 139 | 136 | 138 | 138 | 134 | 132 | 138 | 138 | 133 | 137 | 136 | 138 | 139 | 133 | 137 | 136 |
| 137 | 138 | 135 | 146 | 144 | 139 | 136 | 115 | 88 | 54 | | | | | | | | | |
| 138 | 136 | 141 | 142 | 137 | 142 | 145 | 147 | 147 | 140 | 127 | 98 | 65 | 43 | 53 | 100 | 125 | 135 | 147 |
| 140 | 138 | 142 | 139 | 140 | 137 | 137 | 136 | 136 | 137 | 133 | 135 | 137 | 133 | 139 | 135 | 136 | 140 | 133 |
| 137 | 133 | 136 | 140 | 134 | 142 | 140 | 139 | 135 | 112 | | | | | | | | | |
| 136 | 138 | 143 | 139 | 139 | 139 | 143 | 143 | 142 | 150 | 147 | 139 | 121 | 86 | 56 | 44 | 68 | 115 | 131 |
| 135 | 145 | 144 | 141 | 140 | 137 | 137 | 139 | 140 | 135 | 133 | 140 | 138 | 135 | 137 | 138 | 138 | 136 | 134 |
| 132 | 137 | 139 | 136 | 133 | 137 | 142 | 141 | 144 | 144 | | | | | | | | | |
| 141 | 140 | 142 | 135 | 143 | 140 | 138 | 142 | 139 | 145 | 145 | 146 | 147 | 137 | 110 | 74 | 50 | 47 | 78 |
| 124 | 133 | 134 | 144 | 143 | 142 | 139 | 139 | 140 | 137 | 137 | 140 | 136 | 136 | 138 | 136 | 136 | 139 | 135 |
| 134 | 139 | 136 | 134 | 140 | 134 | 133 | 141 | 139 | 142 | | | | | | | | | |
| 141 | 136 | 140 | 141 | 137 | 135 | 141 | 141 | 136 | 137 | 143 | 144 | 144 | 142 | 142 | 131 | 96 | 66 | 43 |
| 49 | 92 | 116 | 131 | 143 | 139 | 142 | 141 | 138 | 138 | 139 | 141 | 134 | 136 | 140 | 134 | 136 | 138 | 137 |
| 137 | 134 | 137 | 139 | 137 | 135 | 133 | 137 | 137 | 133 | | | | | | | | | |
| 138 | 141 | 138 | 136 | 138 | 139 | 138 | 137 | 139 | 138 | 138 | 136 | 140 | 141 | 139 | 147 | 139 | 120 | 93 |
| 55 | 42 | 53 | 84 | 122 | 135 | 137 | 143 | 142 | 140 | 138 | 137 | 140 | 141 | 136 | 134 | 136 | 137 | 137 |
| 138 | 134 | 137 | 137 | 133 | 139 | 134 | 133 | 141 | 136 | | | | | | | | | |
| 137 | 138 | 130 | 143 | 140 | 133 | 139 | 137 | 139 | 138 | 140 | 139 | 135 | 139 | 138 | 142 | 147 | 144 | 135 |
| 119 | 90 | 58 | 42 | 50 | 89 | 120 | 129 | 139 | 144 | 142 | 141 | 141 | 139 | 135 | 140 | 136 | 135 | 138 |
| 136 | 136 | 134 | 135 | 139 | 135 | 135 | 138 | 137 | 136 | | | | | | | | | |
| 138 | 138 | 136 | 140 | 140 | 137 | 135 | 142 | 139 | 140 | 142 | 138 | 139 | 135 | 140 | 147 | 138 | 144 | 146 |
| 140 | 138 | 121 | 87 | 56 | 40 | 52 | 94 | 122 | 129 | 140 | 146 | 143 | 140 | 138 | 138 | 141 | 137 | 134 |
| 137 | 135 | 135 | 136 | 135 | 137 | 138 | 133 | 134 | 139 | | | | | | | | | |

TABLE 7

| | | | | | | | | | | | | | | | | | | |
|---|---|---|---|---|---|---|---|---|---|---|---|---|---|---|---|---|---|---|
| 138 | 138 | 138 | 138 | 137 | 137 | 137 | 137 | 137 | 136 | 136 | 136 | 137 | 138 | 138 | 138 | 138 | 138 | 138 |
| 137 | 137 | 137 | 136 | 137 | 137 | 137 | 137 | 137 | 137 | 137 | 136 | 136 | 136 | 136 | 136 | 137 | 135 | 136 |
| 136 | 137 | 137 | 136 | 136 | 136 | 136 | 135 | 135 | 135 | | | | | | | | | |
| 139 | 138 | 138 | 138 | 138 | 138 | 137 | 137 | 137 | 137 | 136 | 136 | 137 | 138 | 138 | 138 | 138 | 138 | 138 |
| 138 | 137 | 137 | 137 | 136 | 137 | 137 | 137 | 137 | 137 | 137 | 136 | 136 | 136 | 136 | 137 | 137 | 135 | 136 |
| 136 | 137 | 137 | 136 | 136 | 136 | 136 | 135 | 135 | 135 | | | | | | | | | |
| 139 | 139 | 139 | 138 | 138 | 138 | 138 | 137 | 137 | 137 | 137 | 137 | 137 | 137 | 138 | 138 | 138 | 138 | 138 |
| 138 | 137 | 137 | 137 | 137 | 137 | 137 | 137 | 137 | 137 | 137 | 136 | 136 | 136 | 136 | 137 | 137 | 135 | 136 |
| 136 | 137 | 137 | 137 | 136 | 136 | 136 | 135 | 135 | 135 | | | | | | | | | |
| 139 | 139 | 139 | 139 | 138 | 138 | 138 | 138 | 137 | 137 | 137 | 137 | 137 | 137 | 137 | 138 | 138 | 138 | 138 |
| 138 | 138 | 137 | 137 | 137 | 137 | 137 | 137 | 137 | 137 | 137 | 137 | 137 | 137 | 137 | 137 | 138 | 135 | 136 |
| 137 | 137 | 137 | 137 | 136 | 136 | 136 | 135 | 135 | 135 | | | | | | | | | |
| 140 | 139 | 139 | 139 | 139 | 138 | 138 | 138 | 138 | 138 | 137 | 137 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 138 | 135 | 136 |
| 137 | 137 | 137 | 137 | 136 | 136 | 136 | 135 | 135 | 135 | | | | | | | | | |
| 127 | 140 | 139 | 139 | 139 | 139 | 139 | 138 | 138 | 138 | 138 | 137 | 137 | 137 | 137 | 137 | 137 | 137 | 137 |
| 137 | 137 | 137 | 138 | 138 | 137 | 137 | 137 | 137 | 137 | 137 | 137 | 137 | 137 | 137 | 137 | 138 | 135 | 136 |
| 137 | 137 | 137 | 137 | 137 | 136 | 136 | 136 | 135 | 135 | | | | | | | | | |
| 73 | 120 | 140 | 140 | 139 | 139 | 139 | 139 | 138 | 138 | 138 | 138 | 137 | 137 | 137 | 137 | 137 | 137 | 137 |
| 137 | 137 | 137 | 138 | 138 | 137 | 137 | 137 | 137 | 137 | 137 | 137 | 137 | 137 | 137 | 138 | 138 | 135 | 136 |
| 137 | 137 | 137 | 137 | 137 | 136 | 136 | 136 | 135 | 135 | | | | | | | | | |
| 41 | 65 | 112 | 140 | 140 | 139 | 139 | 139 | 139 | 139 | 138 | 138 | 137 | 137 | 137 | 137 | 137 | 137 | 137 |
| 137 | 137 | 137 | 138 | 138 | 137 | 137 | 137 | 137 | 137 | 137 | 137 | 137 | 137 | 137 | 138 | 138 | 135 | 136 |
| 137 | 137 | 137 | 137 | 136 | 136 | 136 | 135 | 135 | 135 | | | | | | | | | |
| 64 | 41 | 58 | 103 | 139 | 140 | 139 | 139 | 139 | 139 | 139 | 138 | 138 | 137 | 137 | 137 | 137 | 137 | 137 |
| 137 | 137 | 137 | 138 | 138 | 137 | 137 | 137 | 137 | 137 | 137 | 137 | 137 | 137 | 138 | 138 | 139 | 135 | 136 |
| 137 | 137 | 137 | 137 | 137 | 137 | 136 | 136 | 136 | 136 | | | | | | | | | |
| 121 | 72 | 43 | 53 | 95 | 136 | 140 | 140 | 139 | 139 | 139 | 139 | 138 | 138 | 138 | 137 | 137 | 137 | 137 |
| 137 | 137 | 137 | 138 | 138 | 137 | 137 | 137 | 137 | 137 | 137 | 137 | 137 | 137 | 138 | 138 | 139 | 135 | 136 |
| 137 | 137 | 137 | 137 | 137 | 137 | 136 | 136 | 136 | 136 | | | | | | | | | |
| 146 | 129 | 80 | 45 | 48 | 88 | 132 | 140 | 140 | 139 | 139 | 139 | 139 | 138 | 138 | 138 | 137 | 137 | 137 |
| 137 | 137 | 137 | 138 | 138 | 137 | 137 | 137 | 137 | 137 | 137 | 137 | 137 | 137 | 137 | 138 | 139 | 135 | 136 |
| 137 | 137 | 137 | 137 | 137 | 136 | 136 | 136 | 136 | 136 | | | | | | | | | |
| 146 | 146 | 135 | 87 | 48 | 45 | 81 | 128 | 140 | 140 | 140 | 139 | 140 | 139 | 139 | 138 | 138 | 137 | 137 |
| 137 | 137 | 138 | 138 | 138 | 137 | 137 | 137 | 137 | 137 | 137 | 137 | 137 | 137 | 137 | 138 | 138 | 135 | 136 |
| 136 | 137 | 137 | 137 | 137 | 136 | 136 | 136 | 136 | 135 | | | | | | | | | |
| 142 | 142 | 143 | 140 | 99 | 54 | 42 | 70 | 118 | 138 | 138 | 138 | 140 | 140 | 139 | 139 | 139 | 138 | 138 |
| 138 | 137 | 137 | 137 | 137 | 137 | 137 | 137 | 137 | 137 | 137 | 137 | 137 | 137 | 137 | 136 | 135 | 138 | 137 |
| 137 | 137 | 136 | 136 | 135 | 135 | 135 | 135 | 135 | 135 | | | | | | | | | |
| 141 | 142 | 142 | 142 | 142 | 107 | 60 | 41 | 63 | 110 | 138 | 138 | 140 | 140 | 140 | 139 | 139 | 139 | 138 |
| 138 | 138 | 137 | 137 | 137 | 137 | 137 | 137 | 137 | 137 | 137 | 137 | 137 | 137 | 137 | 136 | 136 | 138 | 137 |
| 137 | 137 | 137 | 136 | 136 | 136 | 136 | 136 | 136 | 136 | | | | | | | | | |
| 141 | 141 | 141 | 142 | 142 | 142 | 115 | 66 | 41 | 56 | 100 | 137 | 140 | 140 | 140 | 140 | 139 | 139 | 139 |
| 138 | 138 | 138 | 138 | 137 | 137 | 137 | 137 | 137 | 137 | 137 | 137 | 137 | 137 | 137 | 137 | 136 | 137 | 137 |
| 137 | 137 | 137 | 137 | 137 | 137 | 137 | 137 | 137 | 137 | | | | | | | | | |
| 140 | 140 | 141 | 141 | 142 | 142 | 142 | 123 | 74 | 43 | 50 | 90 | 136 | 141 | 140 | 140 | 140 | 139 | 139 |
| 139 | 138 | 138 | 138 | 138 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | 137 | | | | | | | | | |
| 140 | 140 | 140 | 141 | 141 | 141 | 142 | 142 | 130 | 84 | 47 | 45 | 82 | 129 | 141 | 140 | 140 | 140 | 139 |
| 139 | 139 | 138 | 138 | 138 | 138 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | 137 | | | | | | | | | |
| 139 | 139 | 140 | 140 | 140 | 141 | 141 | 141 | 142 | 137 | 94 | 52 | 41 | 72 | 119 | 141 | 140 | 140 | 140 |
| 139 | 139 | 139 | 139 | 138 | 138 | 137 | 137 | 137 | 137 | 137 | 137 | 137 | 137 | 137 | 137 | 137 | 136 | 137 |
| 137 | 137 | 137 | 137 | 137 | 137 | 137 | 137 | 137 | 137 | | | | | | | | | |
| 138 | 139 | 139 | 139 | 140 | 140 | 140 | 141 | 141 | 142 | 141 | 105 | 57 | 40 | 61 | 108 | 140 | 140 | 140 |
| 140 | 139 | 139 | 139 | 139 | 138 | 138 | 137 | 137 | 137 | 137 | 137 | 137 | 137 | 137 | 137 | 137 | 136 | 136 |
| 137 | 137 | 137 | 137 | 137 | 137 | 137 | 137 | 137 | 137 | | | | | | | | | |
| 138 | 138 | 138 | 139 | 140 | 140 | 140 | 140 | 141 | 141 | 141 | 142 | 114 | 67 | 41 | 53 | 94 | 136 | 140 |
| 140 | 140 | 139 | 139 | 139 | 139 | 138 | 138 | 137 | 137 | 137 | 137 | 137 | 137 | 137 | 137 | 137 | 136 | 136 |
| 136 | 137 | 137 | 137 | 137 | 137 | 137 | 137 | 137 | 137 | | | | | | | | | |
| 137 | 138 | 138 | 138 | 139 | 139 | 139 | 140 | 140 | 140 | 141 | 141 | 142 | 126 | 79 | 45 | 46 | 81 | 126 |
| 140 | 140 | 140 | 139 | 139 | 139 | 138 | 138 | 138 | 137 | 137 | 137 | 137 | 137 | 137 | 137 | 137 | 135 | 136 |
| 136 | 137 | 137 | 137 | 137 | 137 | 137 | 137 | 137 | 137 | | | | | | | | | |
| 137 | 137 | 137 | 138 | 138 | 138 | 139 | 139 | 139 | 140 | 140 | 140 | 142 | 143 | 146 | 93 | 52 | 42 | 68 |
| 113 | 140 | 140 | 140 | 140 | 139 | 139 | 138 | 138 | 137 | 137 | 137 | 137 | 137 | 137 | 137 | 137 | 135 | 136 |
| 136 | 137 | 137 | 137 | 137 | 137 | 137 | 137 | 137 | 136 | | | | | | | | | |
| 136 | 136 | 137 | 137 | 137 | 138 | 138 | 138 | 139 | 139 | 140 | 140 | 141 | 142 | 143 | 143 | 108 | 63 | 41 |
| 56 | 98 | 136 | 140 | 140 | 140 | 139 | 138 | 138 | 137 | 137 | 137 | 137 | 137 | 137 | 137 | 137 | 135 | 136 |
| 136 | 137 | 137 | 137 | 137 | 137 | 137 | 136 | 136 | 136 | | | | | | | | | |
| 135 | 136 | 136 | 137 | 137 | 137 | 138 | 138 | 138 | 139 | 139 | 139 | 140 | 141 | 143 | 144 | 145 | 123 | 76 |
| 45 | 48 | 82 | 126 | 140 | 141 | 140 | 139 | 138 | 138 | 137 | 137 | 137 | 137 | 137 | 136 | 136 | 135 | 136 |
| 137 | 137 | 137 | 137 | 137 | 137 | 137 | 136 | 136 | 136 | | | | | | | | | |
| 139 | 139 | 139 | 138 | 138 | 138 | 137 | 137 | 136 | 136 | 136 | 135 | 140 | 140 | 140 | 140 | 140 | 141 | 134 |
| 92 | 52 | 43 | 68 | 109 | 140 | 140 | 140 | 139 | 139 | 139 | 138 | 138 | 138 | 137 | 137 | 137 | 136 | 136 |
| 136 | 136 | 136 | 136 | 136 | 136 | 136 | 136 | 136 | 136 | | | | | | | | | |
| 140 | 139 | 139 | 139 | 138 | 138 | 138 | 137 | 137 | 137 | 136 | 136 | 139 | 139 | 140 | 140 | 140 | 140 | 140 |
| 140 | 108 | 63 | 42 | 56 | 99 | 136 | 140 | 140 | 139 | 139 | 139 | 138 | 138 | 138 | 137 | 137 | 136 | 136 |
| 136 | 136 | 136 | 136 | 136 | 136 | 136 | 136 | 136 | 136 | | | | | | | | | |
| 140 | 140 | 139 | 139 | 139 | 138 | 138 | 138 | 137 | 137 | 137 | 136 | 139 | 139 | 139 | 139 | 140 | 140 | 140 |

TABLE 7-continued

```
140 140 123  78  46  49  81 124 140 140 140 139 139 139 138 138 138 136 136
136 136 136 136 136 137 137 137 137 137
141 140 140 140 139 139 138 138 138 137 137 137 138 139 139 139 139 139 140
140 140 140 135  95  56  43  64 105 138 140 140 139 139 139 138 138 137 137
137 137 137 137 137 137 137 137 137 137
141 141 140 140 140 139 139 139 138 138 137 137 138 138 138 139 139 139 139
139 140 140 140 140 115  71  45  50  84 125 140 140 140 139 139 139 137 137
137 137 137 137 137 137 137 137 137 137
141 141 141 140 140 140 139 139 139 138 138 138 138 138 138 138 138 139 139
139 139 139 140 140 144 132  90  54  44  64 103 137 140 140 139 139 137 137
137 137 137 137 137 137 137 137 137 137
140 142 141 141 140 140 140 139 139 139 138 138 137 137 138 138 138 138 138
139 139 139 139 142 143 143 112  70  45  49  79 119 140 140 140 137 137
137 137 137 137 137 137 137 137 137 137
 90 132 142 141 141 141 140 140 139 139 139 138 137 137 137 137 138 138 138
138 138 139 139 139 140 141 142 144 132  92  56  43  59  94 131 140 137 137
137 137 137 137 137 137 137 137 138
 46  75 119 142 141 141 141 140 140 140 139 139 136 137 137 137 137 137 138
138 138 138 139 139 139 140 141 142 143 144 117  76  48  46  69 107 137 137
137 137 138 138 138 138 138 138 138
 60  44  61 102 138 141 141 141 140 140 140 139 136 136 137 137 137 137 137
138 138 138 138 138 137 138 139 140 141 142 143 137 102  64  44  50  85 122
138 138 138 138 138 138 138 138 138 138
118  73  46  51  85 127 141 141 141 140 140 140 136 136 136 136 137 137 137
137 137 138 138 138 138 135 136 137 138 140 141 142 143 144 128  90  56  43  54
 87 123 138 138 138 138 138 138 138 138
144 132  90  53  45  69 111 141 141 141 140 140 135 136 136 136 136 136 137
137 137 137 137 138 133 135 136 137 138 139 140 141 142 143 144 119  87  55
 43  55  86 122 138 138 138 138 138 138
143 143 143 120  70  44  58 100 137 139 139 139 139 139 139 138 138 138 137
137 137 137 136 136 137 137 137 137 137 137 137 137 137 137 137 137 137 140 123
 85  53  41  53  84 118 133 135 137 139
142 142 143 143 129  82  48  48  81 123 139 139 140 139 139 139 139 138 138
138 137 137 137 137 137 137 137 137 137 137 137 137 137 137 137 137 140 140
140 120  83  53  43  57  88 122 137 139
141 142 142 143 143 139  99  58  43  62 100 134 140 140 140 139 139 139 139
138 138 138 137 137 137 137 137 137 137 137 137 137 137 137 137 137 139 140
140 140 140 118  82  53  45  59  90 125
141 141 142 142 142 143 143 119  75  47  47  74 111 140 140 140 140 139 139
139 138 138 138 138 137 137 137 137 137 137 137 137 137 137 137 137 139 139
139 139 140 140 139 117  82  55  47  61
140 140 141 141 142 142 143 143 137 100  62  44  51  85 126 140 140 140 140
139 139 139 138 138 137 137 137 137 137 137 137 137 137 137 137 137 138 138
139 139 139 139 139 140 139 118  84  57
139 140 140 141 141 141 142 142 143 143 127  89  60  44  61  99 135 140 140
140 140 139 139 139 137 137 137 137 138 138 138 138 138 138 138 138 138 138
138 138 138 139 139 139 139 139 139 120
139 139 140 140 140 141 141 142 142 142 143 143 126  83  50  46  71 111 139
140 140 140 139 139 138 138 138 138 138 138 138 138 138 138 138 138 137 137
137 138 138 138 138 138 139 139 139 139
138 139 139 139 140 140 141 141 141 142 142 143 143 143 112  70  46  50  79
118 140 140 140 140 138 138 138 138 138 138 138 138 138 138 138 136 137
137 137 137 137 138 138 138 138 138 139
137 138 138 139 139 140 140 140 141 141 142 142 142 143 143 137 100  62  44
 53  85 122 140 140 138 138 138 138 138 138 138 138 138 138 138 138 136 136
136 136 137 137 137 137 137 138 138 138
137 137 138 138 138 139 139 140 140 141 141 141 141 141 142 142 143 130  92
 57  44  56  87 123 138 138 138 138 138 138 138 138 138 138 138 138 135 135
136 136 136 136 137 137 137 137 137 137
136 137 137 137 138 138 139 139 139 140 140 141 139 140 141 141 142 142 143
125  87  55  44  56  90 125 138 138 138 138 138 138 138 138 138 135 135
135 135 136 136 136 136 136 136 137 137 137
136 136 136 137 137 138 138 138 139 139 140 140 138 139 139 140 140 141 142
142 143 123  86  55  39  55  88 123 138 138 138 138 138 138 138 134 134
135 135 135 135 135 136 136 136 136 136
```

TABLE 8

```
139 139 138 138 138 138 137 137 137 136 136 136 137 137 137 137 137 137 137
137 137 137 137 137 137 137 137 137 137 137 137 137 137 137 137 134 135
136 137 137 137 137 137 137 136 135 134
139 139 139 138 138 138 138 137 137 137 136 136 137 137 137 137 137 137 137
137 137 137 137 137 137 137 137 137 137 137 137 137 137 137 137 134 135
136 137 137 137 137 137 137 136 135 134
140 139 139 139 138 138 138 138 137 137 137 136 137 137 137 137 137 137
137 137 137 137 137 137 137 137 137 137 137 137 137 137 137 137 134 135
136 137 137 137 137 137 137 136 135 134
```

TABLE 8-continued

| | | | | | | | | | | | | | | | | | | |
|---|---|---|---|---|---|---|---|---|---|---|---|---|---|---|---|---|---|---|
| 140 | 140 | 139 | 139 | 139 | 138 | 138 | 138 | 138 | 137 | 137 | 137 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 140 | 140 | 140 | 139 | 139 | 139 | 138 | 138 | 138 | 138 | 137 | 137 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 134 | 140 | 140 | 140 | 139 | 139 | 139 | 138 | 138 | 138 | 138 | 137 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 82 | 127 | 140 | 140 | 140 | 139 | 139 | 139 | 138 | 138 | 138 | 138 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 44 | 73 | 118 | 140 | 140 | 140 | 139 | 139 | 139 | 138 | 138 | 138 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 56 | 42 | 64 | 109 | 140 | 140 | 140 | 139 | 139 | 139 | 138 | 138 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 110 | 64 | 42 | 56 | 98 | 137 | 140 | 140 | 139 | 139 | 139 | 138 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 146 | 120 | 73 | 43 | 50 | 88 | 131 | 140 | 140 | 139 | 139 | 139 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 146 | 146 | 129 | 82 | 47 | 45 | 78 | 123 | 140 | 140 | 139 | 139 | 137 | 137 | 137 | 137 | 137 | 137 | 137 |
| 137 | 137 | 137 | 137 | 137 | 137 | 137 | 137 | 137 | 137 | 137 | 137 | 137 | 137 | 137 | 137 | 137 | 134 | 135 |
| 136 | 137 | 137 | 137 | 137 | 137 | 137 | 136 | 135 | 134 | | | | | | | | | |
| 143 | 143 | 143 | 135 | 91 | 51 | 43 | 71 | 117 | 138 | 138 | 138 | 140 | 140 | 139 | 139 | 139 | 139 | 138 |
| 138 | 138 | 137 | 137 | 137 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 142 | 142 | 143 | 143 | 139 | 99 | 56 | 41 | 64 | 109 | 138 | 138 | 140 | 140 | 140 | 139 | 139 | 139 | 139 |
| 138 | 138 | 138 | 137 | 137 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 141 | 142 | 142 | 142 | 143 | 142 | 107 | 62 | 41 | 57 | 101 | 136 | 141 | 140 | 140 | 140 | 139 | 139 | 139 |
| 139 | 138 | 138 | 138 | 137 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 141 | 141 | 141 | 142 | 142 | 142 | 143 | 116 | 69 | 42 | 52 | 92 | 127 | 141 | 140 | 140 | 140 | 139 | 139 |
| 139 | 139 | 138 | 138 | 138 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 140 | 141 | 141 | 141 | 141 | 142 | 142 | 142 | 123 | 76 | 44 | 47 | 71 | 118 | 141 | 140 | 140 | 140 | 139 |
| 139 | 139 | 139 | 138 | 138 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 140 | 140 | 140 | 141 | 141 | 141 | 141 | 142 | 142 | 130 | 84 | 47 | 39 | 62 | 108 | 140 | 140 | 140 | 140 |
| 139 | 139 | 139 | 139 | 138 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | 137 | | | | | | | | | |
| 139 | 139 | 140 | 140 | 140 | 141 | 141 | 141 | 141 | 142 | 135 | 93 | 61 | 39 | 55 | 98 | 137 | 140 | 140 |
| 140 | 139 | 139 | 139 | 139 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 139 | 139 | 139 | 139 | 140 | 140 | 140 | 141 | 141 | 141 | 141 | 139 | 117 | 70 | 41 | 48 | 87 | 131 | 140 |
| 140 | 140 | 139 | 139 | 139 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 138 | 138 | 139 | 139 | 139 | 139 | 140 | 140 | 140 | 141 | 141 | 141 | 142 | 127 | 80 | 45 | 44 | 77 | 123 |
| 140 | 140 | 140 | 139 | 139 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 137 | 138 | 138 | 138 | 139 | 139 | 139 | 140 | 140 | 140 | 141 | 142 | 143 | 135 | 91 | 51 | 41 | 68 |  |
| 114 | 140 | 140 | 140 | 139 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 137 | 137 | 137 | 138 | 138 | 138 | 139 | 139 | 139 | 139 | 140 | 140 | 141 | 142 | 143 | 141 | 103 | 58 | 41 |
| 60 | 104 | 139 | 140 | 140 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 136 | 137 | 137 | 137 | 137 | 138 | 138 | 138 | 139 | 139 | 139 | 139 | 140 | 142 | 143 | 144 | 145 | 114 | 67 |
| 42 | 53 | 94 | 135 | 140 | 137 | 137 | 137 | 137 | 137 | 137 | 137 | 137 | 137 | 137 | 137 | 137 | 137 | 137 |
| 137 | 137 | 137 | 137 | 137 | 137 | 137 | 137 | 137 | | | | | | | | | | |
| 138 | 138 | 138 | 138 | 137 | 137 | 137 | 136 | 136 | 136 | 136 | 135 | 139 | 139 | 140 | 140 | 140 | 140 | 136 |
| 96 | 56 | 43 | 66 | 107 | 139 | 139 | 139 | 139 | 138 | 138 | 138 | 137 | 137 | 137 | 137 | 136 | 135 | 135 |
| 135 | 135 | 135 | 135 | 135 | 135 | 135 | 135 | 135 | | | | | | | | | | |
| 139 | 139 | 138 | 138 | 138 | 138 | 137 | 137 | 137 | 137 | 136 | 136 | 136 | 139 | 139 | 139 | 140 | 140 | 140 |
| 141 | 112 | 67 | 43 | 55 | 104 | 139 | 139 | 139 | 139 | 139 | 138 | 138 | 138 | 137 | 137 | 137 | 136 | 136 |
| 136 | 136 | 136 | 136 | 136 | 136 | 136 | 136 | 136 | | | | | | | | | | |
| 140 | 139 | 139 | 139 | 138 | 138 | 138 | 138 | 137 | 137 | 137 | 136 | 138 | 139 | 139 | 139 | 140 | 140 | 140 |
| 140 | 141 | 126 | 82 | 48 | 50 | 87 | 130 | 140 | 139 | 139 | 139 | 139 | 138 | 138 | 138 | 137 | 136 | 136 |
| 136 | 136 | 136 | 136 | 136 | 136 | 136 | 136 | 136 | | | | | | | | | | |
| 140 | 140 | 140 | 139 | 139 | 139 | 138 | 138 | 138 | 138 | 137 | 137 | 138 | 138 | 139 | 139 | 139 | 140 | 140 |
| 140 | 140 | 141 | 137 | 97 | 54 | 43 | 69 | 113 | 140 | 140 | 139 | 139 | 139 | 139 | 138 | 138 | 136 | 136 |
| 136 | 136 | 136 | 136 | 136 | 136 | 136 | 136 | 136 | | | | | | | | | | |
| 141 | 140 | 140 | 140 | 139 | 139 | 139 | 139 | 138 | 138 | 138 | 138 | 138 | 138 | 138 | 138 | 139 | 139 | 140 |
| 140 | 140 | 140 | 141 | 141 | 114 | 68 | 43 | 53 | 91 | 131 | 140 | 140 | 139 | 139 | 139 | 139 | 137 | 137 |
| 137 | 137 | 137 | 137 | 137 | 137 | 137 | 137 | 137 | | | | | | | | | | |
| 141 | 141 | 141 | 140 | 140 | 140 | 140 | 139 | 139 | 139 | 138 | 138 | 138 | 138 | 138 | 138 | 139 | 139 | 139 |

TABLE 8-continued

| | | | | | | | | | | | | | | | | | | |
|---|---|---|---|---|---|---|---|---|---|---|---|---|---|---|---|---|---|---|
| 140 | 140 | 140 | 140 | 141 | 143 | 131 | 87 | 51 | 44 | 69 | 111 | 140 | 140 | 140 | 139 | 139 | 137 | 137 |
| 137 | 137 | 137 | 137 | 137 | 137 | 137 | 137 | 137 | 137 | | | | | | | | | |
| 137 | 142 | 141 | 141 | 141 | 140 | 140 | 140 | 140 | 139 | 139 | 139 | 137 | 138 | 138 | 138 | 138 | 139 | 139 |
| 139 | 140 | 140 | 140 | 140 | 142 | 143 | 143 | 110 | 67 | 44 | 51 | 85 | 125 | 140 | 140 | 140 | 137 | 137 |
| 137 | 137 | 137 | 137 | 137 | 137 | 137 | 137 | 137 | 137 | | | | | | | | | |
| 85 | 126 | 142 | 142 | 141 | 141 | 141 | 140 | 140 | 140 | 140 | 139 | 137 | 137 | 138 | 138 | 138 | 138 | 139 |
| 139 | 139 | 140 | 140 | 140 | 140 | 141 | 142 | 143 | 132 | 91 | 54 | 43 | 61 | 98 | 133 | 140 | 137 | 137 |
| 137 | 137 | 137 | 137 | 137 | 137 | 137 | 137 | 137 | 137 | | | | | | | | | |
| 45 | 70 | 111 | 141 | 142 | 142 | 141 | 141 | 141 | 140 | 140 | 140 | 137 | 137 | 137 | 138 | 138 | 138 | 138 |
| 139 | 139 | 139 | 140 | 140 | 138 | 139 | 141 | 142 | 143 | 144 | 117 | 76 | 48 | 45 | 69 | 107 | 138 | 138 |
| 138 | 138 | 138 | 138 | 138 | 138 | 138 | 138 | 138 | 138 | | | | | | | | | |
| 61 | 44 | 57 | 95 | 133 | 142 | 142 | 142 | 141 | 141 | 141 | 140 | 136 | 137 | 137 | 137 | 138 | 138 | 138 |
| 138 | 139 | 139 | 139 | 140 | 137 | 138 | 139 | 140 | 141 | 142 | 143 | 139 | 105 | 67 | 45 | 48 | 87 | 122 |
| 138 | 138 | 138 | 138 | 138 | 138 | 138 | 138 | 138 | 138 | | | | | | | | | |
| 117 | 75 | 47 | 49 | 78 | 120 | 142 | 142 | 142 | 142 | 141 | 141 | 136 | 136 | 137 | 137 | 137 | 138 | 138 |
| 138 | 138 | 138 | 139 | 139 | 135 | 136 | 137 | 138 | 139 | 141 | 142 | 143 | 144 | 133 | 97 | 62 | 43 | 54 |
| 83 | 118 | 138 | 138 | 138 | 138 | 138 | 138 | 138 | 138 | | | | | | | | | |
| 144 | 131 | 91 | 55 | 44 | 64 | 105 | 139 | 142 | 142 | 142 | 142 | 136 | 136 | 136 | 137 | 137 | 137 | 138 |
| 138 | 138 | 138 | 139 | 139 | 133 | 134 | 135 | 137 | 138 | 139 | 140 | 141 | 142 | 143 | 145 | 129 | 87 | 58 |
| 44 | 51 | 78 | 114 | 138 | 139 | 139 | 139 | 139 | 139 | | | | | | | | | |
| 143 | 143 | 143 | 120 | 71 | 44 | 56 | 96 | 134 | 139 | 139 | 139 | 139 | 139 | 139 | 139 | 138 | 138 | 138 |
| 137 | 137 | 137 | 137 | 136 | 138 | 138 | 138 | 138 | 138 | 138 | 138 | 138 | 138 | 138 | 138 | 138 | 131 | 101 |
| 67 | 45 | 42 | 58 | 87 | 119 | 133 | 135 | 137 | 139 | | | | | | | | | |
| 142 | 142 | 143 | 143 | 131 | 85 | 49 | 47 | 76 | 118 | 139 | 139 | 140 | 140 | 139 | 139 | 139 | 139 | 138 |
| 138 | 138 | 137 | 137 | 137 | 138 | 138 | 138 | 138 | 139 | 138 | 138 | 138 | 138 | 138 | 138 | 138 | 139 | 139 |
| 132 | 103 | 70 | 47 | 43 | 59 | 89 | 121 | 137 | 139 | | | | | | | | | |
| 141 | 142 | 142 | 142 | 143 | 140 | 103 | 61 | 43 | 57 | 94 | 130 | 141 | 140 | 140 | 140 | 139 | 139 | 139 |
| 139 | 138 | 138 | 138 | 137 | 138 | 138 | 138 | 138 | 138 | 138 | 138 | 138 | 138 | 138 | 138 | 138 | 138 | 139 |
| 139 | 139 | 133 | 105 | 73 | 50 | 45 | 61 | 91 | 124 | | | | | | | | | |
| 141 | 141 | 141 | 142 | 142 | 142 | 143 | 123 | 81 | 50 | 45 | 67 | 111 | 140 | 141 | 140 | 140 | 140 | 139 |
| 139 | 139 | 139 | 138 | 138 | 138 | 138 | 138 | 138 | 138 | 138 | 138 | 138 | 138 | 138 | 138 | 138 | 138 | 138 |
| 138 | 139 | 139 | 139 | 135 | 108 | 75 | 52 | 47 | 62 | | | | | | | | | |
| 140 | 141 | 141 | 141 | 141 | 142 | 142 | 142 | 140 | 107 | 68 | 46 | 53 | 86 | 125 | 141 | 141 | 140 | 140 |
| 140 | 139 | 139 | 139 | 139 | 138 | 138 | 138 | 138 | 138 | 138 | 138 | 138 | 138 | 138 | 138 | 138 | 137 | 138 |
| 138 | 138 | 138 | 139 | 139 | 139 | 136 | 110 | 78 | 55 | | | | | | | | | |
| 140 | 140 | 140 | 141 | 141 | 141 | 141 | 142 | 142 | 142 | 133 | 98 | 56 | 45 | 62 | 99 | 133 | 141 | 141 |
| 140 | 140 | 140 | 139 | 139 | 138 | 138 | 138 | 138 | 138 | 138 | 138 | 138 | 138 | 138 | 138 | 138 | 137 | 137 |
| 137 | 138 | 138 | 138 | 138 | 139 | 139 | 139 | 137 | 112 | | | | | | | | | |
| 139 | 139 | 140 | 140 | 140 | 141 | 141 | 141 | 141 | 142 | 142 | 142 | 119 | 77 | 49 | 47 | 70 | 107 | 137 |
| 141 | 141 | 140 | 140 | 140 | 138 | 138 | 138 | 138 | 138 | 138 | 138 | 138 | 138 | 138 | 138 | 138 | 136 | 136 |
| 137 | 137 | 137 | 138 | 138 | 138 | 138 | 139 | 139 | 139 | | | | | | | | | |
| 139 | 139 | 139 | 139 | 140 | 140 | 141 | 141 | 141 | 141 | 141 | 142 | 144 | 139 | 105 | 67 | 46 | 50 | 76 |
| 112 | 139 | 141 | 141 | 140 | 138 | 138 | 138 | 138 | 138 | 138 | 138 | 138 | 138 | 138 | 138 | 138 | 136 | 136 |
| 136 | 136 | 137 | 137 | 137 | 138 | 138 | 138 | 138 | 139 | | | | | | | | | |
| 138 | 138 | 139 | 139 | 139 | 139 | 140 | 140 | 140 | 141 | 141 | 141 | 142 | 143 | 143 | 132 | 96 | 61 | 45 |
| 51 | 78 | 113 | 138 | 141 | 138 | 138 | 138 | 138 | 138 | 138 | 138 | 138 | 138 | 138 | 138 | 138 | 135 | 135 |
| 136 | 136 | 136 | 136 | 137 | 137 | 137 | 138 | 138 | 138 | | | | | | | | | |
| 137 | 138 | 138 | 138 | 139 | 139 | 139 | 139 | 140 | 140 | 140 | 141 | 141 | 141 | 142 | 142 | 143 | 127 | 91 |
| 59 | 44 | 51 | 76 | 109 | 138 | 138 | 138 | 138 | 138 | 138 | 138 | 138 | 138 | 138 | 138 | 138 | 134 | 135 |
| 135 | 135 | 136 | 136 | 136 | 136 | 137 | 137 | 137 | 138 | | | | | | | | | |
| 137 | 137 | 137 | 138 | 138 | 138 | 139 | 139 | 139 | 139 | 140 | 140 | 139 | 140 | 140 | 141 | 142 | 142 | 143 |
| 125 | 90 | 60 | 44 | 49 | 100 | 133 | 138 | 138 | 138 | 138 | 138 | 138 | 138 | 138 | 138 | 138 | 134 | 134 |
| 134 | 135 | 135 | 135 | 136 | 136 | 136 | 136 | 137 | 137 | | | | | | | | | |
| 136 | 137 | 137 | 137 | 137 | 138 | 138 | 138 | 139 | 139 | 139 | 139 | 138 | 138 | 139 | 140 | 140 | 141 | 141 |
| 142 | 142 | 126 | 94 | 63 | 41 | 63 | 99 | 131 | 138 | 138 | 138 | 138 | 138 | 138 | 138 | 138 | 133 | 134 |
| 134 | 134 | 134 | 135 | 135 | 135 | 136 | 136 | 136 | 136 | | | | | | | | | |

TABLE 9

E
Q: −0.7082  R: 0.7976  K: 0.0094  H: 0.3366
Profile type: 1  a: −101.9714
{ 17.6667 }
{ 10.8323 }  { 1.0630  −0.7789 }
T
{ 9.4236 }  { 0.1056  −0.1257 }
{ 0.1332  0.0319  0.0621 }
{ 0.1378  −0.2445  0.3248  −0.0091 }
T
{ 9.0694 }  { 0.2132  0.1408 }
{ −0.0939  0.1978  0.1984 }
{ −0.1013  −0.0698  0.0375  0.1925 }
T
{ 8.0903 }  { 0.1559  −0.2263 }
{ −0.1065  0.1015  −0.5252 }
{ −0.0788  0.0514  −0.0346  0.2444 }

TABLE 9-continued

E
Q: 2.4427  R: 0.7269  K: 0.0125  H: 0.3295
Profile type: 1  a: −99.8569
{ 10.0000 }
{ 12.5987 }  { −2.0156  1.2151 }
E
Q: −0.6614  R: 0.5372  K: −0.0131  H: 0.3295
Profile type: 1  a: −103.4667
{ 22.3493 }  { −2.3316  4.0633 }
{ 11.9938 }  { 1.1234  −1.0171 }
T
{ 9.2708 }  { 0.2726  −0.4033 }
{ −0.0481  −0.2758  0.1060 }
{ 0.0164  −0.2178  0.2337  −0.1412 }
T
{ 8.6944 }  { −0.0141  0.0181 }
{ −0.2915  0.2640  −0.1256 }

TABLE 9-continued

| { 0.1589 | −0.2775 | −0.2572 | 0.0718 } |
|---|---|---|---|
| E | | | |
| Q: −0.6265 | R: 0.9160 | K: −0.0100 | H: 0.3295 |
| Profile type: 1 | a: −99.6773 | | |
| { 16.0000 } | | | |
| { 11.7162 } | { 1.5029 | −1.2395 } | |
| E | | | |
| Q: 2.5066 | R: 1.0541 | K; 0.0103 | H: 0.3117 |
| Profile type: 1 | a: −92.8743 | | |
| { 0.0000 } | | | |
| { 10.5651 } | { −1.3324 | 0.6983 } | |
| E | | | |
| Q: −0.5703 | R: 0.0839 | K: −0.0214 | H: 0.3237 |
| Profile type: 1 | a: −101.5896 | | |
| { 20.8458 } | { −5.9137 | 3.7597 } | |
| { 13.1990 } | { 1.7771 | −1.1217 } | |
| E | | | |
| Q: −0.4601 | R: 1.0753 | K: −0.0150 | H: 0.2796 |
| Profile type: 1 | a: −90.3296 | | |
| { 0.0000 } | | | |
| { 9.1003 } | { 0.6131 | 0.0838 } | |
| E | | | |
| Q: 2.5517 | R: 0.7077 | K: 0.0638 | H: 0.3138 |
| Profile type: 1 | a: −98.5962 | | |
| { 11.4000 } | | | |
| { 13.3455 } | { −2.2201 | 1.4149 } | |
| E | | | |
| Q: −0.5143 | R: 0.3120 | K: −0.0245 | H: 0.2994 |
| Profile type: 1 | a: −99.8304 | | |
| { 20.6534 } | { −4.5809 | 2.0873 } | |
| { 12.5008 } | { 1.7990 | −1.0101 } | |
| E | | | |
| Q: −0.4397 | R: 1.2347 | K: −0.0270 | H: 0.2897 |
| Profile type: 1 | a: −94.4909 | | |
| { 0.0000 } | | | |
| { 9.5831 } | { 0.4157 | 0.0353 } | |
| E | | | |
| Q: 2.6754 | R: 0.6984 | K: 0.0103 | H: 0.2978 |
| Profile type: 1 | a: −92.1178 | | |
| { −0.0610 } | { 0.0000 | 6.8199 } | |
| { 10.4021 } | { −1.9867 | 0.6955 } | |

TABLE 10

| E | | | |
|---|---|---|---|
| Q: −0.6875 | R: 0.8125 | K: 0.0000 | H: 0.3438 |
| Profile type: 1 | a: −102.0000 | | |
| { 18.0000 } | | | |
| { 11.0000 } | { 1.0000 | −1.0000 } | |
| T | | | |
| { 9.0000 } | { 0.0000 | 0.0000 } | |
| { 0.0000 } | 0.0000 | 0.0000 } | |
| { 0.0000 } | 0.0000 | 0.0000 | 0.0000 } |
| T | | | |
| { 9.0000 } | { 0.0000 | 0.0000 } | |
| { 0.0000 } | 0.0000 | 0.0000 } | |
| { 0.0000 } | 0.0000 | 0.0000 | 0.0000 } |
| T | | | |
| { 8.0000 } | { 0.0000 | 0.0000 } | |
| { 0.0000 } | 0.0000 | −1.0000 } | |
| { 0.0000 } | 0.0000 | 0.0000 | 0.0000 } |
| E | | | |
| Q: 2.4375 | R: 0.7188 | K: 0.0000 | H: 0.3438 |
| Profile type: 1 | a: −100.0000 | | |
| { 10.0000 } | | | |
| { 13.0000 } | { −2.0000 | 1.0000 } | |
| E | | | |
| Q: −0.6875 | R: 0.5312 | K: 0.0000 | H: 0.3438 |
| Profile type: 1 | a: −104.0000 | | |
| { 22.0000 } | { −2.0000 | 4.0000 } | |
| { 12.0000 } | { 1.0000 | −1.0000 } | |
| T | | | |
| { 9.0000 } | { 0.0000 | 0.0000 } | |
| { 0.0000 } | 0.0000 | 0.0000 } | |
| { 0.0000 } | 0.0000 | 0.0000 | 0.0000 } |
| T | | | |
| { 9.0000 } | { 0.0000 | 0.0000 } | |

TABLE 10-continued

| { 0.0000 } | 0.0000 | 0.0000 } | |
|---|---|---|---|
| { 0.0000 } | 0.0000 | 0.0000 | 0.0000 } |
| E | | | |
| Q: −0.6250 | R: 0.9062 | K: 0.0000 | H: 0.3438 |
| Profile type: 1 | a: −100.0000 | | |
| { 16.0000 } | | | |
| { 12.0000 } | { 2.0000 | −1.0000 } | |
| E | | | |
| Q: 2.5000 | R: 1.0625 | K: 0.0000 | H: 0.3125 |
| Profile type: 1 | a: −92.0000 | | |
| { 0.0000 } | | | |
| { 11.0000 } | { −1.0000 | 1.0000 } | |
| E | | | |
| Q: −0.5625 | R: 0.0938 | K: −0.0312 | H: 0.3125 |
| Profile type: 1 | a: −102.0000 | | |
| { 21.0000 } | { −6.0000 | 4.0000 } | |
| { 13.0000 } | { 2.0000 | −1.0000 } | |
| E | | | |
| Q: −0.4375 | R: 1.0625 | K: 0.0000 | H: 0.2812 |
| Profile type: 1 | a: −90.0000 | | |
| { 0.0000 } | | | |
| { 9.0000 } | { 1.0000 | 0.0000 } | |
| E | | | |
| Q: 2.5625 | R: 0.7188 | K: 0.0625 | H: 0.3125 |
| Profile type: 1 | a: −98.0000 | | |
| { 11.0000 } | | | |
| { 13.0000 } | { −2.0000 | 1.0000 } | |
| E | | | |
| Q: −0.5000 | R: 0.3125 | K: −0.0312 | H: 0.3125 |
| Profile type: 1 | a: −100.0000 | | |
| { 21.0000 } | { −5.0000 | 2.0000 } | |
| { 13.0000 } | { 2.0000 | −1.0000 } | |
| E | | | |
| Q: −0.4375 | R: 1.2500 | K: −0.0312 | H: 0.2812 |
| Profile type: 1 | a: −94.0000 | | |
| { 0.0000 } | | | |
| { 10.0000 } | { 0.0000 | 0.0000 } | |
| E | | | |
| Q: 2.6875 | R: 0.6875 | K: 0.0000 | H: 0.3125 |
| Profile type: 1 | a: −92.0000 | | |
| { 0.0000 } | { 0.0000 | 7.0000 } | |
| { 10.0000 } | { −2.0000 | 1.0000 } | |

We claim:

1. A process of picture representation by data compression which comprises the steps of:

subdividing the picture into regions;

registering for each region a set of brightness values;

fixing for each region a characteristic scale in terms of a number of pixels;

dividing each region into cells, each of said cells comprising a number of pixels defined by two coordinates, said cells having a linear dimension in the order of said characteristic scale;

identifying in each cell basic structures chosen from among smooth areas, positive and negative hills, and curvilinear structures chosen from among edges and ridges;

constructing for said curvilinear structures geometric models comprising lines approximating the center lines of said structures and parameters defining the profiles of said structures;

associating to each of said smooth areas, positive and negative hills and geometric models of curvilinear structures a mathematical model;

condensing said mathematical models to define a global mathematical model for the cell;

quantizing and encoding the data defining said global mathematical model; and storing and/or transmitting said data as representing the primary compression for the picture.

2. Process according to claim 1, further comprising the step of decompressing said data to reconstruct the picture.

3. Process according to claim 1, wherein said geometric and mathematical models, approximate said structures, and the degree of approximation is predetermined.

4. Process according to claim 1, wherein the basic structures are mathematically defined through the derivatives of a brightness function.

5. Process according to claim 4, wherein the brightness function is approximated by an approximating function $p(x,y)$, where x and y are the coordinate system of said region, and where $p(x,y)$ is a polynomial of the second degree having the form $p(x,y)=a_{00}+a_{10}x+a_{01}y+a_{20}x^2+a_{11}xy+a_{02}y^2$.

6. Process according to claim 1, comprising defining a number of said models and associating to each of said models a code identifying each of said models, said each model being defined by said code and by its parameters.

7. Processing according to claim 1, comprising eliminating information having a limited psycho-visual significance by dropping some models and eliminating some excessive parameters of the models that are retained.

8. Process according to claim 4, comprising assigning each grid point to one of three domains $A_1$, $A_2$ and $A_3$, wherein:

domain $A_1$ contains all the points where all the derivatives of the approximating function p of orders 1 and 2 do not exceed a threshold $T_1$, domain $A_2$ includes the grid points where the gradient of the approximating function p is large; and domain $A_3$ includes the grid points in which the second order derivatives are bigger than a threshold $T_3$, while $|\text{grad}(p(x,y))|$ does not exceed another threshold $T_2$; and identifying in the domains the basic structures.

9. Process according to claim 8, wherein the domain $A_1$ is the set of the points of the grid for which $$|\nabla p|^2 < G_{abs}, \lambda_1^2 + \lambda_2^2 < S_{abs}.$$

wherein $G_{abs}$ and $S_{abs}$ are thresholds and $\lambda_1$ and $\lambda_2$ are the eigenvalues of the matrix $$\begin{vmatrix} a_{20} & 1/2 a_{11} \\ 1/2 a_{11} & a_{02} \end{vmatrix}$$

the domain $A_2$ is the set of the points of the grid for which $$|\nabla p|^2 \geq \max[G_{abs}, G_{rel}]$$

where $G_{abs}$ is a threshold and $G_{rel}$ is a relative threshold, and the domain $A_3$ is the sum total of five sub-domains defined by the following conditions:

(1) $|\lambda_2/\lambda_1| < M_{ratio}, \lambda_1 + \lambda_2 < 0$
(2) $|\lambda_2/\lambda_1| < M_{ratio}, \lambda_1 + \lambda_2 < 0$
(3) $|\lambda_2/\lambda_1| \geq M_{ratio}, \lambda_1 < 0, \lambda_2 < 0$
(4) $|\lambda_2/\lambda_1| \geq M_{ratio}, \lambda_1 > 0, \lambda_2 > 0$
(5) $|\lambda_2/\lambda_1| \geq M_{ratio}, \lambda_1 \cdot \lambda_2 < 0$ wherein $M_{ratio}$ is a threshold.

10. Process according to claim 1, which comprises the steps of:

1) registering the values of the brightness function $z=f(x,y)$;

2) determining a window and a grid related thereto;

3) for each grid point, approximating the brightness function $z(x,y)$ by an approximating function;

4) fixing a number of thresholds;

5) assigning each grid point to one of three domains $A_1$, $A_2$ and $A_3$;

6) identifying in the domains the basic structures;

7) approximating the curvilinear basic structures by lines related to their center lines and parameters related to their profiles;

9) representing the basic structures by mathematical models;

10) interrelating the models thus constructed to construct a global model;

12) quantizing the data thus obtained; and 13) encoding the same.

11. Process according to claim 1 wherein the characteristic scale is comprised between 6 and 48 pixels.

12. Process according to claim 10, wherein the window has a linear dimension comprised between 2 and 6 pixels.

13. Process according to claim 12, wherein the window has a linear dimension chosen from among 3 and 4 pixels.

14. Process according to claim 1 or 10, wherein the data quantization consists in substituting the values of the compressed data by the closest of a predetermined set of values.

15. Process according to claim 1, comprising encoding the compression data by representing the corresponding quantized data in the form of a binary file.

16. Process according to claim 1, comprising repeating the steps of said process for a set of brightness functions chosen from those representing the basic colors or those representing a monochrome signal and color data information carrying signals.

17. Process according to claim 1 comprising carrying out its operations for one of a set brightness functions chosen from those representing the basic colors or those representing a monochrome signal and color data information carrying signals, retaining the geometric parameters found for the models of said one brightness function and repeating said operations for the other brightness functions of the same set and using the same models with the said geometric parameters and the appropriate brightness parameters for each of the other brightness functions of the same set.

18. Process according to claim 10, wherein the window is a square having a side of a few pixels and the grid is constituted by the pixels themselves, if the side is an uneven number of pixels, and is constituted by the central points between the pixels, if the side is an even number of pixels.

19. Process according to claim 1, wherein the processing comprises one or more operations chosen from among further compression, picture comparison, feature stressing, picture enhancement, creation of visual effects, color operations, geometric transformations, 3D-geometric transformations and texture creation.

20. Process according to claim 1, wherein the information defining the brightness distribution of the various colors is a function of time.

21. Process according to claim 1, wherein the characteristic scale is between 6 and 48 pixels.

22. Process according to claim 1, wherein said picture comprises a plurality of video sequences, wherein only a subsequence of frames is compressed, and the intermediate frames are represented by the same models as the control frames, with the parameters obtained by interpolation from the control frames.

23. Process according to claim 1 wherein the steps 5 and 6 are performed by choosing among the prefixed list of models, those which (after minimization with respect to the parameters) provide the best approximation of the picture.

24. A process of representing a picture by data, comprising the steps of:

subdividing the picture into regions;

registering for each region a set of brightness values, said set of brightness values collectively defining a brightness function;

dividing each region into cells, each of said cells comprising a number of pixels having a location defined by two coordinates;

identifying in each said cell basic structures chosen among:
- (a) background areas wherein the values of said brightness function change slowly;
- (b) curvilinear edges having a center line wherein on one side of said edge the values of said brightness function undergo a sharp change;
- (c) curvilinear ridges having a center line, wherein the cross-sectional profile perpendicular to said center line is a bell-shaped curve; and
- (d) hills wherein the brightness function value is a maximum or minimum and decreases or increases, respectively, in all directions from said hills;

constructing geometric models for those basic structures which are curvilinear, said geometric models comprising lines approximating the center lines of said structures and parameters defining the profiles of said structures;

associating a mathematical model with each of said background areas, hills and geometric models;

condensing said mathematical models to define a global mathematical model for the cell;

quantizing and encoding the data defining said global mathematical model; and storing and/or transmitting said data.

25. A process according to claim 24, wherein the basic structures are chosen from among said background areas, said edges, said ridges and said hills, and chosen from among saddles comprising a central smooth region bounded by two edges, wherein the values of said brightness function increase at one edge and decrease at the other edge.

26. A process according to claim 1, wherein the basic structures are chosen from among smooth areas, positive and negative hills, edges and ridges, and saddles.

27. A process according to claim 1, wherein geometric and mathematical models are constructed for only part of the basic structures.

28. A process according to claim 1, wherein the condensing of the models to define a global model comprises eliminating at least one of the mathematical models.

* * * * *

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-identified patent and that said Letters Patent is hereby corrected as shown below:

Column 2, line 61, "canners." should read --scanners.--

Column 3, line 14, "colosely" should read --closely--

Column 4, line 21, "mans" should read --means--

Column 4, line 35, "combines." should read --combined.--

Column 5, line 11, "aspects" should read --aspect--

Column 6, line 21, "undistiguishable" should read --undistinguishable--

Column 6, lines 36-39, delete entire paragraph

Column 7, line 2, "undistiguishable" should read --undistinguishable--

Column 8, line 65, "tis" should read --its--

Column 9, line 50, "$\lambda_1<0, \lambda_2>0$" should read --$\lambda_1>0, \lambda_2>0$--

Column 11, line 3, "$B_{abs}$" should read --$G_{abs}$--

Column 11, line 44, "includes," should read --include,--

Column 14, line 1, "combines." should read --combined.--

Column 14, line 32, "five the" should read --give the--

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-identified patent and that said Letters Patent is hereby corrected as shown below:

Column 14, line 44, "$T_{segm}: 20°-30° (30°);$" should read --$T_{segm}: 20°-40°(30°);$--

Column 15, line 30,

" $|\nabla p| = \sqrt{a_{10}^2 + a_{01}^2} = \sqrt{a_{10}'^2 + a_{01}'^2}$ " should read -- $|\nabla p| = \sqrt{a_{10}^2 + a_{01}^2} = \sqrt{a'_{10}^2 + a'_{01}^2}$ --.

Column 15, line 41, "IN this" should read --In this--

Column 16, line 2, "$\lambda_1 + \lambda_2 < 0$-black ridges" should read --$\lambda_1 + \lambda_2 > 0$-black ridges---

Column 16, line 4, "$\lambda_1 < 0, \lambda_2 < 0$-black hills or "hollows"-" should read --$\lambda_1 > 0, \lambda_2 > 0$-black hills or "hollows"---

Column 16, line 19 "$J_j = 0.8.$" should read --$K_j = 0.8.$--

Column 16, line 40,
" $p(x'', y'') = a''_{00} + a'_{01} y'' + \lambda_1 x''^2$ " should read -- $p(x'', y'') = a''_{00} + a'_{01} y'' + \lambda_1 x''^2 + \lambda_2 y''^2$ --.

Column 16, line 65,
" $x''' 40 = x'', y''' = y'' + a'_{01}/2\lambda_2$ " should read -- $x''' = x'', y''' = y'' + a'_{01}/2\lambda_2$ --.

Column 18, line 13, "iii," should read --iiii,--

Column 19, line 30, "internal" should read --interval--

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-identified patent and that said Letters Patent is hereby corrected as shown below:

Column 20, line 3, "to the distance" should read --of the distance--

Column 20, line 13, "$S_2$." should read --$A_2$.--

Column 20, line 47, "1x1'" should read --1'x1'--

Column 20, line 60, "$t_1>0$," should read --$t_1<0$,--

Column 20, line 61, "$t_2<0$," should read --$t_2>0$,--

Column 20, line 66, "$tZ_2$" should read --$t_2$--

Column 21, line 2, "$a_2$'," should read --$A_2$',--

Column 21, line 58, ""unadherent"]" should read --"unadherent"--

Column 22, line 30, "its is" should read --it is--

Column 22, line 36 "for each" should read --For each--

Column 23, line 6 "typically 0.5" should read --typically 0.5.--

Column 24, line 28, "component AD," should read --component AB,--

Column 24, line 38, insert --Step 9--

Column 24, line 52, "$\lambda_2, |\lambda_1| \leq |\lambda_2|$" should read --$\lambda_2, |\lambda_1| \geq |\lambda_2|$--

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-identified patent and that said Letters Patent is hereby corrected as shown below:

Column 26, line 55, "$\Sigma_{Jjedge}(u,v).$" should read --$\Sigma_j \phi_{Jjedge}(u,v).$--

Column 27, line 57, "pof" should read --$p$ of--

Column 27, line 65, "pwhose" should read --p≠whose--

Column 28, line 15, "pof" should read --p≠of--

Column 28, line 36, "a. $W_i(x,y) \leq 0$" should read --a. $W_i(x,y) \geq 0$--

Column 29, line 9, "$\Phi_P(x_{ii})$" should read --$\Phi_P(xi,yi)$--

Column 29, line 14, "$\Phi_4$" should read --$\Phi_h$--

Column 29, line 39, "P',P"," should read --P',P",--

Column 29, line 43, "i. pis empty" should read --1. p is empty--

Column 29, line 50, "$_p$' here" should read --p' here--

Column 29, line 64, "Now pis" should read --Now p is--

Column 29, line 65, "$_p$' contains" should read --p' contains--

Column 29, line 66, "$\Phi$ $_p$is" should read --$\Phi$ p is--

Column 30, line 1, "Then $_p$'" should read --Then p'--

Column 30, line 4, "$|a_i - \Phi P(x_i,y_i)| \geq Q_6 . H_6$" should read --$|a_i - \Phi_P(x_i,y_i)| \geq Q_6 . H_6$--

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-identified patent and that said Letters Patent is hereby corrected as shown below:

Column 30, line 11, " ,$\mathcal{P}$)ridges," should be --$\mathcal{P},\mathcal{P}$) ridges--.

Column 30, line 12, "iiii. Here $_p$contains" should read --iiii. Here P contains--

Column 30, line 62, "choice of p, p'," should read --choice of P, P',--

Column 30, line 65, "pcan" should read --$\mathcal{P}$ can--.

Column 30, line 66, "$\Phi\mathcal{P}$is" should read --$\Phi_{\mathcal{P}}$ is--.

Column 31, line 28, "the set $_p$of" should read --the set P of--

Column 31, line 43, "in $_p$whose" should read --in P whose--

Column 32, line 7, "and $B_2)A_2$" should read --and $B_1(A_2$--

Column 32, line 66, "$z=a_0+a_1x'+a_2y'+a_{11}x'^2+2a_{12}x'y'+a_{22}\cdot^2$" should read --$z=a_0+a_1x'+a_2y'+a_{11}x'^2+2a_{12}x'y'+a_{22}y'^2$--

Column 39, line 15, "$\Sigma(p_i''-a''p_i-b'')^2$." should read --$\Sigma(p_i''-a''p_i-b'')^2$. Then we represent the parameters $p_i',p_i''$--.

Column 39, line 48, "the cells" should read --the cell--

Column 39, line 53, "to the skill" should read

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-identified patent and that said Letters Patent is hereby corrected as shown below:

--to the skilled--

Column 40, line 60, "One more," should read --Once more--

Column 41, line 6, "$\phi(x,y)$" should read --$\Phi(x,y)$--

Column 41, line 37, "we operated" should read --we operate--

Column 43, line 65, "$x(t)=x(0)+v_1.t$" should read

--$x(t)=x(0)+v_1.t$           *--

Column 45, line 24, "$\Phi$." should read --$\Phi'$.--

Column 48, line 25, "$\sigma(f,\Phi)=\sigma[f(x,y)-\Phi(x,y)]^2$." should read

--$\sigma(f,\Phi)=\Sigma[f(x,y)-\Phi(x,y)]^2$.--

Column 48, line 51, "some other" should read --some others--

Column 49, line 28, "$z=\Phi^1(x,y)=P_1(x,y)=$" should read

--$z=\Phi_1(x,y)=P_1(x,y)=$--

Column 49 and 50 in Table 1 after line 2 insert a new line containing --79-- in the first column; insert --71-- in the second column Column 51 and 52 Table 1-continued, line 44, first column, "20"

should read --50--

UNITED STATES PATENT AND TRADEMARK OFFICE
CERTIFICATE OF CORRECTION

PATENT NO. : 5,510,838
DATED : April 23, 1996
INVENTOR(S) : Yomdin et al.

It is certified that error appears in the above-indentified patent and that said Letters Patent is hereby corrected as shown below:

Column 57 and 58 Table 3-continued, line 50, second column, "136" should read

--137--

Column 73 and 74 Table 8-continued, line 45, delete "137" at the end of the line Column 79, line 54, "(2)$|\lambda_2/\lambda_1|<M_{ratio}$, $\lambda_1+\lambda_2<0$" should read --(2)$|\lambda_2/\lambda_1|<M_{ratio}$, $\lambda_1+\lambda_2>0$--

Signed and Sealed this

Twenty-fourth Day of December, 1996

Attest:

BRUCE LEHMAN

Attesting Officer

Commissioner of Patents and Trademarks